United States Patent
Sundaram et al.

(10) Patent No.: US 9,275,124 B2
(45) Date of Patent: *Mar. 1, 2016

(54) METHODS AND APPARATUS FOR CONTROLLING SNAPSHOT EXPORTS

(71) Applicant: Amazon Technologies, Inc., Reno, NV (US)

(72) Inventors: Arun Sundaram, Seattle, WA (US); Yun Lin, Bellevue, WA (US); David Carl Salyers, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 25 days.

This patent is subject to a terminal disclaimer.

(21) Appl. No.: 14/336,768

(22) Filed: Jul. 21, 2014

(65) Prior Publication Data

US 2014/0330784 A1    Nov. 6, 2014

Related U.S. Application Data

(63) Continuation of application No. 13/324,907, filed on Dec. 13, 2011, now Pat. No. 8,789,208.

(60) Provisional application No. 61/543,278, filed on Oct. 4, 2011.

(51) Int. Cl.
  *G06F 21/00* (2013.01)
  *G06F 17/30* (2006.01)
  (Continued)

(52) U.S. Cl.
  CPC ........ *G06F 17/30575* (2013.01); *G06F 3/0604* (2013.01); *G06F 3/065* (2013.01); *G06F 3/067* (2013.01); *G06F 3/0622* (2013.01);
  (Continued)

(58) Field of Classification Search
  CPC ............ G06F 17/30575; G06F 3/0604; G06F 3/0637; G06F 3/065; G06F 3/067; H04L 29/06
  See application file for complete search history.

(56) References Cited

U.S. PATENT DOCUMENTS 3,838,228 A    9/1974  Lee et al.
5,636,355 A    6/1997  Ramakrishnan et al.
(Continued)

OTHER PUBLICATIONS

U.S. Appl. No. 13/324,907, filed Dec. 13, 2011, Arun Sundaram.
(Continued)

*Primary Examiner* — Jeffrey Pwu
*Assistant Examiner* — Thong Truong
(74) *Attorney, Agent, or Firm* — Robert C. Kowert; Meyertons, Hood, Kivlin, Kowert & Goetzel, P.C.

(57) ABSTRACT

Methods, apparatus, and computer-accessible storage media for controlling export of snapshots to external networks in service provider environments. Methods are described that may be used to prevent customers of a service provider from downloading snapshots of volumes, such as boot images created by the service provider or provided by third parties, to which the customer does not have the appropriate rights. A request may be received from a user to access one or more snapshots, for example a request to export the snapshot or a request for a listing of snapshots. For each snapshot, the service provider may determine if the user has rights to the snapshot, for example by checking a manifest for the snapshot to see if entries in the snapshot manifest belong to an account other than the customer's. If the user has rights to the snapshot, the request is granted; otherwise, the request is not granted.

20 Claims, 45 Drawing Sheets

(51) Int. Cl.
*H04L 29/06* (2006.01)
*G06F 3/06* (2006.01)
*G06F 21/78* (2013.01)
*H04L 29/08* (2006.01)

(52) U.S. Cl.
CPC .............. *G06F3/0637* (2013.01); *G06F 21/78* (2013.01); *H04L 29/06* (2013.01); *H04L 67/1097* (2013.01)

(56) References Cited

U.S. PATENT DOCUMENTS

| | | |
|---|---|---|
| 6,009,502 A | 12/1999 | Boeuf |
| 6,097,877 A | 8/2000 | Katayama et al. |
| 6,148,368 A | 11/2000 | DeKoning |
| 6,216,199 B1 | 4/2001 | Dekoning et al. |
| 6,237,072 B1 | 5/2001 | Houlsdworth |
| 6,477,624 B1 | 11/2002 | Kedem et al. |
| 6,516,380 B2 | 2/2003 | Kenchammana-Hoskote et al. |
| 6,732,124 B1 | 5/2004 | Koseki et al. |
| 6,760,379 B1 | 7/2004 | Werner |
| 6,792,540 B1 * | 9/2004 | Smith et al. ............... 726/31 |
| 6,880,086 B2 | 4/2005 | Kidder et al. |
| 6,925,518 B2 | 8/2005 | Rudland et al. |
| 6,934,826 B2 | 8/2005 | Lubbers et al. |
| 7,010,645 B2 | 3/2006 | Hetzler et al. |
| 7,017,374 B2 | 3/2006 | Bogert et al. |
| 7,093,028 B1 | 8/2006 | Shao et al. |
| 7,191,304 B1 * | 3/2007 | Cameron et al. ............ 711/202 |
| 7,340,639 B1 | 3/2008 | Lee et al. |
| 7,523,286 B2 | 4/2009 | Ramany et al. |
| 7,574,660 B2 | 8/2009 | Campbell et al. |
| 7,676,702 B2 | 3/2010 | Basham et al. |
| 7,752,329 B1 | 7/2010 | Meenan et al. |
| 8,037,026 B1 | 10/2011 | Singhal |
| 8,126,847 B1 | 2/2012 | Zheng et al. |
| 8,200,638 B1 | 6/2012 | Zheng et al. |
| 8,214,406 B2 | 7/2012 | Kushwah |
| 8,275,900 B2 | 9/2012 | Meenan et al. |
| 8,285,967 B1 | 10/2012 | Veeraswamy et al. |
| 8,305,893 B2 | 11/2012 | Verma et al. |
| 2001/0049773 A1 | 12/2001 | Bhavsar |
| 2002/0169827 A1 | 11/2002 | Ulrich et al. |
| 2003/0131278 A1 | 7/2003 | Fujibayashi |
| 2003/0221124 A1 | 11/2003 | Curran et al. |
| 2004/0243699 A1 | 12/2004 | Kocianes et al. |
| 2005/0013441 A1 | 1/2005 | Klein |
| 2006/0271656 A1 | 11/2006 | Yagawa |
| 2007/0168336 A1 | 7/2007 | Ransil et al. |
| 2008/0013614 A1 | 1/2008 | Fiesel et al. |
| 2008/0178278 A1 | 7/2008 | Grinstein et al. |
| 2008/0189774 A1 | 8/2008 | Ansari et al. |
| 2009/0024752 A1 | 1/2009 | Shitomi |
| 2009/0077257 A1 | 3/2009 | Savoor et al. |
| 2009/0157980 A1 | 6/2009 | Bruce |
| 2009/0240705 A1 | 9/2009 | Miloushev et al. |
| 2010/0057984 A1 | 3/2010 | Chen et al. |
| 2010/0070725 A1 | 3/2010 | Prahlad et al. |
| 2010/0162032 A1 | 6/2010 | Dodgson et al. |
| 2010/0205152 A1 | 8/2010 | Ansari et al. |
| 2010/0217948 A1 | 8/2010 | Mason et al. |
| 2010/0293233 A1 | 11/2010 | Salam et al. |
| 2010/0333116 A1 | 12/2010 | Prahlad et al. |
| 2011/0002341 A1 | 1/2011 | Damola et al. |
| 2011/0113428 A1 | 5/2011 | Nelson et al. |
| 2011/0218969 A1 | 9/2011 | Anglin et al. |
| 2012/0110569 A1 | 5/2012 | Moore et al. |
| 2012/0203924 A1 | 8/2012 | Dote et al. |
| 2012/0208512 A1 | 8/2012 | Maharajh et al. |
| 2012/0259950 A1 | 10/2012 | Havekes et al. |
| 2012/0269275 A1 | 10/2012 | Hannuksela |
| 2012/0272285 A1 | 10/2012 | Brooks et al. |
| 2012/0303686 A1 | 11/2012 | Ananthanarayanan et al. |
| 2012/0311065 A1 | 12/2012 | Ananthanarayanan et al. |
| 2012/0324067 A1 | 12/2012 | Hari et al. |

OTHER PUBLICATIONS

Stephen Lawson, "Gluster Pushes Storage Software to VMware, Amazon," PCWorld online article, Feb. 7, 2011, pp. 1-3.
Krishnan Subramanian, "Gluster Introduces Scale-Out NAS Virtual Storage Appliances for VMware and AWS," CloudAve online article, Feb. 9, 2011, pp. 1-3.
A. Epstein, D. H. Lorenz, E Silvera, I. Shapira, "Virtual Appliance Content Distribution for a Global Infrastructure Cloud Service," INFOCOM'1 0 Proceedings IEEE, Mar. 2010, pp. 1-9.
Liu, et al., "Low-cost application image distribution on worldwide cloud front server," Computer Communications Workshops (INFOCOM WKSHPS), 2011 IEEE Conference, Apr. 2011, pp. 671-676.
M. Armbrust, et al., "Above the Clouds: A Berkeley View of Cloud computing," Technical Report No. UCB/EECS-2009-28, University of California at Berkley, USA, Feb. 10, 2009, pp. 1-23.
Stephanie Balaouras, "How the Cloud Will Transform Disaster Recovery Services," Forrester Research, Inc., Jul. 24, 2009, pp. 1-14.
U.S. Appl. No. 12/981,172, filed Dec. 29, 2010, Amazon Technologies, Inc., all pages.
U.S. Appl. No. 12/981,393, filed Dec. 29, 2010, Amazon Technologies, Inc., all pages.
U.S. Appl. No. 12/981,397, filed Dec. 29, 2010, Amazon Technologies, Inc., all pages.
U.S. Appl. No. 13/212,960, filed Aug. 18, 2011, Amazon Technologies, Inc., all pages.
U.S. Appl. No. 13/174,156, filed Jun. 30, 2011, Amazon Technologies, Inc., all pages.
U.S. Appl. No. 13/174,524, filed Jun. 30, 2011, Amazon Technologies, Inc., all pages.
U.S. Appl. No. 13/174,172, filed Jun. 30, 2011, Amazon Technologies, Inc., all pages.
U.S. Appl. No. 13/174,140, filed Jun. 30, 2011, Amazon Technologies, Inc., all pages.
U.S. Appl. No. 13/174,203, filed Jun. 30, 2011, Amazon Technologies, Inc., all pages.
U.S. Appl. No. 13/174,513, filed Jun. 30, 2011, Amazon Technologies, Inc., all pages.
U.S. Appl. No. 13/174,505, filed Jun. 30, 2011, Amazon Technologies, Inc., all pages.
U.S. Appl. No. 13/174,489, filed Jun. 30, 2011, Amazon Technologies, Inc., all pages.
U.S. Appl. No. 13/327,605, filed Dec. 15, 2011, Amazon Technologies, Inc., all pages.

* cited by examiner local block *n*

Legend:
Fingerprinted node: ··············
Node with data restored: ─ ─ ─ ─
Node without data restored: ───────

Legend:
Fingerprinted node: ·············
Node with data restored: - - - - -
Node without data restored: ───

Legend:
Fingerprinted node: ·······
Node with data restored: − − − −
Node without data restored: ───

Legend:

Fingerprinted node: ··············

Node with data restored: ‒ ‒ ‒

Node without data restored: ___ snapshot manifest 2030A

<snapshot information>

| chunk 2032A | snapshot object 2034A | account ID 2036A |
| --- | --- | --- |
| chunk 2032B | snapshot object 2034B | account ID 2036A |
| chunk 2032C | snapshot object 2034C | account ID 2036A |
| chunk 2032D | snapshot object 2034D | account ID 2036A |

*Figure 37A* snapshot manifest 2030B

<snapshot information>

| chunk 2032A | snapshot object 2034A | account ID 2036A |
| --- | --- | --- |
| chunk 2032B | snapshot object 2034B | account ID 2036A |
| chunk 2032C | snapshot object 2034C | account ID 2036A |
| chunk 2032D | snapshot object 2034D | account ID 2036A |
| chunk 2032E | snapshot object 2034E | account ID 2036B |
| chunk 2032F | snapshot object 2034F | account ID 2036B |
| chunk 2032G | snapshot object 2034G | account ID 2036B |
| chunk 2032H | snapshot object 2034H | account ID 2036B |

*Figure 37B*

METHODS AND APPARATUS FOR CONTROLLING SNAPSHOT EXPORTS

PRIORITY INFORMATION

This application is a continuation of U.S. patent application Ser. No. 13/324,907, filed Dec. 13, 2011, now U.S. Pat. No. 8,789,208, which claims benefit of priority of U.S. Provisional Application Ser. No. 61/543,278, filed Oct. 4, 2011, the contents of which are incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resources.

Web Services

The conventional Web model allows clients to access Web resources (e.g., applications, services, and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

BRIEF DESCRIPTION OF THE DRAWINGS

FIGS. 37A and 37B graphically illustrate example snapshot manifest files, according to at least some embodiments.

Figure 1:
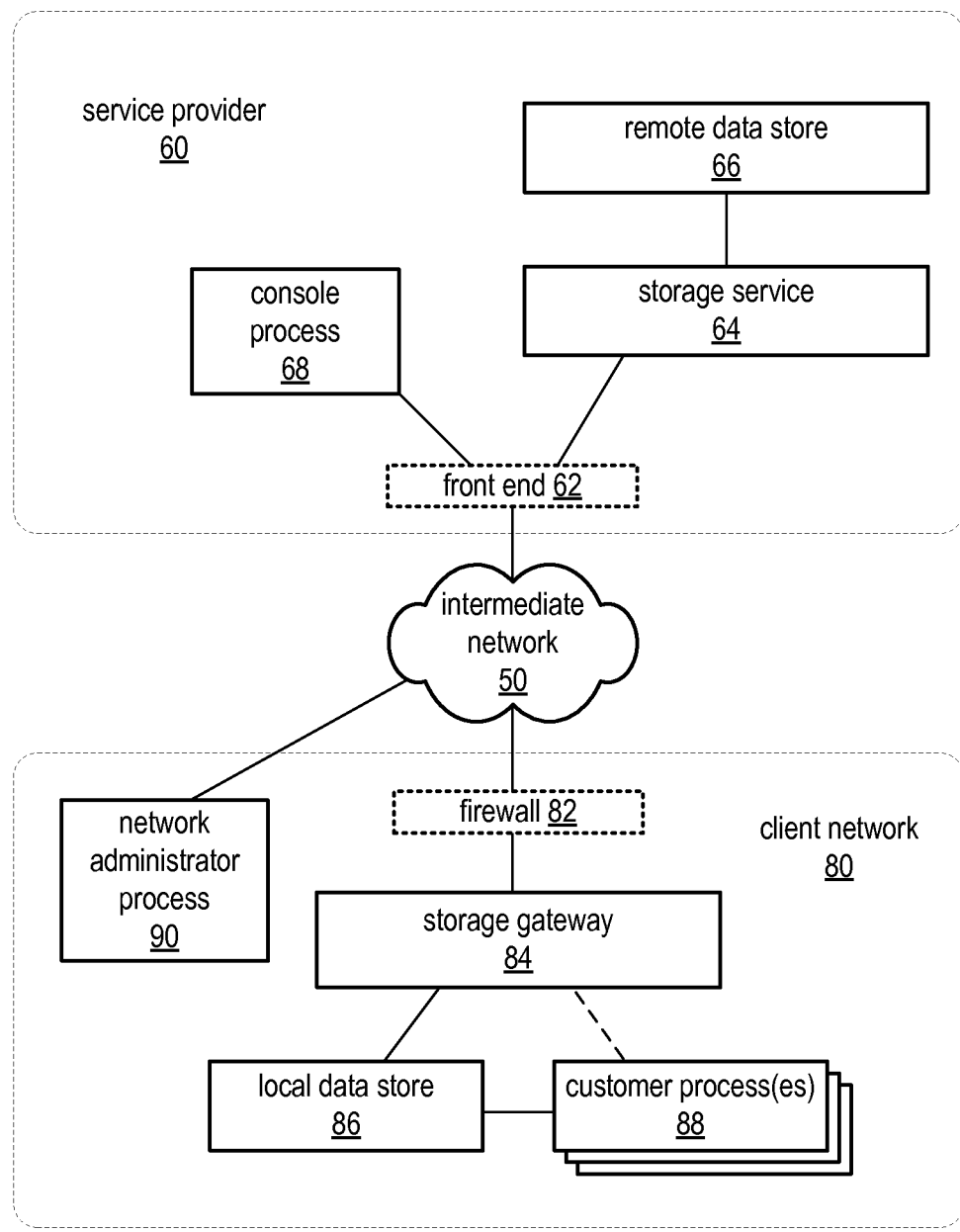
FIG. 1 is a high-level block diagram of an example networking environment that includes an example service provider and an example service customer, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods, apparatus, and computer-accessible storage media for providing a local gateway to remote storage are described. Embodiments of a storage gateway are described herein in the context of a service provider that provides, over an intermediate network such as the Internet, a storage service to one or more customers of the service provider. The storage gateway may be implemented as a virtual or physical appliance that is installed on-premise at a customer's data center and that acts as a gateway between the customer's data center and the storage service. The storage gateway may be configured as an interface to and local cache for a primary storage provided remotely via the storage service and/or as an interface that shadows primary storage implemented on the customer's network to remote storage provided by the storage service. The storage gateway may present standard data access interfaces to the customer's applications at the front-end of the appliance, convert the data accesses into storage service requests at the back-end of the appliance, and transfer the data over the network to the storage service according to the storage service interface. In at least some embodiments, the storage service interface may be implemented as a Web service interface.

Embodiments of the storage gateway may provide an on-premise interface to virtually unlimited, flexible, scalable remote storage provided via the storage service. The storage gateway may provide a cost-effective, flexible, and more easily scalable alternative to conventional on-premise storage solutions. While the cost of storage devices may be decreasing, the administrative and other hardware and software costs of conventional on-premise storage solutions have remained relatively constant, or in some cases increased. Embodiments of the storage gateway may allow customers of a service provider to lower the total cost of storage ownership, passing at least some administrative and other costs to the service provider.

In at least some embodiments, the storage service may store the customer's data in the remote data store according to block storage technology. In at least some embodiments, the storage gateway may expose block storage protocols (e.g., iSCSI, GNBD (Global Network Block Device), etc.), file storage protocols (e.g., NFS (Network File Storage), CIFS (Common Internet File System), etc.), and/or object storage protocols (e.g., REST (Representational State Transfer)) at the front-end to the customer's applications. A block storage protocol such as iSCSI enables direct access to the underlying data blocks of the remote data store.

Files written by an application to a remote data store via file storage protocols such as NFS or CIFS exposed by the storage gateway may be stored to the remote data store according to block storage technology. Through an exposed file storage protocol such as NFS and CIFS, the storage gateway presents the customer's data, stored in the remote data store according to block storage technology, to the customer's applications as files before they are transmitted from the gateway over the customer network to the customer's applications. The exposed block storage protocol, e.g. iSCSI, transfers the blocks to the customer's applications, thus requiring the application to handle interpretation of the data blocks into whatever format the application expects.

A block storage protocol such as iSCSI is a low-level block storage protocol, and thus may enable a wider range of use cases than file storage protocols such as NFS and CIFS. A block storage protocol may enable support for applications that typically write to a block store, such as Microsoft® SharePoint® and Oracle® databases, and may also be configured to provide underlying storage for CIFS or NFS file servers. Thus, in at least some embodiments of the storage gateway, a block storage protocol such as iSCSI may be employed as the exposed interface to customer applications.

FIG. 1 is a high-level block diagram of an example networking environment that includes an example service provider and an example service customer, according to at least some embodiments. A storage gateway 84 may be installed, activated, and configured as a virtual or physical appliance in the service customer local network or data center (e.g., client network 80) to provide one or more of several remote data storage functionalities to customer process(es) 88 on the client network 80. A customer process 88 may be any hardware, software, and/or combination thereof that exists on the client network 80 and that can connect to and communicate with the storage gateway 84 via the data protocol of the gateway 84's data ports (e.g., the iSCSI protocol). The storage gateway 84 may, for example, serve as an on-premise storage device and/or as an interface between the customer process(es) 88 on the client network 80 and a storage service 64 provided by service provider 60. Note that, in addition to a storage service 64, the service provider 60 may also provide other services, including but not limited to a hardware virtualization service, to customers of the service provider 60.

A customer of the service provider 60 may be referred to herein as a service customer or simply customer, and may be any entity that implements a computer network or networks, coupled to an intermediate network 50 such as the Internet, to provide networked computing services to one or more users on a local network or network, including one or more services remotely provided by service provider 60. A service customer may be a business enterprise, an educational entity, a government entity, or in general any entity that implements a computer network or networks that provide networked computing services to users. While FIG. 1 shows a single client network 80, there may be multiple client networks 80. Each client network 80 may correspond to a different service customer, or two or more client networks 80 may correspond to different data centers or localities of the same service customer, for example different regional offices of a business enterprise or different campuses of a school system. In at least some embodiments, each customer of the service provider 60 may have an account with the service provider 60, and may be provided with security credentials (e.g., an account name and/or identifier, password, etc.) via which one or more customer representatives (e.g., a client network administrator) may log in to interfaces (e.g., Web pages) to the service provider 60 to manage the customer's resources provided by one or more services, including but not limited to a storage service, offered by the service provider 60.

Figure 42:
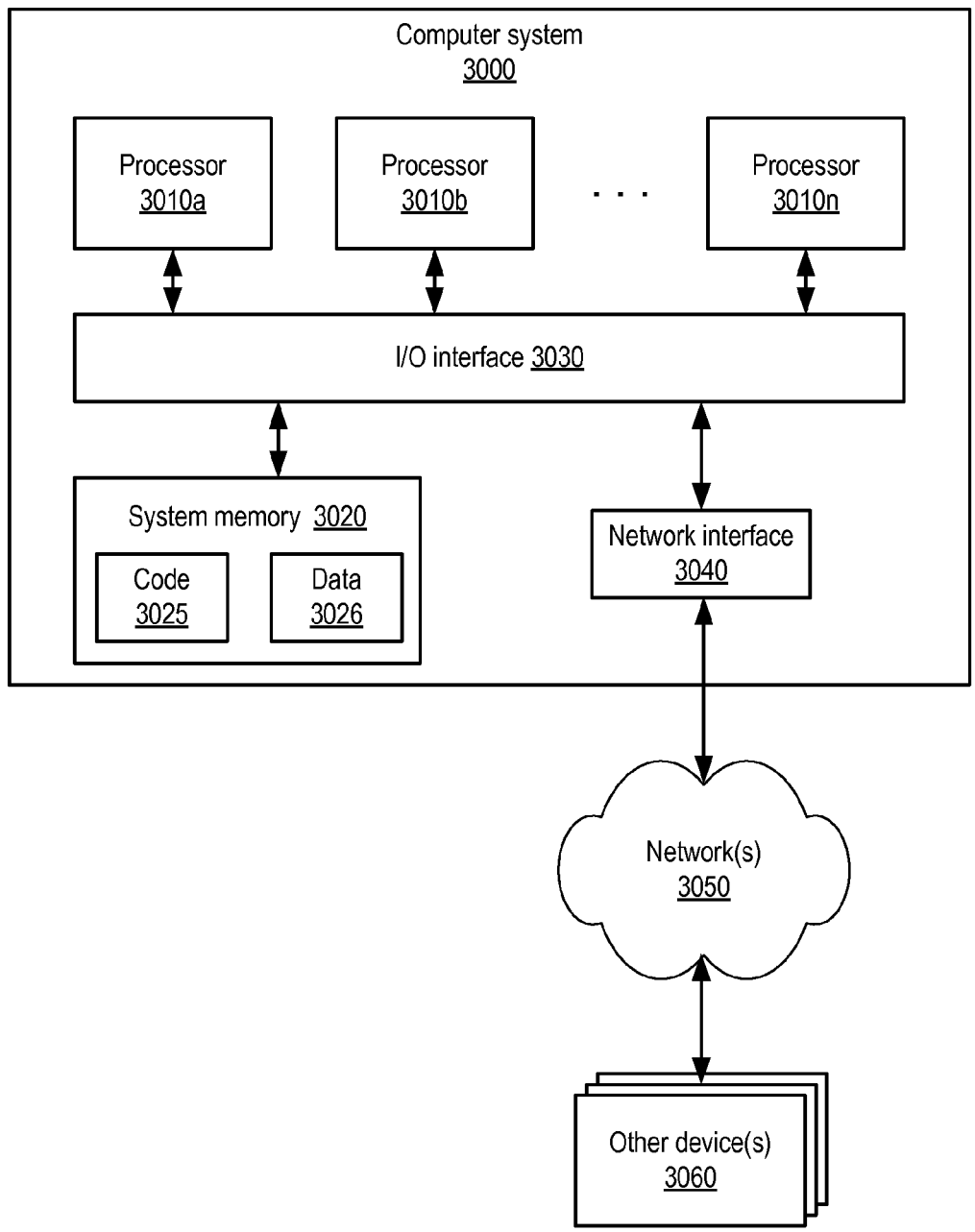
FIG. 42 is a block diagram illustrating an example computer system that may be used in some embodiments.

Embodiments of storage gateway 84 may be implemented in hardware, software, or a combination thereof. In at least some embodiments, storage gateway 84 may be implemented as a virtual appliance that may, for example, execute within a virtual machine instantiated on a host system. In at least some embodiments, storage gateway 84 may be implemented as a virtual appliance that may be downloaded or otherwise installed, activated, and configured on one or more computing devices such as server systems coupled to a local network infrastructure at a service customer's data center (e.g., client network 80). Alternatively, storage gateway 84 may be implemented as a dedicated device or appliance that may be coupled to a local network infrastructure at a service customer's data center (e.g., client network 80); the dedicated device or appliance may include software and/or hardware that implements the functionality of the storage gateway 84. FIG. 42 illustrates an example computer system on which embodiments of a storage gateway 84 may be implemented. In at least some implementations, storage gateway 84 communicates with the service provider 60 network via an intermediate network 50 (e.g., the Internet) through firewall 82 technology. Note that the service provider 60 network may also include front end 62 technology (e.g., firewall technology, border router technology, load balancer technology, etc.) through which network traffic from and to intermediate network 50 passes.

At least some embodiments of the storage gateway 84 may be implemented according to a security model that provides data protection for the customer as well as protection against misuse and unauthorized use (e.g., pirating) of the gateway 84 by the customer or third parties. Communications between the storage gateway 84 and the storage service 64 may be secured and encrypted. An activation process is described later in this document in which a newly installed storage gateway 84 initiates a connection with and is identified to the service provider 60 network to obtain security credentials. In at least some embodiments, during the activation process, the customer logs into the customer's account with the service provider 60 and provides information to the service provider 60 that is used in registering the gateway 84. However, the customer does not log in to the storage gateway 84, and therefore the customer's security credentials and other account information are not exposed on the gateway 84. This may minimize the security risk for the customer.

In at least some embodiments, an aspect of the security model is that the storage gateway 84 only accepts externally-initiated connections to one or more data ports (e.g., iSCSI ports) exposed to the customer process(es) 88 on the client network 80. The storage gateway initiates all other connections to external processes; external processes cannot initiate any other connections to the gateway. For example, in at least some embodiments, the storage gateway 84 initiates gateway management and other connections to the service provider 60; the service provider 60 does not initiate connections to the gateway 84. As another example, a client network 80's network administrator process 90 cannot directly connect to the storage gateway 84 to configure and manage the gateway 84. Instead, configuration and management of the storage gateway 84 by the network administrator process 90 may be performed through the service provider 60, for example via console process 68 on the service provider 60 network. Thus, in at least some embodiments, a user, network manager, or process (e.g., network administrator process 90 or customer process(es) 88) on the client network 80 cannot directly "log in" to the storage gateway 84, nor can a user, manager, or process on the service provider 60 network (e.g., console process 68 and storage service 64) or on some other external network initiate a connection to the storage gateway 84. This helps protect the security credentials and other operational information on the storage gateway 84 from being intentionally or unintentionally compromised by persons or processes on the client network 80 or by external persons or processes.

Embodiments of the storage gateway 84 may be installed, activated, and configured for use with a storage service 64 to provide one or more of several data store 66 functionalities. For example, a storage gateway 84 may be installed, activated, configured, and employed with a storage service 64 to serve as:

A file system gateway. In this configuration, the storage gateway serves as a NAS storage interface (e.g., using CIFS or NFS protocols) to the storage service 64. The remote data store 66 may be presented to the customer by the gateway 84 as an object store (e.g., REST), while the data store 66 is implemented according to block storage technology. In this configuration, the remote data store 66 may be presented to the customer as a virtualized file system to which the customer can write files and from which the customer can read files.

A cloud volume gateway. In this configuration, the storage gateway 84 serves as an interface to volume(s) implemented on remote data store 66 via the storage service 64. The remote data store 66 may be implemented using block storage technology. The gateway 84 provides local network access points, with the volume(s) on remote data store 66 (which may also be referred to as a cloud volume) serving as backend storage that provides flexible and essentially unlimited primary storage capacity. In this configuration, the remote data store 66 may be presented to the customer as a cloud volume system from which the customer can locally mount volumes for reading and writing data.

A shadowing gateway. In this configuration, the storage gateway 84 acts as a "bump in the wire" between a customer's applications (e.g., customer process(es) 88) and the customer's local data store 86 to provide shadowing of the customer's write data (e.g., iSCSI writes) to remote data store 66 via the storage service 84. The remote data store 66 may be implemented using block storage technology. In this configuration, the storage gateway 84 may serve as a shadowing appliance that shadows the customer's local data store to snapshot(s) on the remote data store 66. This shadowing may be performed transparently from the perspective of users on the local network. When necessary or desired, the customer may request or access snapshot(s) of the customer's data on the remote data store 66, for example to restore, recover, or copy portions or all of the customer's data from the snapshot(s) to a local store 86.

Note that the file system gateway and the cloud volume gateway are similar in that both serve as gateways to a remote data store, and both may locally cache data, e.g. frequently and/or recently used data. In both the file system gateway and the cloud volume gateway, data reads from customer processes may be serviced from the local cache, if possible, or from the remote data store if not. In contrast, in the shadowing gateway, data reads are passed through the gateway to the customer's local data store. For the purposes of this document, the file system gateway and cloud volume gateway may collectively be referred to as a cached gateway to distinguish these implementations from the shadowing gateway.

Example Storage Gateway Appliance Architecture

Figure 2:
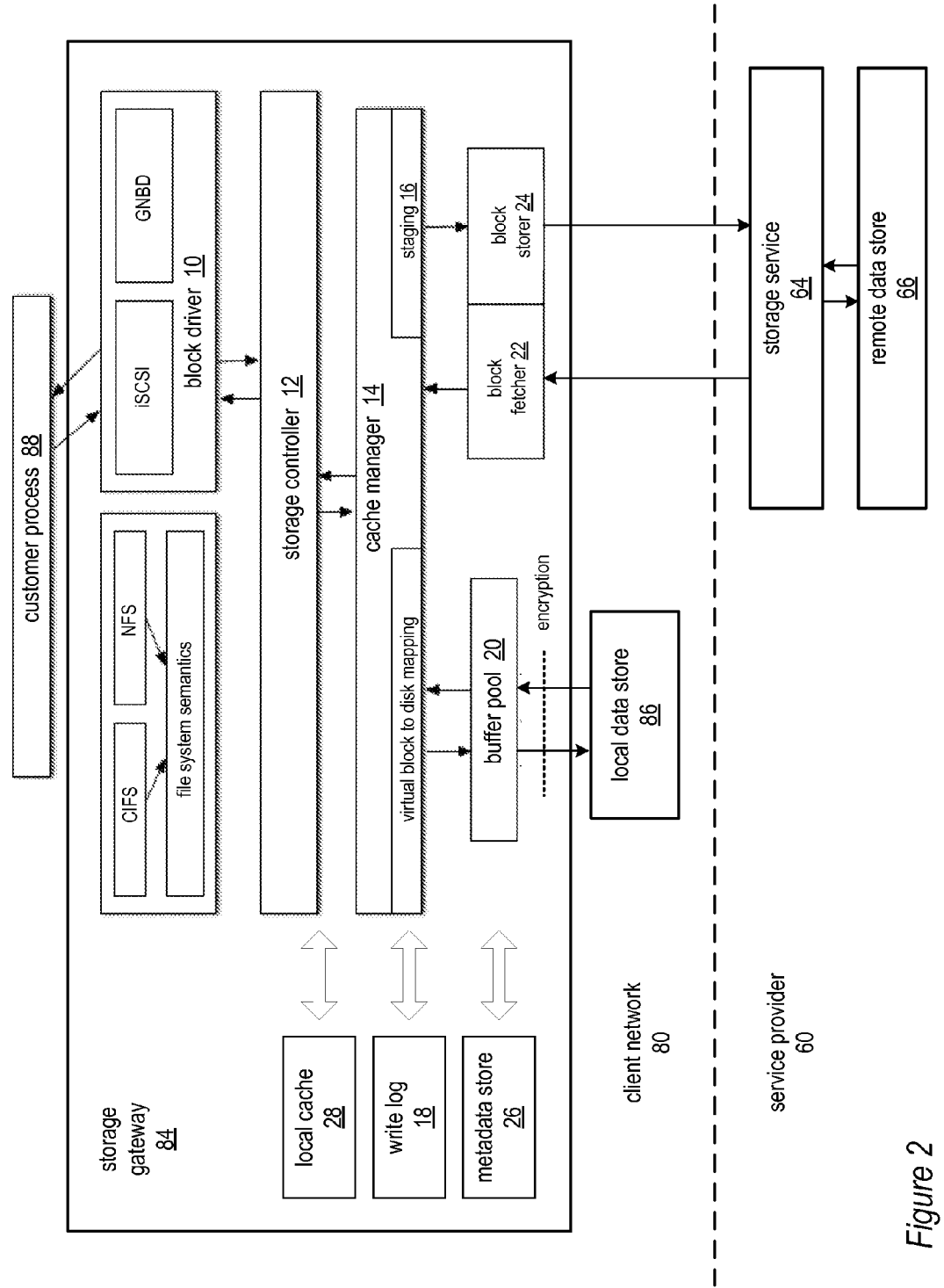
FIG. 2 illustrates an example architecture for and components of a storage gateway according to at least some embodiments.

FIG. 2 illustrates an example architecture for and components of a storage gateway according to at least some embodiments. Note that some of the components illustrated in FIG. 2 may not be used, or may be used or implemented differently, in shadowing gateway implementations when compared to cached gateway implementations.

Block driver 10 interfaces a customer process 88 with the storage gateway 84. generally, block driver 10 allows a customer process 88 to interact with the storage gateway 84 (e.g., via read/write requests). Since the storage gateway 84 is on-site with the customer process 88, from the perspective of the process 88 it appears that data is stored locally. However, the storage gateway 84 interfaces with storage service 64 to store the data to a remote data store 66 provided by the storage service 64. For cached gateways, the primary data store is remote data store 66, while frequently accessed data may be locally cached by the gateway 84. Reads may be satisfied from the local cache or from virtual data storage 66; writes are handled so as to appropriately update data blocks in the local cache and/or in virtual data storage 66. For shadowing gateways, the primary data store is local data store 86; reads are passed through to local data store 86, and writes are shadowed to virtual data storage 66 as well as being sent to local data store 86.

Block driver 10 intercepts read/write requests from the customer process 88 and passes the requests to the storage controller 12. In at least some embodiments, block driver 10 may provide a block storage protocol (e.g., iSCSI or GMBD) as an interface to the customer process 88. In some embodiments, instead of or as an alternative to a block storage protocol interface, block driver 10 may provide a file storage protocol interface (e.g., NFS or CIFS) and may use file system semantics as an interface to the storage controller 12.

Note that, while FIG. 2 shows one block driver 10, there may be more than one block driver.

Storage controller 12 acts as a mediator between block driver 10 and storage via a cache manager 14. Responsibilities of storage controller 12 may include forwarding read and write requests from block driver 10 to storage and callbacks to block driver 10 when storage responds with data. Block driver 10 may also maintain statistics such as the number of requests in progress.

In at least some embodiments, storage controller 12 on one storage gateway 84 may communicate with a cache manager 14 on another storage gateway 84. In at least some embodiments, each storage gateway 84 may send heartbeat messages for discovery and detecting failures. A consistent hashing may be used to identify the storage gateway 84 that is responsible for a given object, and the request to get data may be forwarded to the cache manager 14 on the target storage gateway 84. The cache manager 14 may respond by invoking a callback provided by storage controller 12.

In cached gateway embodiments, cache manager 14 may manage a local cache 28 that, for example, provides storage for frequently accessed data. Local cache 28 may be implemented on internal volatile and/or non-volatile memory of storage gateway 84, or alternatively may be implemented at least in part on an external local data store 86 provided by the customer. In at least some embodiments, the local cache 28 represents data stored in the virtualzied data storage 66; writes from a customer process 88 may not directly affect the local cache 28.

In at least some embodiments employing multiple gateways 84, a distributed local cache may be used, and consistent hashing on keys may be used to identify the cache responsible for holding a given key. In at least some embodiments, locality-aware request distribution may be used to reduce communication between the gateways 84, which may require additional load balancing.

All write requests to a given volume in the remote data store 66 may go to a particular gateway 84 node. Since all write requests for a volume are forwarded to a particular gateway 84 node, network partitioning may not be an issue.

Staging

In at least some embodiments, the cache manager 14 may include or may interface with a staging 16 component. Staging 16 may include or may have access to a write log 18. In at least some embodiments, a data structure may be built over the write log 18 and used as a metadata store 26. The metadata store 26 may allow quick access to all writes to a particular block. The metadata store 26 may, for example, be used in applying mutations to different segments within the block. When write data is received from the customer process 88, the data is appended to the write log 18. Metadata for the write data relative to a block, e.g. offset and length, may be stored to the metadata store 26. In at least some embodiments, write log 18 may be implemented as a one-dimensional data buffer implemented as either a linear or a circular queue. In at least some embodiments, metadata store 26 may be a key/value store, for example implemented as a Berkeley Database. Other implementations of both the write log 18 and the metadata store 26 may be used in some embodiments.

In cached gateway implementations, when a read is performed, the original block may be obtained from the local cache 28 or from the remote data store 66, and any pending mutations indicated by the write log 18 may be applied before returning the data to the respective customer process 88.

In some embodiments, if a gateway 84 fails (e.g. crashes), in-memory write data may be lost unless the data has already been written to the local data store 86. In some embodiments, if there are multiple gateways 84 at the customer site, another gateway 84 may take responsibility of keys owned by the crashed gateway 84, restore writes from a snapshot on local data store 86 if there are any, and start accepting requests directed to the respective volume. In some embodiments, a write log 18 and/or metadata store 26 may be replicated over two or more gateways 84 to provide redundancy and better durability. In case of failure of the gateway 84, one of the other gateways 84 may take over the failed gateway's write log 18 and metadata store 26. However, in at least some embodiments, the metadata store 26 may be maintained only on the owner gateway 84. In these embodiments, in case of failure of the gateway 84, one of the other gateways 84 may take over and parse the primary write log 18 to rebuild the metadata store 26.

In cached gateway implementations, block fetcher 22 fetches required segments of blocks from remote data store 66 via storage service 64. In at least some embodiments, block fetcher 22 may employ a lazy fetching technique to fetch complete blocks for caching. For both cached gateways and shadowing gateways, block store 24 pushes data from staging 16 to remote data store 66 via storage service 64. In at least some embodiments, block store 24 may employ a lazy pushing technique to push the blocks.

In at least some embodiments, during read operations for cached gateways, block driver 10 sends the read request including a volume ID, start offset and length to storage controller 12. In at least some embodiments, storage controller 12 may translate the volume ID and offset to an object key. Storage controller 12 may pass the read request information to cache controller 14, which may attempt to satisfy the read request from an appropriate local cache 28. If the data are not present in the local cache 28, the request is forwarded to block fetcher 22, which fetches the data from the appropriate volume on remote data store 66 via storage service 64. Once the data is obtained, local cache 28 is updated, mutations from write log 18 are applied, and a read response is returned to customer process 88. In at least some embodiments, if multiple blocks are requested, multiple read responses may be returned each indicating a relative offset for a respective block. In at least some embodiments, if sequential reads are detected, sequential blocks may be prefetched.

In at least some embodiments, during write operations, block driver 10 sends the write request including a volume ID and the write data to the storage controller 12 that is responsible for the volume. The write data is written to the write log 18, and metadata store 26 is updated to include a reference to the mutated data in buffer pool 20.

Buffer Pool

In at least some embodiments, a buffer pool 20 resides between storage controller 12 and local data store 86. Buffer pool 20 may perform one or more of, but not limited to, the following tasks. Note that some tasks may apply only to cached gateways:

Cache data for the logical offsets for write log 18 and local cache 28 from their physical locations on local data storage device(s).

Maintaining locks on buffers during read and write operations.

Applying an eviction technique, e.g. a least recently used (LRU) based eviction technique, on the physical storage for local cache 28. Note that this is not required for shadowing gateways.

For reads in cached gateways, if the requested data is not found in local cache 28, buffer pool 20 may communicate with block fetcher 22 to fetch the block from remote data store 66. Alternatively, in some embodiments, block fetcher 22 may communicate directly with storage service 64 to fetch blocks.

In at least some embodiments, buffer pool 20 may employ a database, for example a Berkeley database (BDB), as its metadata store 26. Table 1, shown below, shows information that may be stored in a metadata store 26, according to at least some embodiments. Note that the entries in Table 1 are not intended to be limiting according to content or arrangement.

TABLE 1

Example metadata store information

| Physical Disk/Offset | Type | Name | Offset | Last Used |
|---|---|---|---|---|
| <sdg/xxxxx> | F (Free) | N/A | N/A | N/A |
| <sdg/xxxxx> | B (Bad) | N/A | N/A | N/A |
| <sdg/xxxxx> | W (Write log) | N/A | write log offset | <time> |
| <sdg/xxxxx> | S (Snapshot) | snapshot ID | offset in volume | <time> |
| <sdg/xxxxx> | C (Chunk) | chunk ID | offset in volume | <time> |

In at least some embodiments, the physical disk offset is at a set boundary, for example at a 4 MB boundary. In at least some embodiments, this includes boundaries for data in both the volumes and in the write log 18. In at least some embodiments, the writes for a specific volume may be sequential writes, and thus fragmentation on disk may not need to be considered. Note that a "chunk" may correspond to a block, or to one or more blocks.

Note that the metadata store 26 may include both S (snapshot) and C (chunk) entries, and these need to be kept up-to-date with the scheme via which the storage controller 12 attempts to access blocks. For example, a block may be referred the first time using a snapshot ID, but every time after that using the chunk ID. This may be preserved in the metadata store 26. Upon a Snapshot Complete, storage controller 12 may refer to the blocks from the snapshot using the snapshot ID; hence, the C (chunk) entries in metadata store 26 may be converted into corresponding S (snapshot) entries.

Cached Gateway Operations

In at least some embodiments, when a read request is received, the write log 18 entry or entries for the block are looked up in the metadata store 26. If the read request can be satisfied using the write log 18 entry or entries, then all required entries are looked up in the metadata store 26, read into buffers, flattened, and the required pieces are returned. If the read request cannot be satisfied only using the write log 18 entry or entries, the offset for the cahce data block (e.g., a 4 MB block) is calculated from the offset in the read request. The location of the block is looked up in the metadata store 26. If the block is in local cache 28, the block is read from the local cache 28, and if not it is fetched from remote data store 66. The required write log 18 entries are fetched as described above, flattened with the block, and the required pieces are returned. If the block is fetched from remote data store 66, the block is cached to local cache 28 and recorded in the metadata store 26. The last access time for the block in the local cache 28 is also updated.

In at least some embodiments, when a write request is received, the mutations are recorded at the next write log 18 offset and the metadata, i.e. offset and length, is recorded in the metadata store 26.

In at least some embodiments, when a block upload completes, the latest version of the block (with the applied mutations) is added to the local cache 28 and recorded in the metadata store 26. If a previous version of the block is present in local cache 28, this block is marked as free in metadata store 26.

In at least some embodiments, when a snapshot completes, the metadata store 26 may need to be reorganized as described above. That is, the block entries belonging to the snapshot may be converted into the corresponding snapshot entries on the remote data store 66.

Shadowing Gateway Operations

In at least some embodiments, read requests are passed through to local data store 86.

In at least some embodiments, when a write request is received, the write data is recorded at the next write log 18 offset and the appropriate metadata for the write is recorded in the metadata store 26. The write request is also passed to the local data store 86.

In at least some embodiments, to upload a block to remote data store 66, an upload process calls buffer pool 20 to read the write log 18. The buffer pool 20 uses metadata store 26 to perform the translation from the logical write log 18 offset to the physical offset, and the data is then read into memory buffers. The buffers are then presented to the upload process. The upload process uploads the blocks to the remote data store 66 and releases the blocks to the buffer pool 20.

Write Log Purges

In at least some embodiments, if the write log 18 needs to be purged, buffer pool 20 obtains a write log offset for a volume for which the write log 18 can be purged. In at least some embodiments, the write log offset may be determined from metadata store 26, for example by performing a walk over the database which checks offsets for each entry. To purge the write log 18, the existing write log entries corresponding to the purgeable part of the log may be marked as free entries.

Example Implementations

Figure 3:
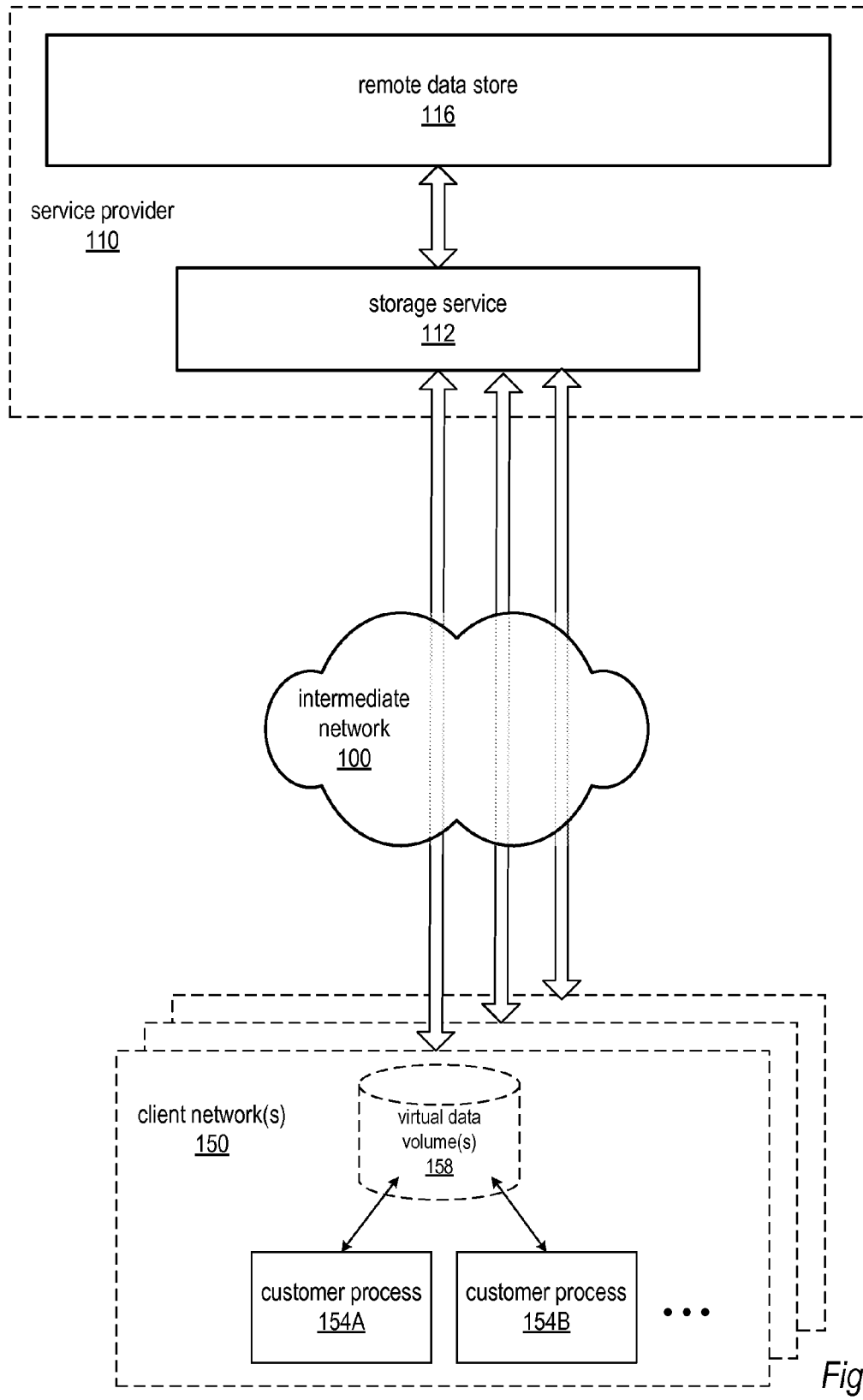
FIG. 3 is a high-level block diagram of an example network environment in which embodiments of a storage gateway may be implemented.

FIG. 3 is a high-level block diagram of an example network environment in which embodiments of a storage gateway may be implemented. A service provider 110 on an intermediate network 100 (e.g., the Internet) may provide one or more service customer networks (e.g., client network(s) 150), also coupled to intermediate network 100, access to a remote data store 116 via a storage service 112. Each client network 150 may correspond to a different service customer, or two or more client networks 150 may correspond to different data centers or localities of the same service customer, for example different regional offices of a business enterprise or different campuses of a school system. A service customer may be a business enterprise, an educational entity, a government entity, a private entity, or in general any entity that implements a computer network or networks, coupled to an intermediate network 100 such as the Internet, to provide networked computing services to one or more users. In some embodiments, storage service 112 may provide an interface, for example a Web service interface, via which each service customer's client network(s) 150 may access functionality provided by the storage service 112.

Customer processes 154A and 154B represent physical and/or virtual machines or systems connected to a client network 150 of a service customer. As an example of a function provided by storage service 112, a user, via a customer process 154, may create and mount data volumes in remote data store 116 via storage service 112. From the perspective of users on a client network 150, the data volumes provided by storage service 112 may appear as if they are local storage; hence, such a data volume may be referred to as a virtual data volume 158. A virtual data volume 158 actually maps to one or more physical storage devices or storage systems on which remote data store 116 is instantiated; however, this mapping is handled by the storage service 112, and is thus transparent from the perspective of the users on the client network 150. A user of a customer process 154 may simply see a volume mounted on the desktop or in a device listing. The user of a customer process 154 may create data, modify data, delete data, and in generally perform any data-related function on virtual data volume 158, just as if the volume 158 was implemented on a locally attached storage device.

Figure 4:
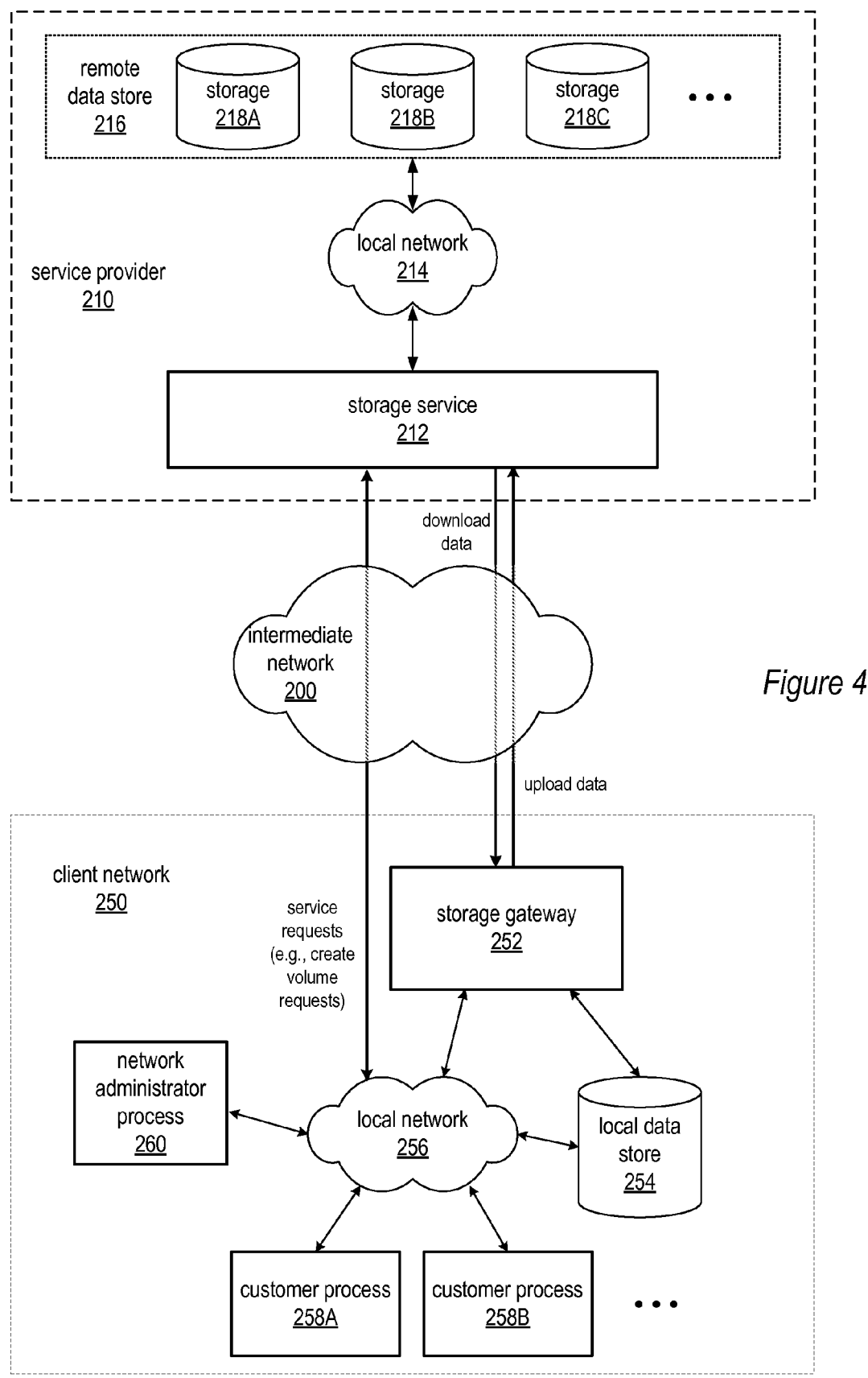
FIG. 4 is a block diagram of an example network environment that includes a storage gateway on site at a service customer network that serves as an interface between the service customer network and a storage service on a service provider network, according to at least some embodiments.

FIG. 4 is a block diagram of an example network environment that includes a storage gateway 252 on site at a service customer's client network 250 that serves as an interface between client network 250 and storage service 212, according to at least some embodiments. In at least some embodiments, storage gateway 252 may be a file and/or block storage appliance that is installed on-site at a service customer's data center.

Storage gateway 252 may, for example, be installed, activated, and configured to serve as a file system gateway, as a cloud volume gateway, collectively referred to as cached gateways, or as a shadowing gateway. A file system gateway serves as a NAS storage interface (e.g., using CIFS or NFS protocols) to the storage service 212. The remote data store 216 may be presented to the customer as an object store (e.g., REST), while actually implemented as block storage. A cloud volume gateway serves as an interface to virtualized volume storage provided by the storage service 212. The volume storage may be implemented as block storage. The gateway 252 provides local network access points, with the remote data store 216 (which may also be referred to as a cloud volume) serving as backend storage that provides flexible and essentially unlimited primary storage capacity. A shadowing gateway acts as a "bump in the wire" between a customer's applications and the customer's local data store to provide shadowing of the customer's write data (e.g., iSCSI writes) to remote storage provided by the storage service 212. The remote data store 216 may be implemented as block storage.

In cached gateway implementations, storage gateway 252 may store a local cache of frequently accessed data on a local data store 254, while securely encrypting and accelerating data movement back to service provider 210. Similarly, shadowing gateway implementations may securely encrypt and accelerate the movement of write data to service provider 210. This accelerated data movement, as compared to a standard Internet connection, may, for example, be achieved using one or more of data deduplication, compression, parallelization, and TCP window scaling techniques. Storage gateway 252 may significantly reduce the cost, utilization, maintenance, and provisioning headaches that are typically associated with managing on-site storage arrays as primary storage or backup storage. Storage gateway 252 may accomplish this by replacing the 100 s of terabytes to petabytes of data a customer may otherwise store in-house on expensive hardware, e.g. NAS or SAN hardware, with a cost-effective appliance. With the storage gateway 252, customers may benefit from the low access latencies of on-site storage (provided by the local cache maintained by the gateway 252 in cached gateway implementations) while leveraging the durable, available, and scalable distributed storage infrastructure provided by the service provider 210.

Embodiments of the storage gateway 252 may work seamlessly with customers' on-site applications. In at least some embodiments, customers may configure the storage gateway 252 to support SAN (iSCSI), NAS (NFS, Microsoft® CIFS), or Object (REST) storage. In at least some embodiments, an iSCSI interface provided by the storage gateway 252 may enable integration with on-site block storage applications such as Microsoft® SharePoint® and Oracle® databases. In at least some embodiments, customers may utilize NFS and CIFS interfaces provided by the storage gateway 252 to consolidate file storage across environments including, but not limited to, Windows, Linux, and UNIX environments. In at least some embodiments, the storage gateway 252 may also be configured to support REST-based requests.

In at least some embodiments, storage gateway 252 may be implemented as a virtual device or appliance that may be downloaded or otherwise installed, activated, and configured on one or more computing devices such as server systems coupled to the client network 250 infrastructure at a customer data center. Alternatively, storage gateway 252 may be implemented as a dedicated device or appliance that may be coupled to the client network 250 infrastructure; the dedicated device or appliance may include software and/or hardware on which functionality of the gateway may be implemented.

In at least some implementations, storage gateway 252 communicates with the service provider 210 network via an intermediate network 200 (e.g., the Internet). The coupling of storage gateway 252 to intermediate network 200 may generally be via a high-bandwidth connection provided by the service customer's client network 250, as large amounts of data may be transferred across intermediate network 200 between storage service 212 and storage gateway 252. For example, at peak times, the connection may need to support the transfer of data at rates of 100 megabits/second (100 Mbit/s) or higher. However, in at least some embodiments, techniques such as a data deduplication technique may be employed to reduce bandwidth usage when uploading data from storage gateway 252 to storage service 212, and thus more of the connection's bandwidth may be available for other applications. Example data deduplication techniques that may be employed in at least some embodiments are described in U.S. patent application Ser. No. 12/981,393, titled "RECEIVER-SIDE DATA DEDUPLICATION IN DATA SYSTEMS," which is hereby incorporated by reference in its entirety, and in U.S. patent application Ser. No. 12/981,397, titled "REDUCED BANDWIDTH DATA UPLOADING IN DATA SYSTEMS," which is hereby incorporated by reference in its entirety.

In at least some embodiments, bandwidth on a connection between client network 250 and service provider 210 over intermediate network 200 may be allocated to storage gateway 252, and to other customer applications, for example via a network administrator process 260 at client network 250. Storage gateway 252 may continuously or nearly continuously upload mutated (new or changed) data to storage service 212, for example according to a data deduplication technique. However, the mutation rate of data at client network 250 may vary over time; for example, during the day, the customer process write throughput may be higher, while at night the write throughput may be lower. Thus, at busy times when the mutation rate is high, storage gateway 252 may fall behind in uploading the mutated data if the bandwidth allocated to the storage gateway 252 is not high enough to keep up; storage gateway 252 may then catch up at less busy times when the mutation rate is not as high. In at least some embodiments, if the storage gateway 252 falls behind more than a specified threshold, the storage gateway 252 may request the allocation of additional bandwidth. In at least some embodiments, the storage gateway 252 may raise an alarm to demand more bandwidth, if necessary.

While FIG. 4 shows a direct connection between storage gateway 252 and storage service 212, note that the connection between storage gateway 252 and storage service 212 may go through local network 256.

In at least some embodiments of a storage gateway 252, rather than retrieving data from remote data store 216 on demand, large blocks or chunks of data, even entire volumes of data, may be locally cached to a local data store 254. Storage gateway 252 may include or may have access to physical data storage and/or memory (local data store 254) on which a local cache of data, for example frequently-accessed data or critical data, may be maintained. Local data store 254 may be volatile or non-volatile storage or memory, or a combination thereof. Maintaining a local cache of frequently accessed data may generally improve data access times for customer processes 258, since many or most data accesses can be serviced from the local cache, rather than retrieving the data from remote data store 216. However, remote data store 216 may serve as the primary data store for the service customer's client network 250; thus, storage gateway 252 may communicate with storage service 212 via an intermediate network 200 to periodically, aperiodically, or continuously upload new or modified data from the local cache to remote data store 216, and to download requested data from remote data store 216 when necessary.

In FIG. 4, storage (218A, 218B, 218C, ...) of remote data store 216 illustrates that the remote data store 216 may be implemented on or across several storage devices or systems connected to a local network 214 of service provider 210. Thus, a service customer's data may be spread across two or more physical storage devices or systems on the "back end." The back end storage devices may be, but are not necessarily, multi-tenant devices that are shared with other customers. However, as noted in reference to FIG. 3, from the perspective of the users and processes on client network 250, the client's data may be presented as virtual volumes or files.

In at least some embodiments, a service provider as described in reference to FIGS. 3 and 4 may also provide hardware virtualization technologies and possibly other virtualization technologies to customers. A service provider 200 may provide a range of virtualized computing technology and virtualized storage technology, including block storage technology that provides block storage capabilities (i.e., a block-based storage system) to customers. Virtual computing environments or systems, implemented according to the hardware virtualization technology provided by the service provider 200, may be supported by the block storage technology. The block storage technology may provide a virtualized storage system that, for example, is able to interact with virtual computing systems through standardized storage calls that render the block-level storage functionally agnostic to the structural and functional details of the volumes that it supports and to the operating systems executing on the virtual computing systems (or other systems) to which it provides storage availability.

Embodiments of a storage gateway 252 may integrate with on-site customer applications and the virtualized computing and storage technology provided by service provider 200, providing customers with access to elastic "cloud-based" computing and storage resources. For example, customers using the storage gateway 252 for SAN storage may create consistent, point-in-time block-based snapshots of their data. These snapshots may then be processed by hardware virtualization technology applications or instances (see, e.g., virtual computing system(s) 264 in FIG. 5) requiring the high I/O and low latency data access that a block-based storage system provides. As another example, customers may configure the storage gateway 252 for NAS storage via NFS or CIFS file protocols, and may create point-in-time snapshots of their file data accessible from hardware virtualization technology instances.

In some embodiments, objects written using a REST-based interface provided by storage gateway 252 may be accessed directly from virtualized storage technology provided by the service provider via HTTP or other protocols, or may be distributed using integrated content delivery technology provided by the service provider. In some embodiments, customers may also utilize highly scalable, distributed infrastructure provided by the virtualized storage technology for parallelized processing of these objects on hardware virtualization technology instances.

Figure 5:
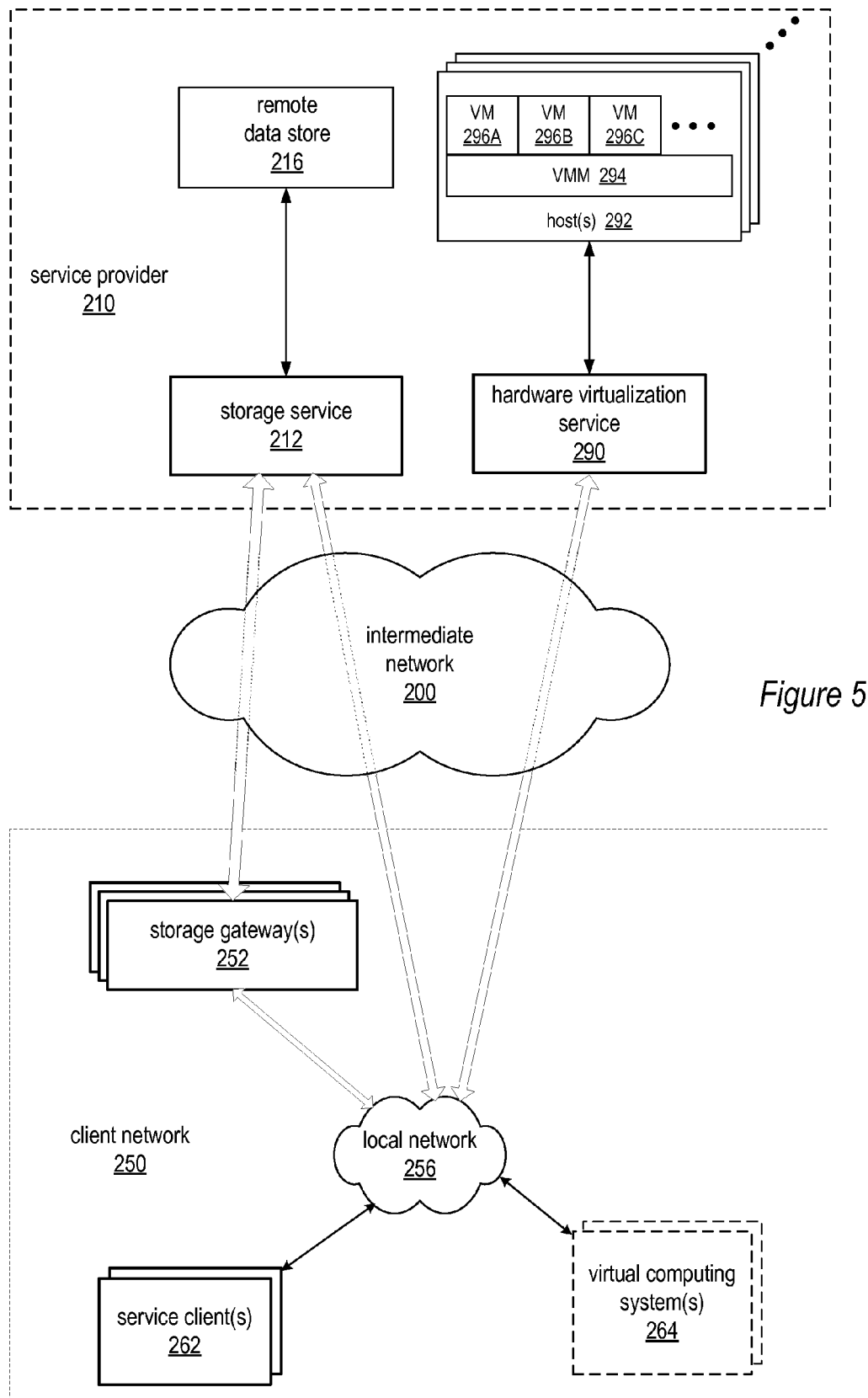
FIG. 5 is a block diagram of an example service provider that provides a storage service and a hardware virtualization service to customers of the service provider, according to at least some embodiments.

FIG. 5 is a block diagram of an example service provider that provides a storage service and a hardware virtualization service to customers of the service provider, according to at least some embodiments. A service customer's client network 250 may include one or more storage gateways 252 that serve as interfaces between client network 250 and storage service 212 of service provider 210, for example as described in reference to FIG. 4. Service client(s) may represent any administrator, user, or process that may access one of the services provided by service provider 210.

Hardware virtualization technology may enable multiple operating systems to run concurrently on a host computer 292, i.e. as virtual machines (VMs) 296 on the host 292. The VMs 296 may, for example, be rented or leased to the customers of the service provider 210. A hypervisor, or virtual machine monitor (VMM) 294, on a host 292 presents the VMs 296 on the host 292 with a virtual platform and monitors the execution of the VMs 296. Each VM 296 may be provided with one or more IP addresses; the VMM 294 on a host 292 may be aware of the IP addresses of the VMs 296 on the host. A local network of service provider 210 may be configured to route packets from the VMs 296 to Internet destinations (e.g., to service client(s) 262 on client network 250), and from Internet sources (e.g., service client(s) 262) to the VMs 296.

Service provider 210 may provide a service customer's client network 250, coupled to intermediate network 200 via local network 256, the ability to implement virtual computing systems 264 via a hardware virtualization service 290 coupled to intermediate network 200 and to the local network of service provider 210. In some embodiments, hardware virtualization service 290 may provide an interface, for example a Web service interface, via which a service client 262 may access functionality provided by the hardware virtualization service 290. At the service provider 210, each virtual computing system 264 may represent a virtual machine (VM) 296 on a host 292 system that is leased, rented, or otherwise provided to a service customer.

From an instance of a virtual computing system 264, a user may access the functionality of storage service 212 as previously described. Thus, embodiments of a virtualized system as illustrated in FIG. 5 may allow a client to create local instances of virtual computing systems 264 implemented on VMs 296 provided by the service provider 210, and to access data from and store data to a remote data store 216 implemented by the service provider 210, from the local instances of the virtual computing systems 264.

As previously described, one or more storage gateways 252 may be instantiated at the client network 250. At least one of the gateways 252 may be a cached gateway implementation that locally caches at least some data, for example frequently accessed or critical data. The storage gateway(s) 252 may communicate with storage service 212 via one or more high-bandwidth communications channels, for example to upload new or modified data from the local cache so that the primary store of data (the remote data store 216) is maintained in cached gateway implementations, or to upload new or modified data (write data) to a snapshot of a local primary data store on remote data store 216 in shadowing gateway implementations.

Cached Gateway Implementations

Figure 6:
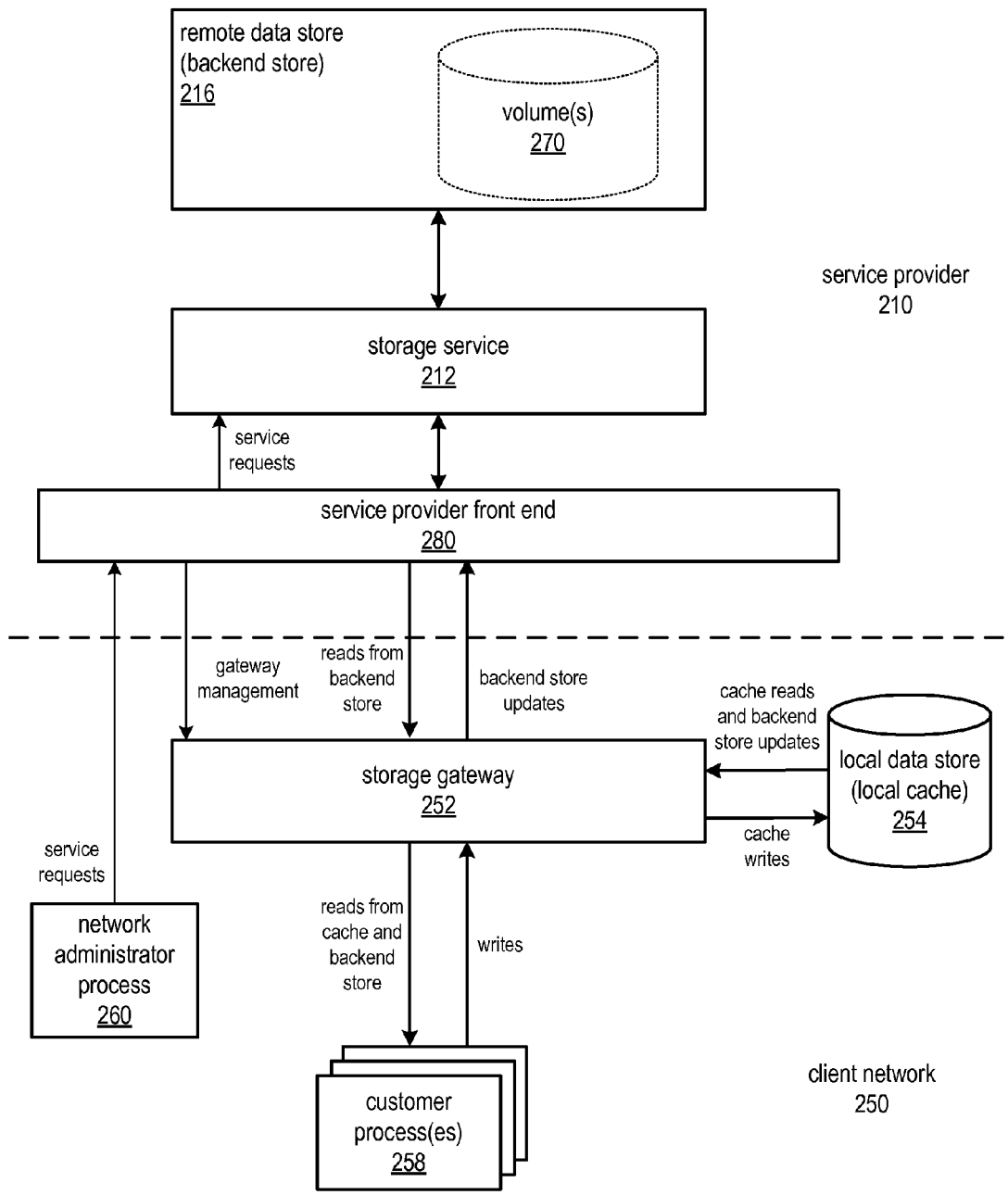
FIG. 6 is a high-level block diagram that broadly illustrates the architecture of and data flow in an example network environment in which an embodiment of a storage gateway is configured as a cached gateway.

FIG. 6 is a high-level block diagram that broadly illustrates the architecture of and data flow in an example network environment in which an embodiment of a storage gateway is configured as a file system gateway or as a cloud volume gateway, which may be collectively referred to as cached gateways. In at least some embodiments, storage gateway 252 may be a file and/or block storage appliance that is installed on-site at a service customer's data center. In FIG. 6, storage gateway 252 may, for example, be installed, activated, and configured to serve as a file system gateway or as a cloud volume gateway. A file system gateway serves as a NAS storage interface (e.g., using CIFS or NFS protocols) to the storage service 212. The remote data store 216 may be presented to the customer as an object store (e.g., REST), while implemented as block storage. A cloud volume gateway serves as an interface to virtualized volume storage provided by the storage service 212. The virtualized volume storage may be implemented as block storage. The gateway 252 provides local network access points, with the remote data store 216 (which may also be referred to as a cloud volume) serving as backend storage that provides flexible and essentially unlimited primary storage capacity.

Once storage gateway 252 is installed, activated, and configured, a network administrator process 260 of client network 250 may, for example, create new data volumes 270 or mount existing data volumes 270 on remote data store 216 via storage service 212. Create volume requests and other service requests may be made to the service 212 via service provider front end 280. The front end 280 may also manage connections and communications to and from storage gateway 252. The front end 280 may include one or more of, but is not limited to, firewalls, border routers, load balancers, gateway servers, gateway proxies, console processes, and in general any networking device and/or process that may be necessary to expose the storage service 212 to client network(s) 250 and to interface the storage service 212 to storage gateway(s) 252.

In at least some embodiments, storage gateway 252 initiates all connections to the service provider 210 via service provider front end 280; the service provider 210 does not initiate connections to the gateway 252. In addition, the network administrator process 260 does not initiate connections directly to the gateway 252; access by the network administrator process 260 to the gateway 252, for example to configure and manage the gateway 252, is through the service provider 210 via service provider front end 280.

Storage gateway 252 exposes one or more data ports (e.g., iSCSI ports) to the customer process(es) 258 on the client network 250. A customer process 258 may be any hardware, software, and/or combination thereof that exists on the client network 250 and that can connect to and communicate with the storage gateway 252 via the data protocol of the gateway 252's data ports (e.g., the iSCSI protocol). A customer process 258 may be, for example, a storage application such as Microsoft® SharePoint® and Oracle® databases, a server (e.g., an SQL server, a Microsoft® Exchange® server, etc.), a database application (e.g., an SQL database application, and Oracle® database application), a Microsoft® Exchange® application, or any other application or process executing on one or more devices on the client network 250 that is operable to communicate with the storage gateway 252 data port(s).

Note that a customer process, as used herein, encompasses any software process that may be executing on one or more devices in the client network 250; however, the underlying hardware on which the process executes may be involved in or perform the connections and communications to the storage gateway 252 data port(s) on behalf of the process.

A mounted volume 270 may be presented to the customer process(es) 258 by storage gateway 252. Customer process(es) 258 may then perform reads from and writes to the volume 270 via the data ports exposed by the storage gateway 252, for example according to iSCSI protocol. Storage gateway 252 handles all read and write requests to volume 270. While the volume(s) 270 on remote data store 216 serves as the primary data store, storage gateway 252 may also store a local cache of frequently accessed data on a local data store 254. Local data store 254 may be implemented on storage hardware internal to the storage gateway 252, on storage hardware external to the storage gateway 252 provided by the service customer, or on a combination thereof.

For reads, storage gateway 252 may first check the local cache to see if a given read can be satisfied from the cache. If the read cannot be satisfied from the local cache, then storage gateway 252 may request the data from storage service 212, which gets the requested data (or a block or chunk of data that includes the requested data) from remote data store 216 and returns the requested data to the storage gateway 252. Storage gateway 252 may store the block or chunk of data received from storage service 212 to the local cache.

For writes, storage gateway 252 may write the new or updated data to the local cache. In at least some embodiments, the write data may be appended to a block-based write log implemented in the local cache. Storage gateway 252 may include a sender-side data upload process (not shown) that communicates with a receiver-side data upload process (not shown) at service provider 210 to periodically, aperiodically, or continuously upload new or modified data in the local cache to the primary data store 216. The uploading of write data from the write log may be performed asynchronously to the processing of the read and write operations from the initiating processes to the local data store 254. In at least some embodiments, this upload process may employ one or more of data deduplication, compression, parallelization, and TCP window scaling techniques. Example data deduplication techniques that may be employed in at least some embodiments as illustrated in FIG. 6 are described in U.S. patent application Ser. No. 12/981,393 and Ser. No. 12/981,397, which were previously incorporated by reference in their entireties.

The local cache may be limited in size, while the remote data store 216 may provide essentially unlimited storage space. Thus, storage gateway 252 may remove, replace, or overwrite older and/or relatively inactive data blocks in the local cache with newer and/or active data blocks.

Shadowing Gateway Implementations

Figure 7:
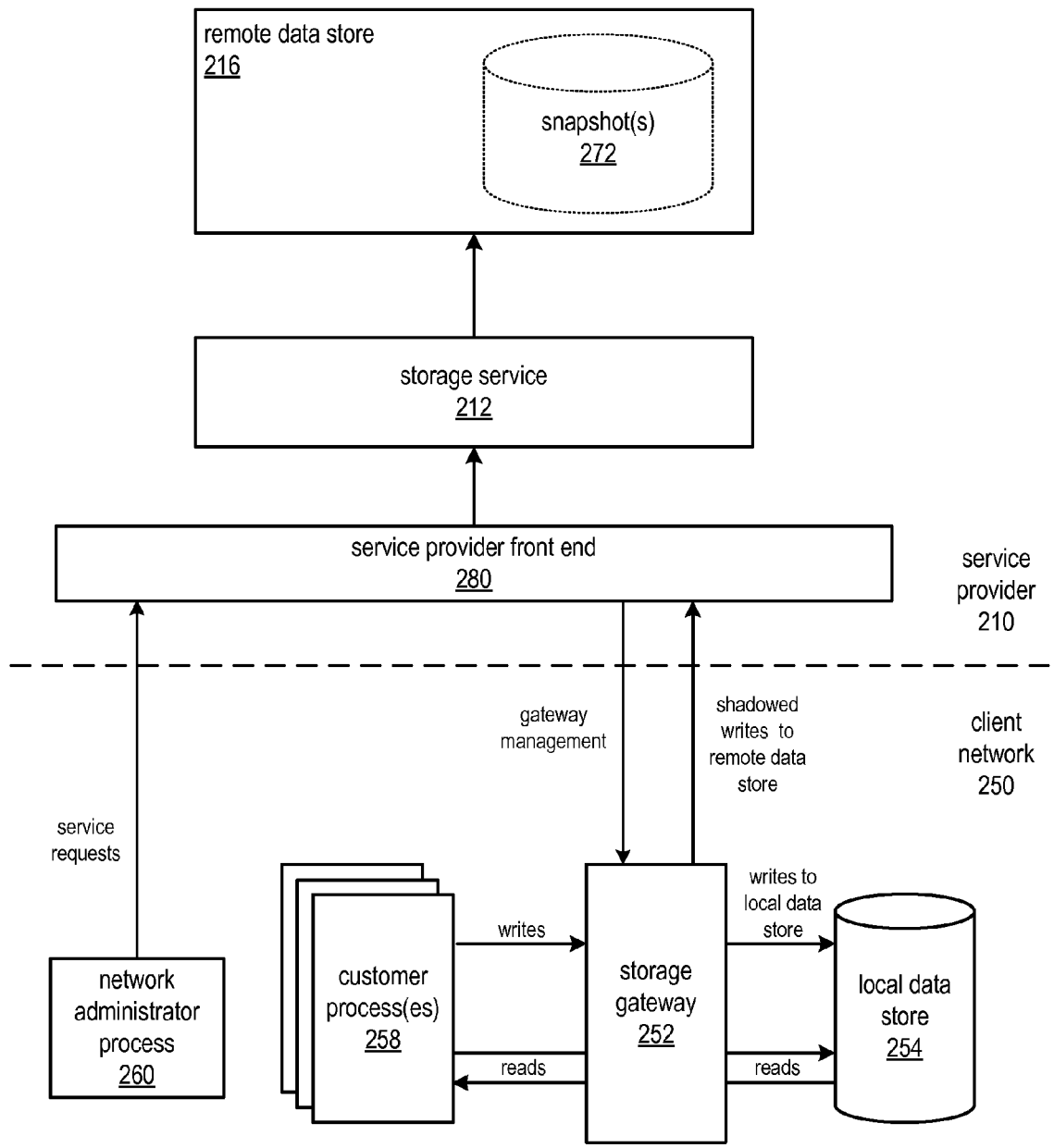
FIG. 7 is a high-level block diagram that broadly illustrates the architecture of and data flow in an example network environment in which an embodiment of a storage gateway is configured as a shadowing gateway.

FIG. 7 is a high-level block diagram that broadly illustrates the architecture of and data flow in an example network environment in which an embodiment of a storage gateway is configured as a shadowing gateway. In FIG. 7, storage gateway 252 may be installed, activated, and configured to serve as a shadowing gateway that acts as a "bump in the wire" between a customer's applications and the customer's local data store to provide shadowing of the customer's write data (e.g., iSCSI writes) to remote storage provided by the storage service 212. The remote data store 216 may be implemented as block storage.

In the embodiment illustrated in FIG. 7, local data store 254 serves as the primary data store for the customer process(es)

258 on client network 250, in contrast to the cached gateway implementation in FIG. 6 where remote data store 216 serves as the primary data store. Once storage gateway 252 is installed, activated, and configured as a shadowing gateway, the storage gateway 252 exposes one or more data ports (e.g., iSCSI ports) to the customer process(es) 258 on the client network 250. The customer process(es) 258 on client network 250 may then read from and write to the local data store 254 via the storage gateway 252 data port(s). A customer process 258 may be any hardware, software, and/or combination thereof that exists on the client network 250 and that can connect to and communicate with the storage gateway 252 via the data protocol of the gateway 252's data ports (e.g., the iSCSI protocol). A customer process 258 may be, for example, a storage application such as Microsoft® SharePoint® and Oracle® databases, a server (e.g., an SQL server, a Microsoft® Exchange® server, etc.), a database application (e.g., an SQL database application, and Oracle® database application), a Microsoft® Exchange® application, or any other application or process executing on one or more devices on the client network 250 that is operable to communicate with the storage gateway 252 data port(s). Note that a customer process, as used herein, encompasses any software process that may be executing on one or more devices in the client network 250; however, the underlying hardware on which the customer process executes may be involved in or perform the connections and communications to the storage gateway 252 data port(s) on behalf of the process.

The read and write requests may be received by the gateway 252 data port(s). For reads, the requests may be passed directly to the local data store 254 without further interference or processing by gateway 252, and the requested data may be passed directly from local data store 254 to customer process 258. Write requests directed to the local data store 254 are also passed to the local data store 254 by storage gateway 252. However, in addition to passing the write requests to the local data store 254, the storage gateway 252 may shadow the new or updated data indicated by the write requests to the remote data store 216 via the storage service 212.

In at least some embodiments, to shadow new or updated data to the remote data store 216, storage gateway 252 may locally store or buffer the write data to be uploaded to the to the remote data store 216, for example in a first-in-first-out (FIFO) write log. In at least some embodiments, the write log may be implemented in a block storage format, with the write log comprising one or more blocks (e.g., 4 MB blocks). Write data received in the write requests may be appended to the write log. The write data from two or more write requests may be written to the same block in the write log. Metadata for the write data relative to a block, e.g. offset in the write log block and length, as well as an offset in the target data store, may be stored to a metadata store.

Storage gateway 252 may include a sender-side data upload process (not shown) that communicates with a receiver-side data upload process (not shown) at service provider 210 to periodically, aperiodically, or continuously upload the locally stored write data from the write log to the shadowed data volume at remote data store 216. The uploading of write data from the write log may be performed asynchronously to the processing of the read and write operations from the initiating processes to the local data store 254. The upload process may upload the write data from the write log in blocks. Once a write log block has been successfully uploaded, the corresponding block may be marked as free in the write log.

In at least some embodiments, the upload process may employ one or more of data deduplication, compression, parallelization, and TCP window scaling techniques. Example data deduplication techniques that may be employed in at least some embodiments as illustrated in FIG. 7 are described in U.S. patent application Ser. No. 12/981,393 and Ser. No. 12/981,397, which were previously incorporated by reference in their entireties.

Note that a service provider front end 280 may manage connections to storage gateway 252. In at least some embodiments, storage gateway 252 initiates connections to the service provider 210 via front end 280; the service provider 210 does not initiate connections to the gateway 252. The front end 280 may include one or more of, but is not limited to, firewalls, border routers, load balancers, gateway servers, gateway proxies, console processes, and in general any networking device and/or process that may be necessary to expose the storage service 212 to client network(s) 250 and to interface the storage service 212 to storage gateway(s) 252.

In at least some embodiments, storage gateway 252 initiates all connections to the service provider 210 via service provider front end 280; the service provider 210 does not initiate connections to the gateway 252. In addition, the network administrator process 260 does not initiate connections directly to the gateway 252; access by the network administrator process 260 to the gateway 252, for example to configure and manage the gateway 252, is through the service provider 210 via service provider front end 280.

As a shadowing gateway, the shadowing operations provided by the storage gateway 252 may be effectively transparent from the perspective of users on the client network 250. The customer process(es) 258 perform reads and writes to the data port(s) (e.g., iSCSI port(s)) exposed by the storage gateway 252 on the client network 250. From the customer process 258 perspective, the storage gateway 252 may appear as any other data target (e.g., iSCSI target). Read requests from the customer process(es) 258 received on the data port(s) are passed on to the local data store 254 that serves as the primary data store. Write requests from the customer process(es) 258 received on the data port(s) are passed on to the local data store 254 and shadowed to the remote data store 216. The shadowing operations of the gateway 252 may be performed in the background without significantly affecting performance of the primary data store or of the client network 250.

An example use case for the "bump in the wire" shadowing gateway configuration illustrated in FIG. 7 is for disaster recovery. Storage gateway 252 sends updates of data from client network 250 to storage service 212, which stores the data in a shadow volume or volumes, also referred to as a snapshot 270. The data may be stored in the snapshot 270 in a block storage format. The data are also stored to a local data store 254. If something happens that results in the corruption or loss of a portion or all of a locally stored volume, the corrupted or lost data may be recovered from a snapshot 270 of the volume stored in data store 216. Storage provider 210 may provide an interface via which a customer network administrator (e.g., via network administrator process 260) may request the recovery of a snapshot 270 of a portion or all of a locally stored volume from a shadowed volume on remote data store 216. In at least some embodiments, at least a portion of the write log maintained by storage gateway 252 may be uploaded to the remote data store 216 prior to recovering a snapshot 270 of the data to ensure that the shadowed volume from which data is to be recovered is as up-to-date as possible. Note that, in some cases, at least some data may be recovered directly from the write log maintained by storage gateway 252.

Customer Process-Gateway Communications

As previously described, a customer administrator, via network administrator process 260, may communicate with storage gateway 252 (e.g., a shadowing gateway) via the service provider 280 front end, for example to configure the gateway 252. In at least some embodiments, one or more customer processes 258 may also be configured to communicate with the storage gateway 252 via the service provider 280 front end to make requests of the gateway 252. For example, a customer process 258 may be an SQL server that is configured to communicate with storage gateway 252 via the service provider 280 front end.

Shadowing Gateway Bootstrapping Techniques

As illustrated in FIG. 7, once storage gateway 252 is installed, activated, and configured as a shadowing gateway, the storage gateway 252 exposes one or more data ports (e.g., iSCSI ports) to the customer process(es) 258 on the client network 250. The customer process(es) 258 on client network 250 may then read from and write to the local data store 254 via the storage gateway 252 data port(s). The read and write requests are passed to the local data store 254, and the write data indicated by the write requests are shadowed to the remote data store 216 so that snapshot(s) 272 of the local data store may be updated.

However, when a shadowing gateway comes online in a customer's network, either when initially installed, activated and configured or after being offline for some reason, there may be data in the local data store 254 that is not in the snapshot(s) 272 on the remote data store 216. Thus, at least some embodiments may provide a bootstrapping process for shadowing gateways during which at least some data from the local data store 254 may be uploaded to the remote data store 216 so that the snapshot(s) can be populated and/or updated to accurately reflect the data that is currently on the local data store 254.

Figure 8:
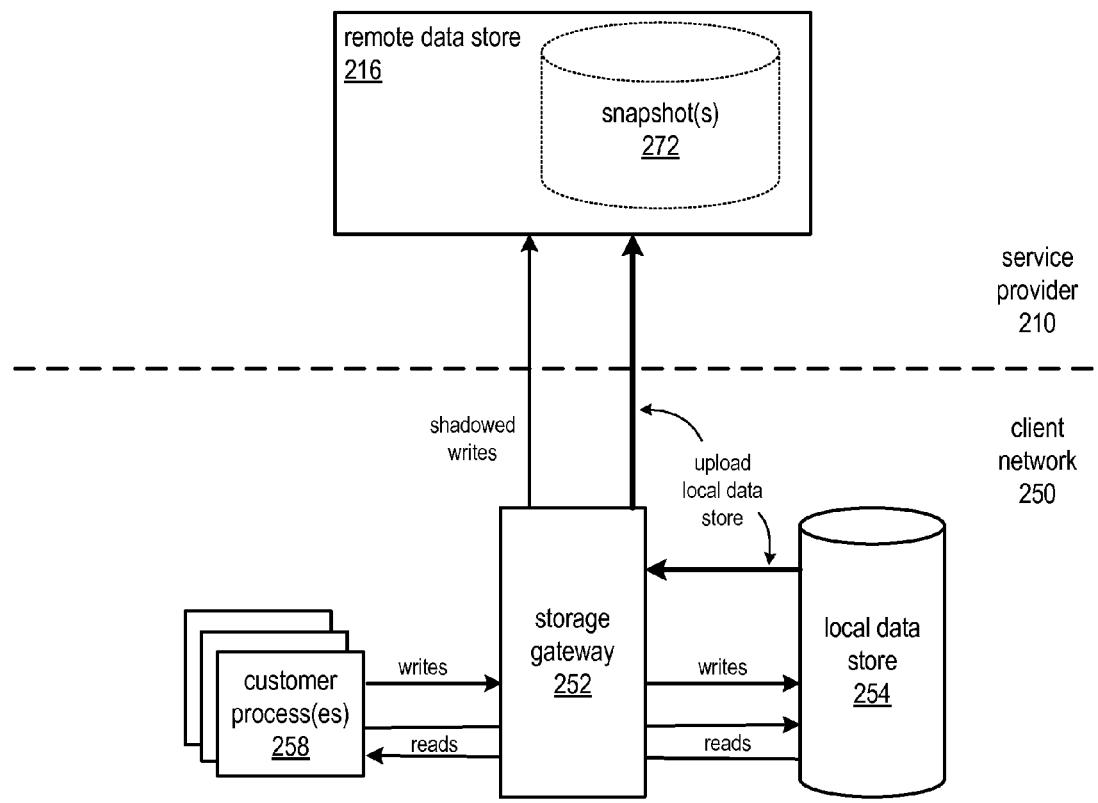
FIG. 8 is a high-level block diagram that broadly illustrates bootstrapping a shadowing gateway in an example network environment, according to at least some embodiments.

FIG. 8 is a high-level block diagram that broadly illustrates bootstrapping a shadowing gateway in an example network environment, according to at least some embodiments. When storage gateway 252 comes online as a shadowing gateway on the client network 250, the gateway 252 may determine that there is data in the local data store 254 that needs to be uploaded to the remote data store 216 to make the snapshot 272 consistent with the local data store 254. An upload process of the gateway 252 may then begin to upload blocks of data from the local data store 254 to the remote data store 216 at service provider 210. The storage gateway 252 may also expose its data ports to customer process(es) 258, begin accepting and processing read requests and write requests directed to the local data store 254, begin caching the new write data indicated by the write requests to the write log, and begin uploading the write data from the write log to the remote data store 216. The upload of data from the local data store 254 may thus be performed in the background while the storage gateway 252 is performing its shadowing function on the client network 250. When the upload of data from the local data store 254 is complete, the storage gateway 252 continues performing its shadowing function.

Figure 9:
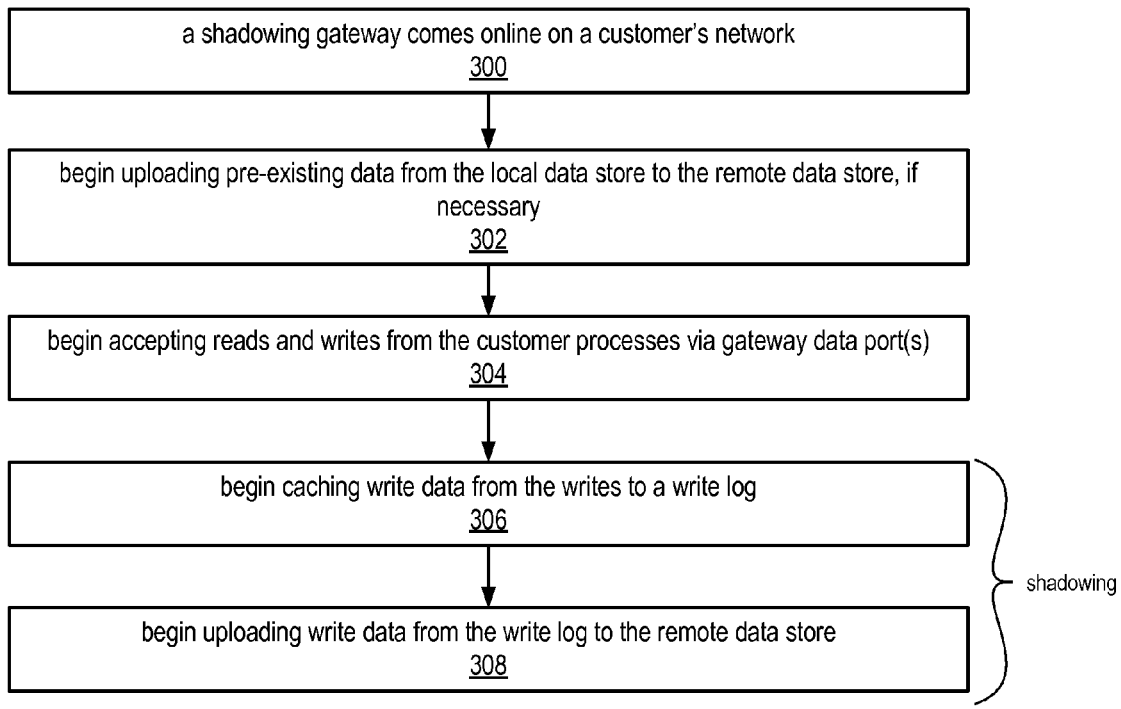
FIG. 9 is a flowchart of a bootstrapping process for a shadowing gateway, according to at least some embodiments.

FIG. 9 is a flowchart of a bootstrapping process for a shadowing gateway, according to at least some embodiments. As indicated at 300, a shadowing gateway comes online on a customer's network. For example, a new instance of a storage gateway may be installed, activated, and configured as a shadowing gateway on the network. As another example, an existing instance of a shadowing gateway may come back online after being offline for some reason; while the gateway was offline, customer process(es) may have communicated directly to the local data store to read and write data. As another example, a shadowing gateway may have entered a pass-through mode during which shadowing operations are temporarily suspended for some reason, for example due to the write log becoming full, and may be exiting the pass-through mode and resuming shadowing operations.

As indicated at 302, the shadowing gateway may begin uploading pre-existing data from the local data store to the remote data store, if necessary. For example, if this is a new shadowing gateway and the local data store is already populated, the existing data in the local data store needs to be uploaded to the remote data store so that a consistent snapshot can be generated. As another example, if an existing shadowing gateway comes back online or resumes shadowing operations upon exiting pass-through mode, new data may have been written to the local data store, and thus the snapshot on the remote data store needs to be made consistent with the data currently on the local data store.

As indicated at 304, the shadowing gateway may begin accepting reads and writes from the customer processes via the gateway data port(s) exposed on the customer's network. As indicated at 306, the shadowing gateway may begin caching write data from the writes to a write log, and begin uploading write data from the write log to the remote data store as indicated at 308.

The upload of data from the local data store begun at 302 may be performed in the background while the shadowing gateway accepts read and write requests and performs its shadowing function on the customer's network. When the upload of data from the local data store is complete, the shadowing gateway continues performing its shadowing function.

Note that the order of the elements in FIG. 9 may be different. For example, element 302 may be performed after any one of elements 304 through 308. In other words, the shadowing gateway may begin accepting reads and writes and performing its shadowing function prior to beginning to upload the pre-existing data from the local data store.

Figure 10:
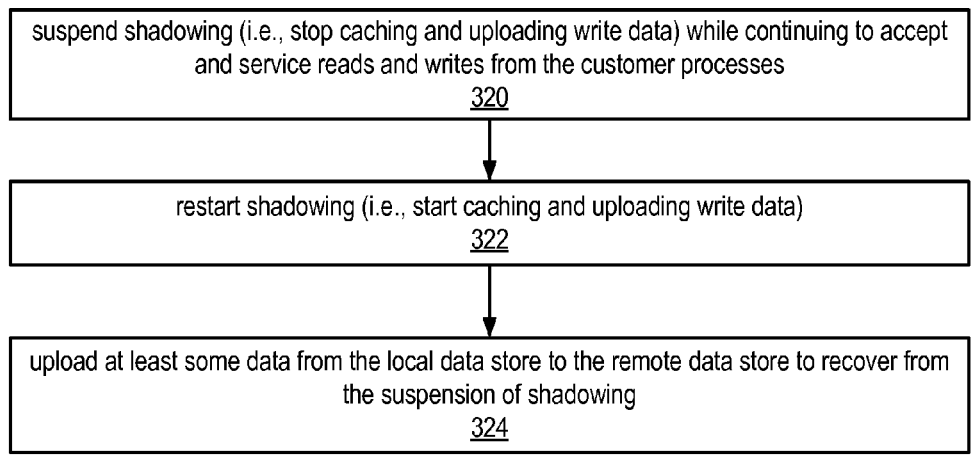
FIG. 10 is a flowchart of a shadowing gateway entering and recovering from a pass-through mode, according to at least some embodiments.

FIG. 10 is a flowchart of a shadowing gateway entering and recovering from a pass-through mode, according to at least some embodiments. As indicated at 320, a shadowing gateway may enter a pass-through mode by suspending its shadowing function (i.e., stop caching and uploading write data) while continuing to accept and service reads and writes directed to the local data store from the customer processes on the customer's network. The gateway may enter pass-through mode upon detecting some condition that may cause the shadowing function to fail. As an example, the shadowing gateway may enter the pass-through mode upon detecting that the write log is full and cannot be successfully uploaded. The gateway may alert the local network administrator of the detected condition; the administrator may then address the problem indicated by the alert. For example, the administrator may allocate more memory to the write log, and/or allocate more bandwidth to the gateway upload process. The administrator may then inform the gateway that the problem has been addressed.

When the shadowing gateway determines that the pass-through mode can be exited, for example by receiving an indication that a detected problem that caused the pass-through mode has been addressed, the gateway may restart shadowing (i.e., start caching and uploading write data), as indicated at 322.

Upon exiting pass-through mode, there may be data in the local data store that has not been uploaded to the remote data store. Since the gateway continues to receive and process write requests during pass-through mode, new data may have been written to the local data store. Thus, the shadowing gateway may perform a bootstrap as illustrated in FIGS. 8 and 9 to upload at least some data from the local data store to the remote data store to recover from the pass-through mode, as indicated at 324.

In at least some embodiments, an optimized bootstrapping process for shadowing gateways may be employed to reduce the amount of data that is uploaded from the local data store to the remote data store. The optimized bootstrapping process may detect blocks of data that have already been uploaded to the remote data store, and thus avoid uploading blocks that have already been uploaded. The optimized bootstrapping process may leverage tracking data that is generated and maintained for a storage gateway process during general uploading of data from a gateway to the remote data store.

Figure 11:
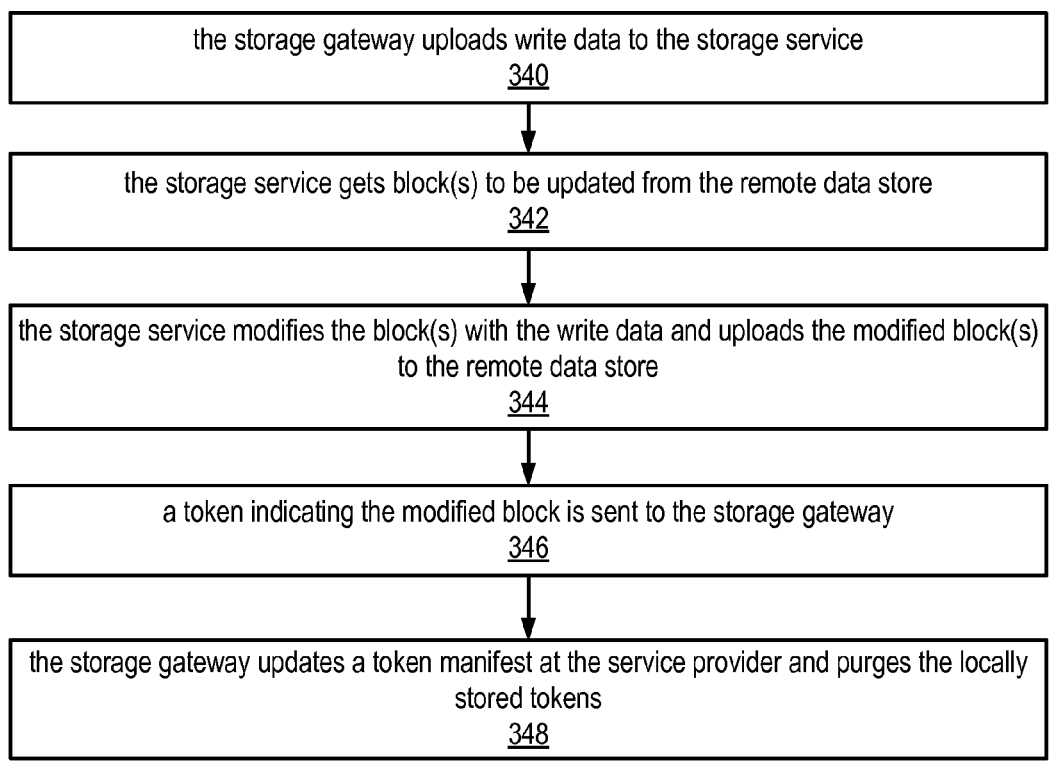
FIG. 11 is a flowchart of a method for uploading, updating, and tracking blocks from a gateway to a remote data store, according to at least some embodiments.

FIG. 11 is a flowchart of a method for uploading, updating, and tracking blocks from a gateway to a remote data store, according to at least some embodiments. During normal gateway operations, the gateway uploads write data to the remote data store at the service provider, specifically to the storage service, as indicated at 360. The storage service receives the write data and gets the respective block(s) (e.g., 4 MB blocks) from the remote data store as indicated at 342. The storage service then modifies the respective block(s) according to the write data and uploads the modified block(s) back to the remote data store with a new version name, as indicated at 344. For each modified block, a token indicating the modified block is sent back to the storage gateway, as indicated at 346. The storage gateway keeps track of these tokens; every time a block is modified, the reference block that is being modified needs to be sent to the storage service.

As indicated at 348, the storage gateway may periodically or aperiodically update a token manifest at the service provider and purge at least a portion of the locally tracked tokens. The storage gateway may have to track a large number of tokens. In at least some embodiments, a manifest may be provided on the remote data store that may relieve the storage gateway of the burden of having to locally track a large number of tokens. The storage gateway may periodically or aperiodically call the storage service to update the manifest with token(s) that the gateway has received, and may purge the respective locally stored tokens.

In at least some embodiments, the optimized bootstrapping process may leverage the manifest to determine what blocks have and have not been uploaded by making a call to check hashes of each of the blocks in the manifest to determine which blocks indicated by the manifest match blocks on the local data store versus which blocks indicated by the manifest do not match blocks on the local data store and thus need to be uploaded. In other words, the manifest is used to detect which blocks on the local data store are dirty blocks, and which are not. Thus, the optimized bootstrapping process attempts to determine, via the manifest, which blocks have already been uploaded so that the already-uploaded blocks are not uploaded again, and only dirty blocks are uploaded. In at least some embodiments, for the blocks that the optimized bootstrapping process determines do need to be uploaded (the dirty blocks), a data deduplication technique may be applied when uploading these blocks to reduce the amount of data that is actually uploaded from the dirty blocks.

Figure 12:
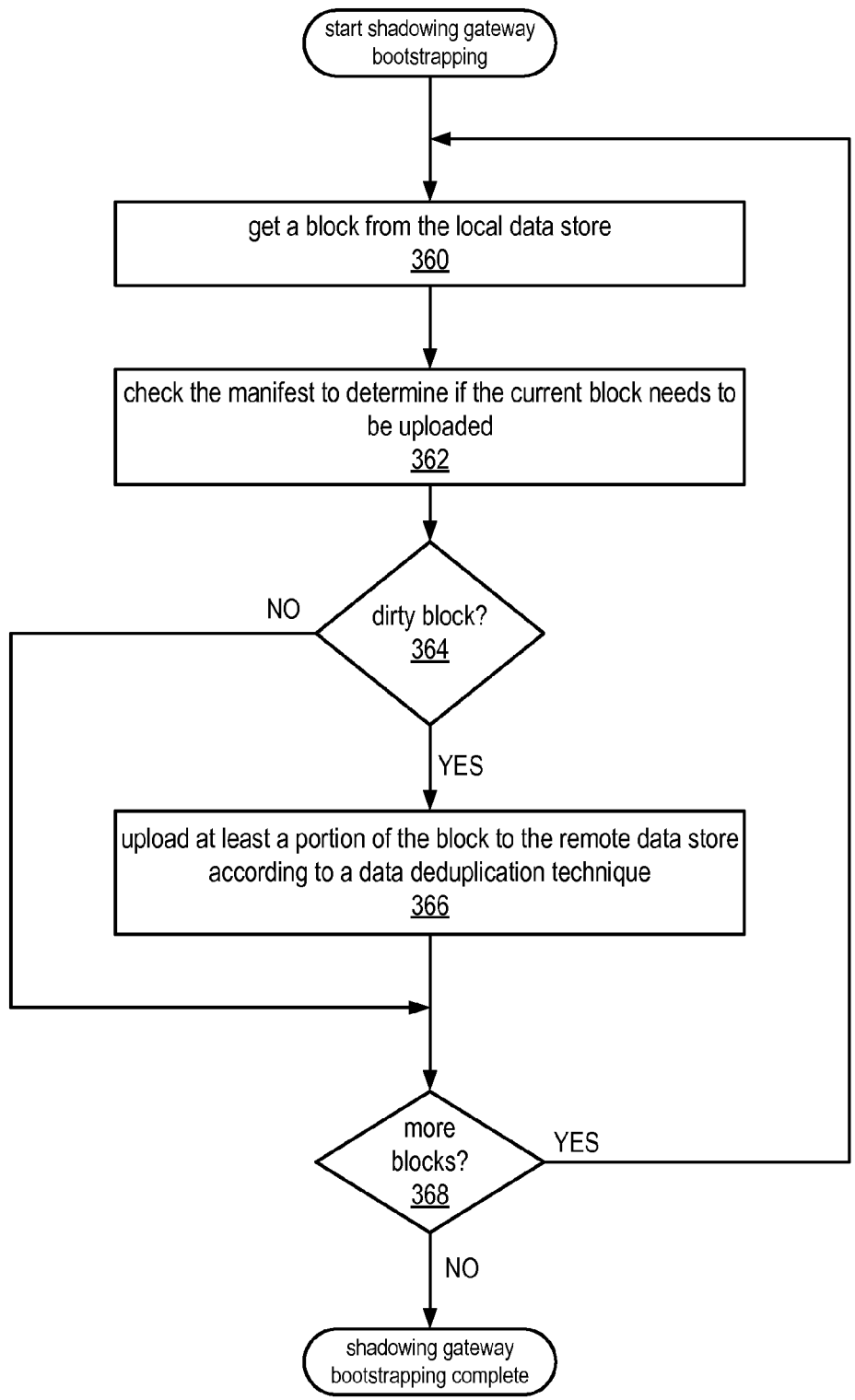
FIG. 12 is a flowchart of an optimized bootstrapping process for a shadowing gateway, according to at least some embodiments.

FIG. 12 is a flowchart of an optimized bootstrapping process for a shadowing gateway, according to at least some embodiments. A bootstrapping process may be started for a shadowing gateway, for example when the gateway exits pass-through mode. As indicated at 360, a block is obtained from the local data store. As indicated at 362, the manifest, which may be stored on the remote data store, may be checked to determine if the current block is a dirty block that needs to be uploaded. At 364, if the current block is dirty according to the manifest, at least a portion of the block may be uploaded to the remote data store according to a data deduplication technique, as indicated at 366. The method then proceeds to 368. At 364, if the current block is not dirty according to the manifest, the method proceeds directly to 368. At 368, if more blocks are to be processed, the method returns to element 360 to process a next block. Otherwise, the bootstrapping process is done.

Storage Gateway Security Model

Figure 13:
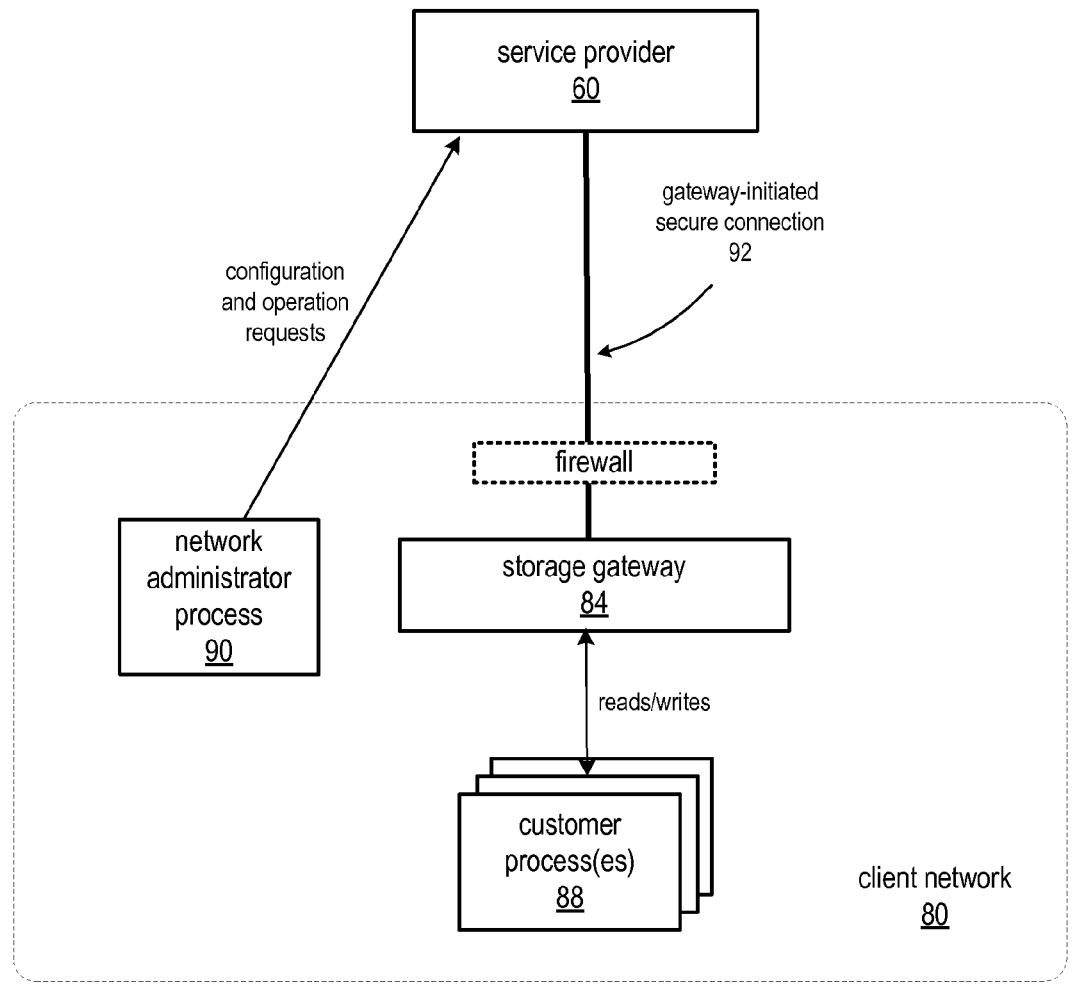
FIG. 13 illustrates aspects of a storage gateway security model, according to at least some embodiments.

Embodiments of the storage gateway may be implemented according to a security model that provides data protection for the customer as well as protection against misuse and unauthorized use (e.g., pirating) of the gateway by the customer or third parties. FIG. 13 illustrates aspects of a storage gateway security model, according to at least some embodiments.

In at least some embodiments, an aspect of the security model is that a storage gateway 84 is delivered and initially installed on a client network 80 without security credentials or other identifying information for the gateway 84 to use in communications with the service provider 60. An activation process may be employed via which a storage gateway 84 on a customer network can register with the service provider 60. In at least some embodiments of the activation process, the storage gateway 84 may initiate a connection (e.g., an SSL (Secure Socket Layer)/TCP connection) with and identify itself to the service provider 60 as a correct gateway for a respective customer account to obtain the necessary security credentials. During the activation process, the service customer specifies a name for the gateway 84. In at least some embodiments, the service customer logs into the customer's account with the service provider 60 and provides information to the service provider 60, including but not limited to the gateway name, that is used in registering the gateway 84. However, the service customer does not log in to the storage gateway 84, and therefore the service customer's security credentials and other account information are not exposed on the gateway 84. This may minimize the security risk for the service customer. This gateway name, along with other metadata related to the gateway 84 and to the service customer, may be stored by the service provider 60 and used in tracking and identifying the respective gateway 84. Note that a service customer may have one or more gateways 84 installed and activated on a client network 80, with each having a unique identifying name and other metadata. FIGS. 15 through 17B, further described below in the section titled Storage gateway activation process, illustrate an activation process that may be employed in at least some embodiments. In the activation process, the gateway 84 may initiate a connection to the service provider 60 and provide metadata about the gateway 84 platform, along with a public key, to the service provider 60. The service provider 60 may then provide a temporary, unique activation key to the gateway 84 that is used in the activation process. In addition, a service customer may be required to log in to the customer's account via a service provider console process to activate the gateway 84; thus, the gateway 84 can be matched with the account of the service customer that attempts to activate the gateway 84. The security credentials and other metadata (e.g., the customer-supplied gateway name) obtained by the storage gateway 84 via the activation process may then be used by the storage gateway 84 in communications with various processes of the service provider 60 network to identify the gateway 84 to the service provider 84 processes.

Figure 18:
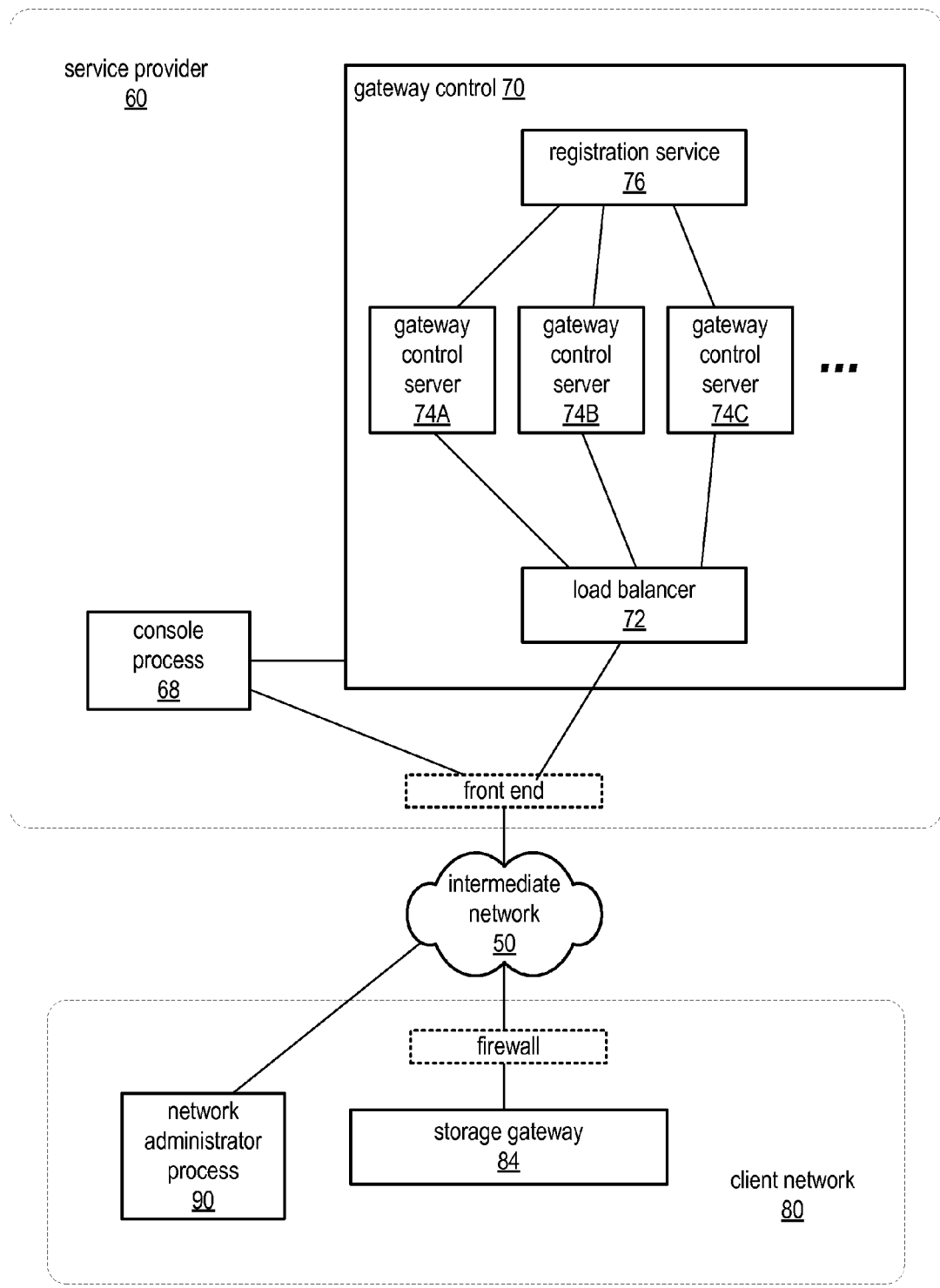
FIG. 18 is a high-level block diagram that illustrates example gateway control architecture that may be employed in at least some embodiments.
Figure 19:
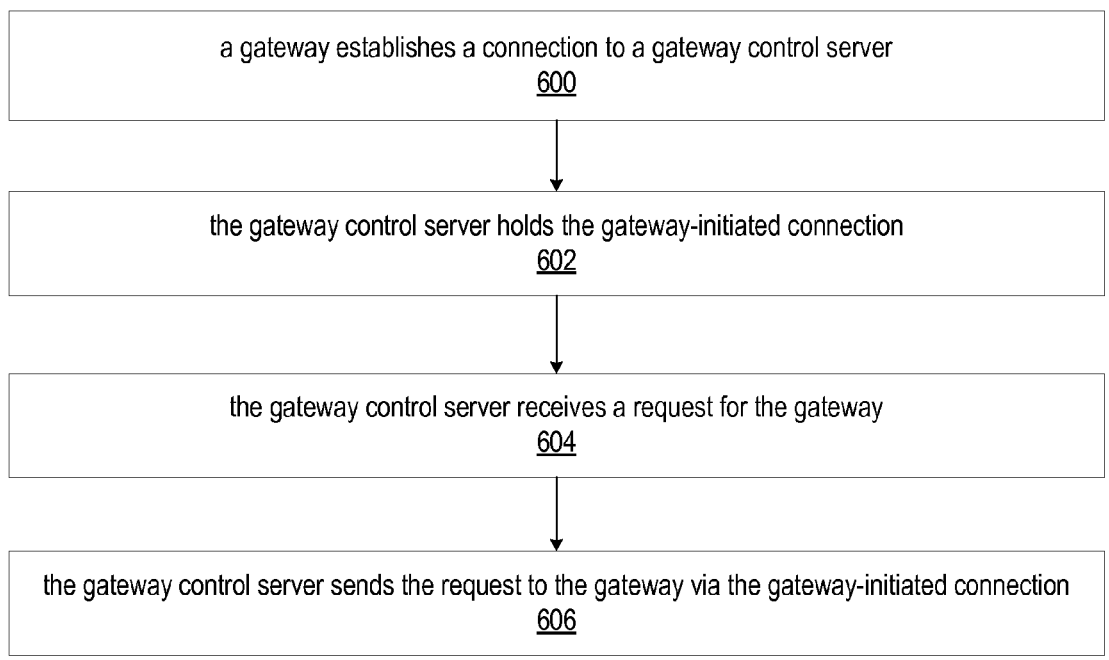
FIG. 19 is a flowchart of the method for remote gateway management using a gateway-initiated connection and a long polling technique, according to at least some embodiments.
Figure 20:
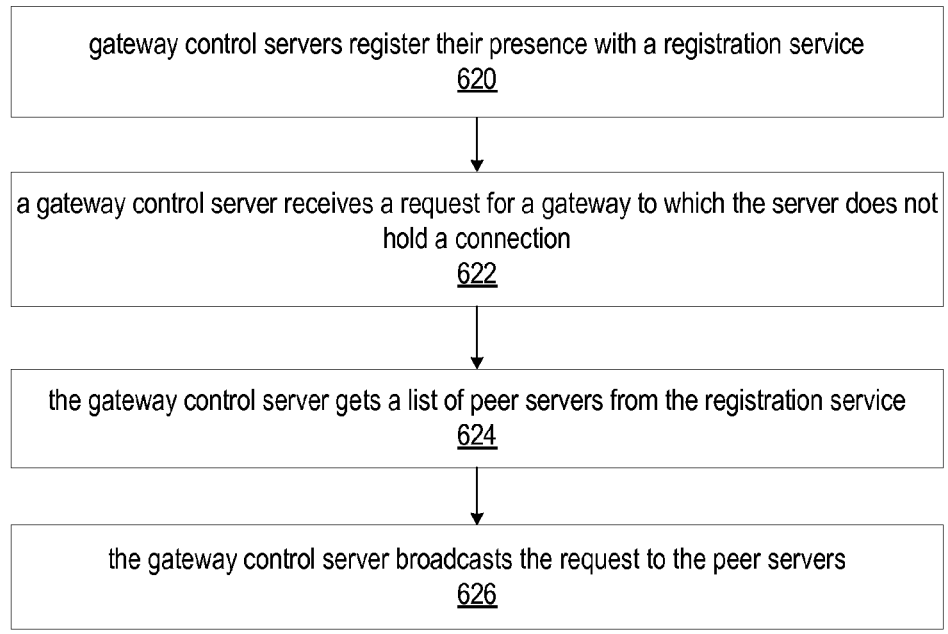
FIG. 20 is a flowchart of a method for a gateway control server to broadcast a gateway request to its peer servers, according to some embodiments.

In at least some embodiments, another aspect of the security model, as illustrated in FIG. 13, is that the storage gateway 84 only accepts externally-initiated connections to one or more data ports (e.g., iSCSI ports) exposed to the customer process(es) 88 on the client network 80. The storage gateway does not accept other externally initiated connections, and initiates all necessary connections to external processes. For example, in at least some embodiments, the storage gateway 84 initiates at least one secure connection 92 (e.g., an SSL (Secure Socket Layer)/TCP connection) to the service provider 60; the service provider 60, however, cannot initiate connections to the gateway 84. An example method for remote gateway management using gateway-initiated connections and a long polling technique that may be used in at least some embodiments is illustrated in FIGS. 18 through 20.

In addition, as illustrated in FIG. 13, in at least some embodiments, the service customer (e.g., network administrator process 90) does not directly connect to the storage gateway 84 to configure and manage the gateway 84; instead, configuration and operation requests for the storage gateway 84 are made through the service provider 60, which passes the requests to the gateway 84 via the secure communications channel 92 initiated by the gateway 84. For example, as illustrated in FIGS. 18 through 21, configuration and operation requests for a gateway 84 may be performed by or via a network administrator process 90 through a console process on the service provider 60 network. In at least some embodiments, the console process forwards a received configuration request or operation request directed to the customer's gateway 84 to a gateway control plane that maintains gateway-initiated connections 92. The gateway control plane locates a current connection to the gateway 84 that is the target of the request, for example a connection maintained on a particular gateway control server, and the request is forwarded to the gateway 84 via the connection.

Thus, in at least some embodiments, a user, network administrator, or process of the customer cannot directly initiate connections to or "log in" to the storage gateway 84, nor can external persons or processes such as an operator or process on the service provider 60 network initiate a connection to the storage gateway 84. This, along with other aspects of the gateway security model, may help to protect the security credentials and other operational information on the storage gateway 84 from being intentionally or unintentionally compromised by external persons or processes.

In another aspect of the security model, all communications between the storage gateway and the storage service during activation and operation of the gateway may be secured and encrypted. As noted above, an aspect of the security model is that communications between the storage gateway and the storage service are performed over gateway-initiated secure connections (e.g., SSL/TCP connections). An encryption technique, for example public/private key encryption, may be used in communications over the gateway-initiated secure connections.

Figure 14:
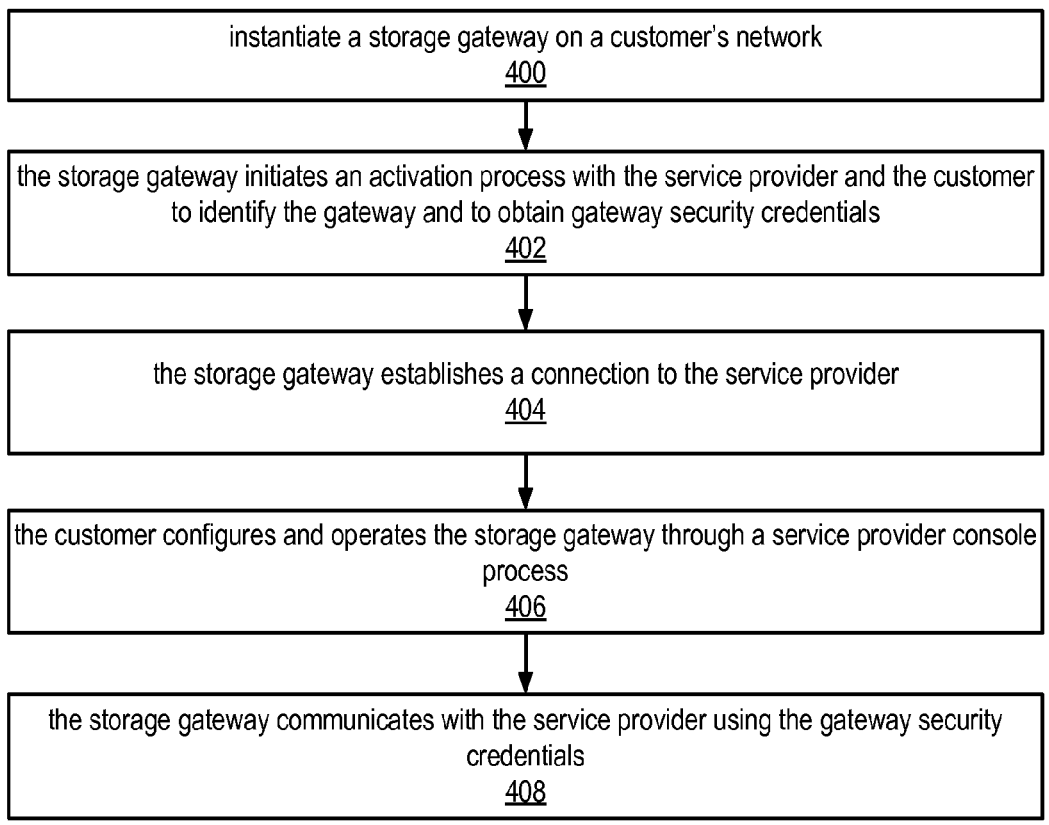
FIG. 14 is a flowchart that illustrates at least some aspects of a gateway security model during activation, configuration, and operation of a storage gateway, according to at least some embodiments.

FIG. 14 is a flowchart that illustrates at least some aspects of a gateway security model during activation, configuration, and operation of a storage gateway, according to at least some embodiments. As illustrated at 400, a storage gateway may be instantiated on a customer network. For example, to instantiate the storage gateway, the storage gateway may be installed as a virtual or physical appliance on the service customer's local network or data center, typically behind a firewall. For example, in at least some embodiments, the storage gateway may be implemented as a virtual appliance that may be downloaded to or otherwise installed on one or more computing devices such as server systems on the service customer's local network. Alternatively, the storage gateway may be implemented as a dedicated device or appliance that may be coupled to the service customer's local network; the dedicated device or appliance may include software and/or hardware that implements the functionality of the storage gateway. As illustrated at 402, the instantiated storage gateway initiates an activation process with the service provider and the customer to identify the gateway and to obtain gateway security credentials. In at least some embodiments, the security credentials include a certificate signed with a gateway-provided public key. An example activation process is described below in reference to FIGS. 15 through 17B. Note that the activation process may be initiated by the gateway when the gateway is initially installed on the customer network, and may also be initiated at other times, for example when powering on after the gateway device has been powered down for upgrade, maintenance, or for some other reason. As indicated at 404 of FIG. 14, the storage gateway establishes a secure connection to the service provider. An example method for a gateway-initiated connection that uses a long polling technique that may be used in at least some embodiments is illustrated in FIGS. 18 through 21. As indicated at 406 of FIG. 14, the customer configures and operates the storage gateway through a service provider console process. An example method for remote gateway management using gateway-initiated connections and a long polling technique that may be used in at least some embodiments is illustrated in FIGS. 18 through 21. As illustrated at 408 of FIG. 14, the storage gateway communicates with the service provider, for example to communicate with a storage service process, using the gateway security credentials and possibly other metadata obtained during the activation process to identify the gateway to the service provider.

Storage Gateway Activation Process

Embodiments of a storage gateway may, for example, serve as an on-premise storage device and as an interface between a service customer's network and a storage service provided by a service provider. In at least some embodiments, the storage gateway may be implemented as a virtual device or appliance that may be downloaded or otherwise installed on one or more computing devices such as server systems coupled to a local network infrastructure of the customer at a customer data center. Alternatively, the storage gateway may be implemented as a dedicated device or appliance that may be coupled to a local network infrastructure of the customer. The dedicated device or appliance may include software and/or hardware that implements the functionality of the gateway.

In at least some embodiments, in order to use a storage gateway after the gateway is installed, the gateway must be activated with the service provider. This section describes a method via which identification, authentication, and authorization of a storage gateway may be performed during bootstrapping, or activation, of the storage gateway. In the gateway activation method, the storage gateway is identified and associated with the customer's service provider account. However, the customer's credentials are not exposed to the storage gateway during the activation process. In at least some embodiments, the customer logs into the customer's account with the service provider and provides information to the service provider, including but not limited to a gateway name, that is used in registering the gateway 84. However, the customer does not log in to the storage gateway, and therefore the customer's security credentials and other account information are not exposed on the gateway. This may minimize the security risk for the customer. In at least some embodiments, the service provider account that is used by the customer in the activation process may be the same account that the customer used to manage other resources that are provided to the customer by the service provider, including but not limited to other storage resources provided by a storage service and virtualized hardware resources provided by a hardware virtualization service, as illustrated in FIG. 5.

Figure 15:
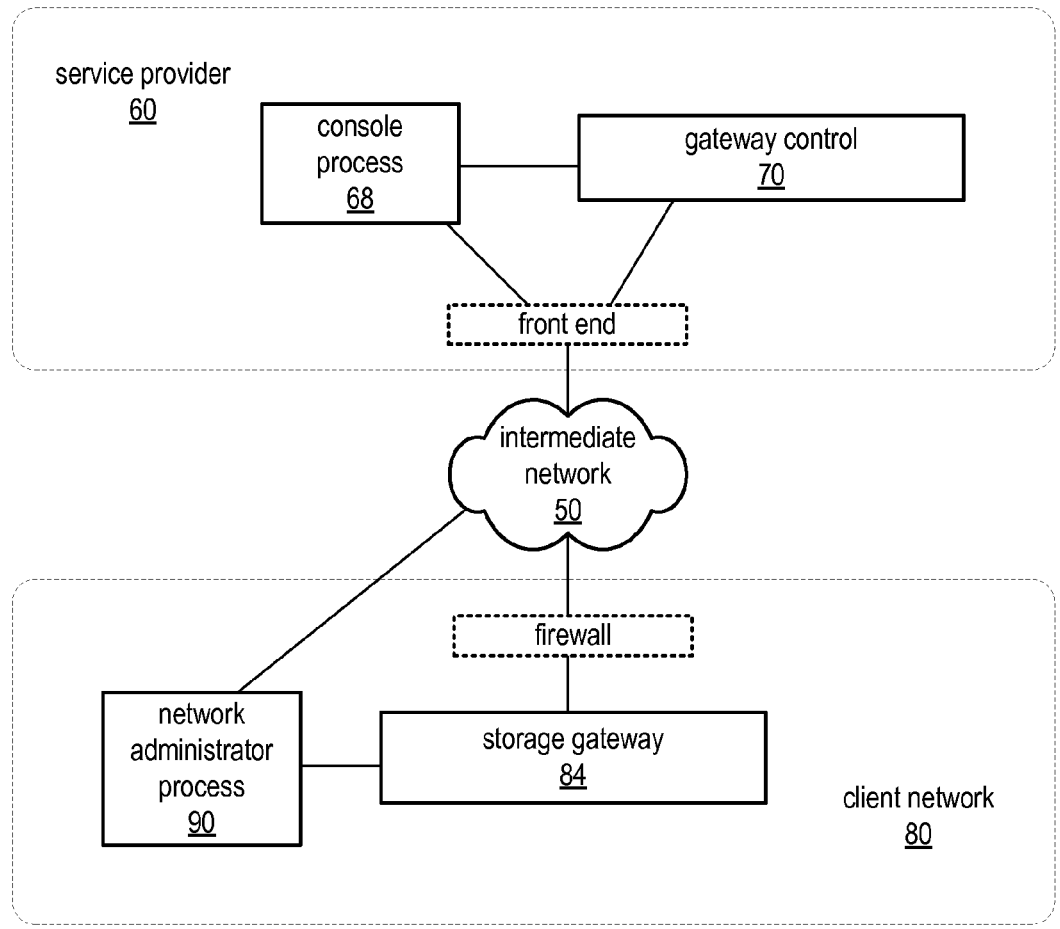
FIG. 15 is a high-level block diagram of an example networking environment that illustrates the service customer and service provider components or entities that participate in a gateway activation process, according to at least some embodiments.

FIG. 15 is a high-level block diagram of an example networking environment that illustrates the service customer and service provider components or entities that participate in a gateway activation process, according to at least some embodiments. These participants may include, but are not limited to, a storage gateway 84, a network administrator process 90, a console process 68, and gateway control 70. A storage gateway 84 may be installed as a virtual or physical appliance on a service customers local network or data center (e.g., client network 80), typically behind a firewall. For example, a storage gateway 84 may be a virtual appliance that, for example, executes within a virtual machine, and may be downloaded and instantiated on a server device on client network 80. A console process 68 on the service provider 60 network may be accessible by or via a network administrator process 90, for example from a device on client network 80 or from a device external to client network 80, to sign on to the customer's account. For example, the console process 68 may provide a web interface or some other interface via which a network administrator, via network administrator process 90, may sign on to the respective service customer's account to view and manage the account and resources provided by the service provider 60. A gateway control 70 process or plane of the service provider 60 network may perform tracking and management functions for one or more storage gateway(s) 84 installed at one or more customers of the service provider 60. Gateway control 70 and console process 68 may, for example, be implemented on one or more server computer devices on service provider 60 network. In at least some embodiments, gateway control 70 may be implemented as a control plane that includes two or more gateway control servers to provide load balancing and high availability.

Figure 16A:
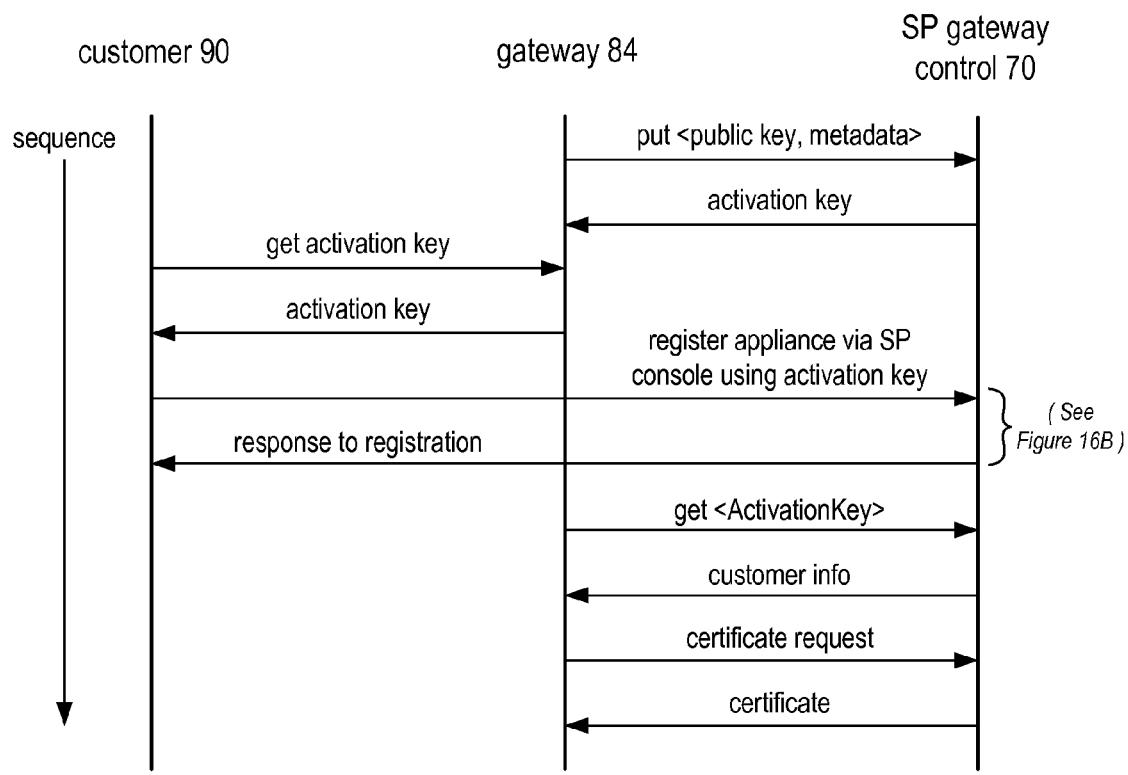
FIGS. 16A and 16B are process flow diagrams that illustrate interactions among the components illustrated in FIG. 15 during a gateway activation process, according to at least some embodiments.
Figure 16B:
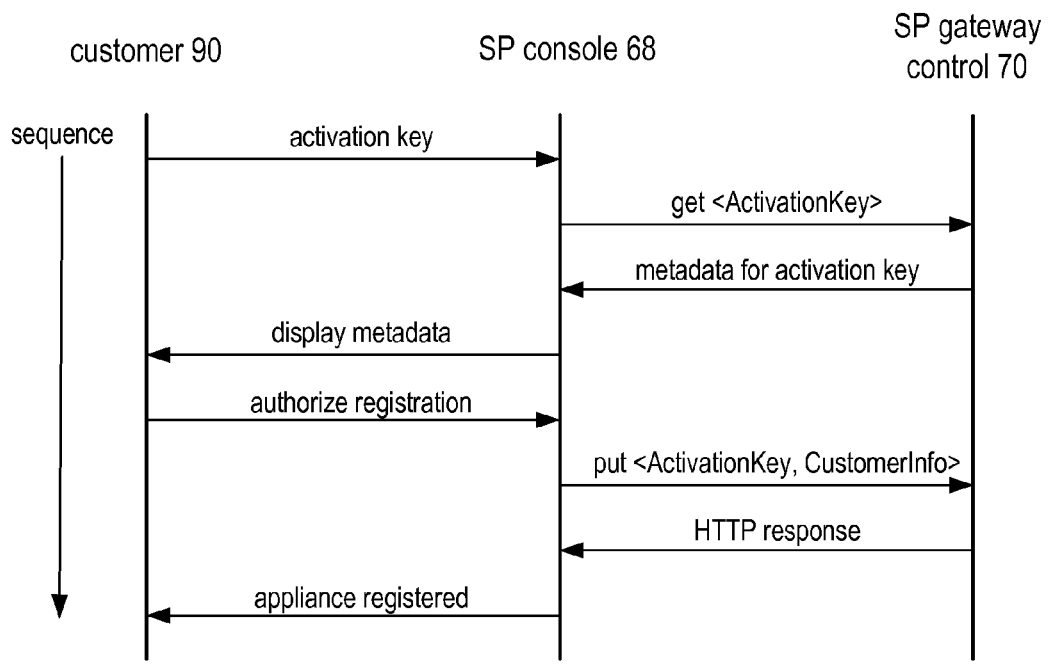

FIGS. 16A and 16B are process flow diagrams that illustrate interactions among the components illustrated in FIG. 15 during a gateway activation process, according to at least some embodiments. The activation process involves two points of interaction from the customer's perspective. First, the customer interacts with the gateway 84, as shown in FIG. 16A. Second, the customer interacts with the service provider (SP) console 68, as shown in FIG. 16B.

FIG. 16A illustrates interactions among the customer (represented by network administrator process 90 in FIG. 15), gateway 84, and the service provider (SP) gateway control 70 during the activation process. After the gateway 84 is installed and/or powered on, the gateway 84 generates a public key (e.g., an RSA keypair), and collects metadata about the hardware and/or software of the device that the gateway 84 has been installed on. For example, the metadata may include an IP address, a MAC address, or other hardware and software characteristics of the device. The gateway 84 then publishes the public key and the metadata, for example via an HTTP POST, to gateway control 70. In response, gateway control 70 may generate an activation key, and returns the activation key to the gateway 84. The activation key may be a globally unique identifier (GUID), for example an N-bit, randomly generated number. Gateway control 70 may store the activation key along with the public key and the metadata obtained from the gateway 84.

After receiving the activation key from gateway control 70, the gateway 84 advertises the activation key within the client network 80 at a fixed port (IP address:port) on the gateway 84 VM or device. The customer, via network administrator process 90, may then access the fixed port of the gateway 84 to obtain the activation key; the access is redirected to the service provider (SP) console 68 process with the activation key in the query string.

In at least some embodiments, the activation key is valid for a fixed time or lifespan (for example, 30 minutes), after which the activation key expires. In at least some embodiments, since the activation key is valid only for a specified lifespan, a background garbage collection process may be provided at the service provider 60 that removes expired activation keys. In at least some embodiments, the lifespan for an activation key may be longer on the service provider 60 side than on the gateway 84 to handle borderline cases (for example, 45 minutes on the service provider 60 side, 30 minutes on the gateway 84).

FIG. 16B illustrates interaction among the customer (represented by network administrator process 90 in FIG. 15), service provider (SP) console 68, and the service provider (SP) gateway control 70 during the activation process. Once the network administrator process 90 has obtained the activation key from the gateway 84, the activation key may be used to add the gateway 95 to the customer's service provider 60 account. After being redirected to the SP console 68, the customer logs in to the account (e.g., via network administrator process 90), and the activation key from the query string is used to fetch the metadata that the gateway 84 published to the gateway control 70. At least some of this metadata is displayed to the customer (e.g., via network administrator process 90). The metadata returned from gateway control 70 to the SP console 68 and displayed to the customer 90 is the metadata previously provided to gateway control 70 by the gateway 84, and may be used to inform the customer 90 about the gateway 84 to be activated. The displayed metadata may confirm to the customer 90 that the respective gateway 84 indicated by the metadata is the gateway 84 that has been installed at the customer's network. For example, an IP address of the gateway 84 may be displayed, which the customer 90 may confirm is the IP address of the gateway 84. In addition, the credentials (e.g, customer account number and/or other customer identification information) obtained from the customer 90 to log in to the account may be used in authenticating the customer 90 as the customer who owns the respective gateway 84 and associating the customer 90 with the respective gatewaey 84.

The customer 90 may also be prompted, by SP console 68, to enter additional information, for example a name for the gateway 84. After viewing and verifying the displayed metadata, the customer 90 may authorize registration of the gateway 84 with gateway control 70 via SP console 68, for example by selecting a "confirm" or "activate" or "register" user interface element. When the customer 90 authorizes registration of the gateway 84 via SP console 68, SP console 68 may pass the activation key obtained from the customer 90 to gateway control 70. Customer information such as a customer-supplied name for the gateway 84, the customer account ID, and so on, may also be passed to gateway control 70. The customer-supplied activation key is matched against the activation key previously provided to gateway control 70 by gateway 84. The customer information (e.g., the name of the gateway 84) is stored by gateway control 70 along with, for example, the metadata previously provided by the gateway 84.

In at least some embodiments, all data exchanged between SP console 68 and SP gateway control 70, and between gateway 84 and SP gateway control 70, may be encrypted. In at least some embodiments, sensitive data such as the customer's credentials, access key or secret key is not passed in the activation process.

Referring again to FIG. 16A, in at least some embodiments, the SP gateway control 70 is responsible for maintaining all information pertaining to registration and activation of the gateway 84. The gateway 84 meanwhile continuously polls SP gateway control 70 asking for information to generate a certificate signing request (CSR). Once SP gateway control 70 has received authorization from the customer 90 via SP console 68 as illustrated in FIG. 16B and matches the customer-supplied activation key to the activation key provided by gateway 84, SP gateway control 70 may respond to the gateway 84 GET request by providing metadata including but not limited to at least some of the customer information received from the customer 90 as indicated in FIG. 16B. The gateway 84 then generates a CSR and sends to SP gateway control 70. In response to the CSR, SP gateway control 70 generates a certificate and signs the certificate with gateway 84's previously provided public key. In at least some embodiments, the certificate may contain customer and/or gateway information, for example the customer account ID and the customer-supplied gateway 84 name. SP gateway control 70 then responds by sending the self-signed certificate, encrypted with the public key previously provided by gateway 84, to the gateway 84. The certificate may then be used for authentication in future communications from the gateway 84 to the service provider 60.

In at least some embodiments, to help prevent a customer from activating multiple gateways 84 using the same activation key, system/hardware-specific information may also be included along with the activation key which is published to the SP gateway control 70 by the gateway 84.

Figure 17A:
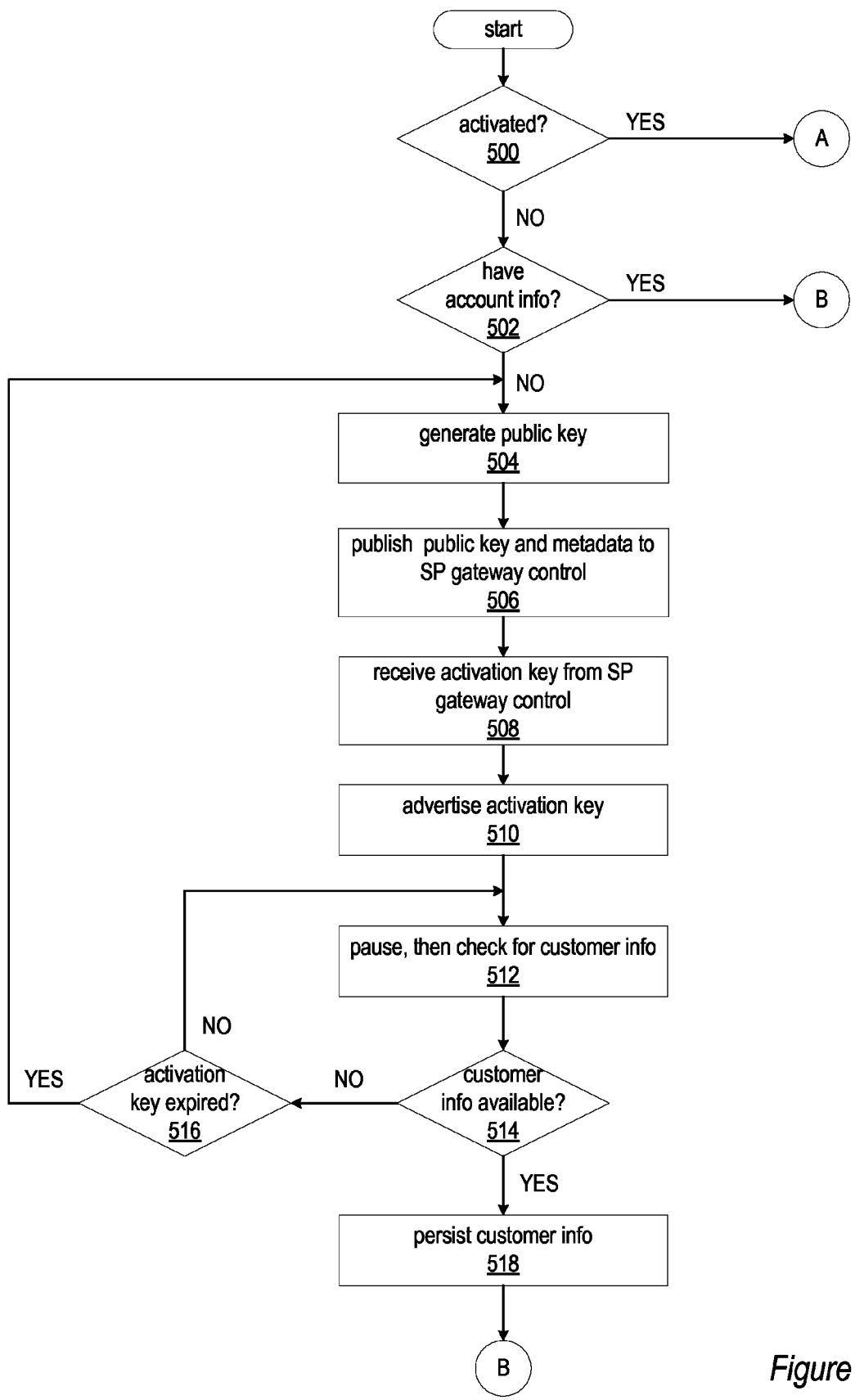
FIGS. 17A and 17B are a flowchart of the activation process from the perspective of a storage gateway, according to at least some embodiments.
Figure 17B:
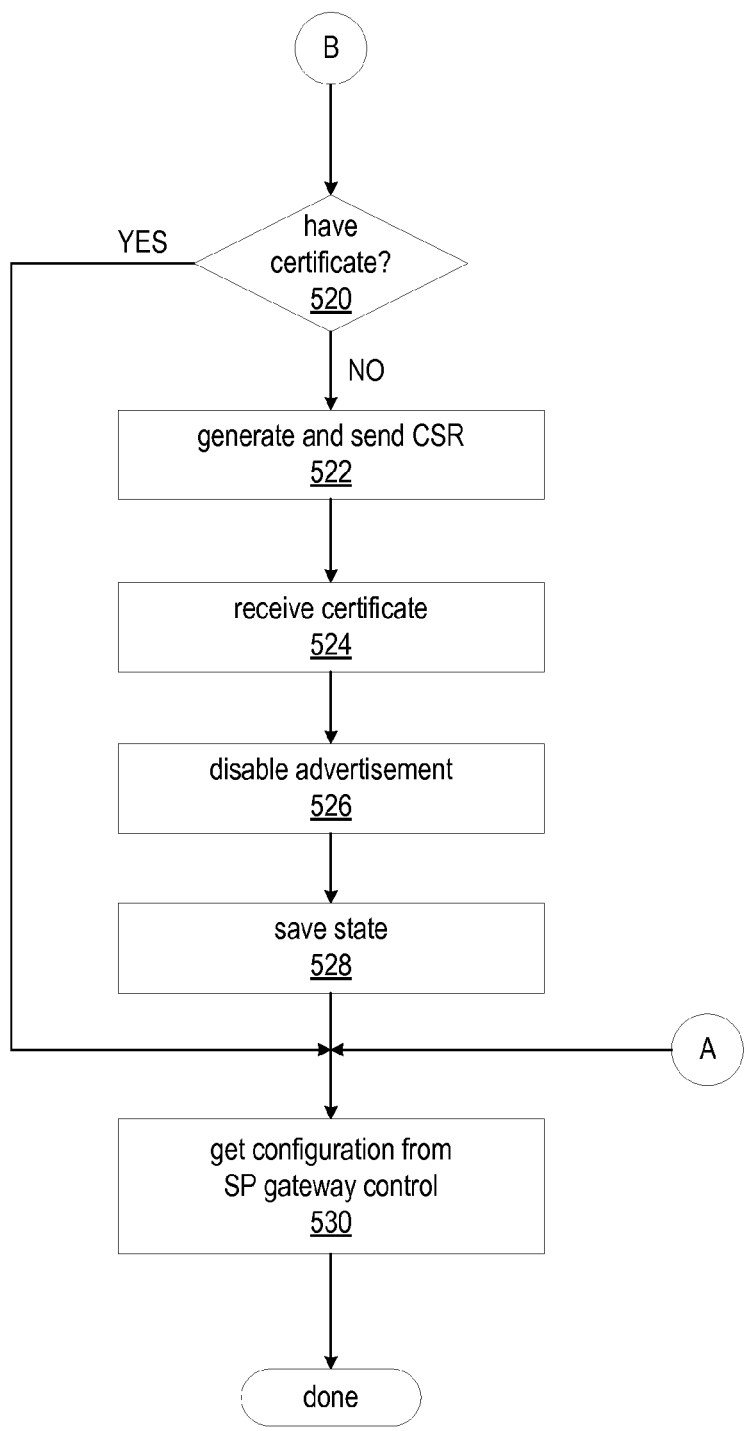

FIGS. 17A and 17B are a flowchart of the activation process from the perspective of a storage gateway, according to at least some embodiments. As indicated at 500 of FIG. 17A, after the gateway is installed and/or powered on, the gateway checks persistent storage to determine if it has already been activated. For example, the gateway may have been powered down for upgrade, maintenance, or for some other reason. If the gateway has been activated, the activation process proceeds to element 530 of FIG. 17B, where the gateway may obtain configuration information from the SP gateway control.

At 500 of FIG. 17A, if the gateway has not been previously activated, the activation process proceeds to element 502 of FIG. 17A, where the gateway checks if it has any persisted customer information for generating a certificate signing request (CSR). If the gateway has the persisted customer information, the process proceeds to element 520 of FIG. 17B. If the gateway does not have the persisted customer information, the process goes to element 504 of FIG. 17A. At 504, the gateway generates a public key (e.g., an RSA keypair). The gateway may also collect metadata about the hardware and/or software of the device that the gateway has been installed on. For example, the metadata may include an IP address, a MAC address, or other hardware and software characteristics of the device. The gateway then publishes the public key and metadata to the SP gateway control, as indicated at 506. At 508, the gateway receives an activation key from the SP gateway control. At 510, the gateway advertises the activation key on a fixed port (IP address:port) on the service customer's network.

As indicated at 512 through 516 of FIG. 17A, the gateway may then poll the SP gateway control for customer information that is required for generating a CSR. The customer information may include, but is not limited to, an account ID of the customer and a customer-specified name for the gateway. At 512, the gateway may pause, e.g. for a minute or for some other period, and then check to see if it has received the information from the SP gateway control. At 514, if the information has not been received, then the gateway checks to see if the activation key has expired, as indicated at 516. In at least some embodiments, the activation key is valid for a fixed time or lifespan (for example, 30 minutes), after which the activation key expires. At 516, if the activation key has not expired, then the activation process returns to element 512 of FIG. 17A to continue polling the SP gateway control. At 516, if the activation key has expired, then the activation process returns to element 504 of FIG. 17A to obtain a new activation key from the SP control plane.

At 514 of FIG. 17A, if the customer information has been received from the SP gateway control, then the activation process proceeds to element 518 of FIG. 17A, where the gateway stores the customer information to persistent memory. In at least some embodiments, the received customer information may be encrypted, and therefore the gateway may decrypt the information before storing the information. The process then proceeds to element 520 of FIG. 17B.

Referring to FIG. 17B, at 520, the gateway may check to see if it already has a certificate. At 520, if the gateway does already have a certificate, the process may proceed to element 530 of FIG. 17B, where the gateway may obtain configuration information from the SP gateway control. At 520, if the gateway does not have a certificate, the process proceeds to element 522. At 522, the gateway generates a CSR and sends the CSR to the SP control plane. At 524, the gateway receives a security certificate from the SP control plane in response to receiving the CSR; the certificate may serve as security credentials for the gateway. At 526, the gateway may disable the advertisement of the activation key (see step 510 of FIG. 17A). At 528, the gateway may save its current state to persist information (certificate, customer-specified gateway name etc.) that has been obtained in the activation process.

At this point, the activation process is complete. At 530, the gateway may obtain configuration information from the SP gateway control. In at least some embodiments, once the customer has been notified that the gateway has been successfully activated, the customer may configure the installed and activated gateway via the SP console. The SP console may provide a user interface, for example a web interface, to which the customer can log on to the customer's account, select the gateway (which may be identified by the customer-specified name), and specify a configuration for the gateway. In at least some embodiments, the SP console passes this configuration on to the SP gateway control, which then configures the specified gateway via a connection (e.g., and SSL/TCP connection) initiated by the gateway itself.

Activation Key Security

As indicated at 510 of FIG. 17A, the activation key is made available at a public IP address on the service customer's network, and may be passed unencrypted from the customer to the SP console in the query string. Although the activation key has a limited lifespan and the IP address is only known to the customer, there is still a short window of time in which the activation key is exposed at the IP:Port. While the activation key by itself is no good without the metadata that is also published by the gateway to the SP gateway control, the gateway may be vulnerable to some extent during this short window of time. In at least some embodiments, the customer may utilize security groups or other security measures to help prevent malicious users or processes from obtaining an activation key and activating someone else's gateway. In addition, since the customer is required to log in to the SP console process to activate a gateway, the gateway can be matched with the customer account that attempts to activate it.

Remote Gateway Management Using Gateway-Initiated Connections

Embodiments of a storage gateway may, for example, serve as an on-premise storage device and as an interface between a service customer's network and a storage service provided by a service provider. In at least some embodiments, an installed storage gateway may be activated, tracked, configured, and managed remotely via gateway control technology implemented at the service provider. FIG. 18 is a high-level block diagram that illustrates example gateway control architecture that may be employed in at least some embodiments. In at least some embodiments, as illustrated in FIG. 18, gateway control 70 may include a group of two or more gateway control servers 74 (e.g., gateway control servers 74A, 74B, 74C, . . . ). The multiple gateway control servers 74 may provide load balancing and high availability. During operation, at a given time, a particular installed and activated storage gateway 84 on a service customer's network 80 is connected to a particular one of the gateway control servers 74. However, note that the storage gateway 84 may be connected to a different gateway control server 74 at some other time.

A gateway control server 74 that is currently connected to storage gateway 84 may manage the storage gateway 84 by sending requests or commands to the storage gateway 84 via intermediate network 50. Requests initiated from the gateway control server 74 to manage the storage gateway 84 may include, but are not limited to, configuration change requests and operation requests. However, since the storage gateway 84 may be deployed behind a client network 80 firewall, a gateway control server 74 may not be able to reach the gateway 84 from outside the firewall unless an exception rule is created for the gateway 84. In addition, in at least some embodiments, the security model for the storage gateway 84 may dictate that external processes, including but not limited to service provider processes, are not allowed to initiate connections to the storage gateway 84.

In at least some embodiments, to enable a gateway control server 74 to send requests or commands to storage gateway 84 while enforcing the security model that does not allow the service provider to establish connections to the gateway 84, methods and apparatus for remote gateway management using gateway-initiated connections are provided. In the remote gateway management method, a gateway initiates a connection to the service provider by sending a connection request. In at least some embodiments, the connection is established to a particular gateway control server 74 via a load balancer 72. However, the gateway 84 does not send requests messages to the service provider via the gateway-initiated connection. Instead, the service provider (e.g., a gateway control server 74) holds the connection pending requests to be sent to the gateway 84, while the gateway 84 waits for a response. Upon receiving a request for the gateway 84, for example from a network administrator process 90 or some other process on the client network 80 on which the gateway 84 is instantiated, the service provider (e.g., a gateway control server 74) sends the request to the gateway 84 via the gateway-initiated connection that the service provider (e.g., a gateway control server 74) has been holding. The gateway 84 may also send a response to a request to the service provider 80 via the gateway-initiated connection.

In at least some embodiments, a gateway control server 74 to which a connection from gateway 84 is established (e.g., gateway control server 74A) may register the connection with registration service 76. If a gateway control server 74 receives a request for a gateway 74 to which it does not hold a connection, the gateway control server 74 may query the registration service 76 to find out which gateway control server 74 holds the connection, and forward the request to the gateway control server 74 that holds the connection to the gateway 84. In some embodiments, as an alternative, a gateway control server 74 that receives a request for a gateway 74 to which it does not hold a connection may simply broadcast the request to two or more other gateway control servers 84.

In at least some embodiments, the service provider 80 may employ a ping process to monitor the gateway-initiated connections. In the ping process, a gateway control server 84 that maintains a connection to a gateway 74 may periodically or a periodically send a ping message to the gateway 84. The gateway 84 responds to the ping message. Upon detecting that the gateway 84 has not responded to the ping message(s) for some specified time-out period, the gateway control server 74 may drop the connection, and may unregister the connection with the registration service 76.

In at least some embodiments, the ping messages may be sent to the gateway(s) 74 at periodic intervals. At least some embodiments may adjust the ping intervals according to the reliability of the connections to specific gateways 84 so that ping messages are sent at shorter intervals to a gateway 84 for which the connection has been unreliable and at longer intervals to a gateway for which the connection has been generally reliable. The ping interval may be increased over time to a given gateway 84 as the connection remains reliable, and may be decreased to a given gateway 84 for which the connection has been unreliable.

In at least some embodiments, a gateway 84 may detect if its gateway-initiated connection has been terminated or dropped. Upon detecting that the connection has terminated, the gateway 84 may send another connection request to the service provider 80 to re-establish the connection. Note that the connection may be re-established to a different gateway control server 74 than the one that formerly held the connection. In at least some embodiments, a gateway 84 may determine that its gateway-initiated connection has been dropped by monitoring the ping messages and determining that a ping message has not been received over the connection for a specified time-out period.

Thus, in the remote gateway management method, a gateway 84 establishes a connection to the service provider, anticipating and waiting for request(s) from the service provider. The service provider holds the connection pending requests for the gateway 84. Upon receiving a request for the gateway 84, the service provider forwards the request to the respective gateway over the gateway-initiated connection. The service provider and the gateway both monitor and manage the connection so that, if the connection drops for some reason, the drop is detected and the gateway 84 re-establishes the connection.

FIG. 19 is a flowchart of a method for remote gateway management using a gateway-initiated connection, according to at least some embodiments. As indicated at 600, the gateway establishes a connection to a gateway control server via a connection request. For example, the gateway may establish an outbound SSL/TCP connection with the gateway control server through a load balancer, as illustrated in FIG. 18, via a connection request. As indicated at 602 of FIG. 19, once the connection to the gateway is established, the gateway control server holds on to the connection and keeps the connection alive. As indicated at 604 of FIG. 19, the gateway control server receives a request for the gateway. For example, a gateway control server 74 may receive a configuration request or operation request for the gateway 84 from the respective network administrator process 90 via a console process 68, as illustrated in FIG. 18. After the gateway control server receives the request for the gateway, the gateway control server forwards the request to the gateway via the gateway-initiated connection, as indicated at 606 of FIG. 19.

Referring again to FIG. 18, a service customer may access the service provider console 60 to initiate configuration change requests or operation requests for an indicated storage gateway 84. For example, a network administrator, via network administrator process 90. may send a request to a gateway 84 via a console process 68. The console process 68 may then send the request to a gateway control server 74 behind load balancer 72. However, the gateway control server 72 to which the console process 68 sends the request may not be the gateway control server 72 that holds the connection to the respective gateway 84. For example, gateway control server 72B may hold the connection to gateway 84, while the request for gateway 84 may be sent to gateway control server 72A. Therefore, a gateway control server 72 that receives the request from console process 68 (e.g., gateway control server 72A) may need to forward the request to the gateway control server that holds the connection to the gateway 84 (e.g., gateway control server 72B) in order to deliver the request to the appropriate gateway 84. Thus, at least some embodiments may provide a method or methods for a gateway control server 72 (e.g., server 72A) to get a request for a particular gateway 84 received from the console process 68 to the gateway control server 72 (e.g. server 72B) that currently holds a connection to the particular gateway 84 indicated by the request.

In some embodiments, to accomplish this, a gateway control server 72 (e.g., server 72A) that receives a request for a gateway 84 to which the server 72 does not hold a connection may broadcast the request to all of its peer gateway control servers 72. FIG. 20 is a flowchart of a method for a gateway control server to broadcast a gateway request to its peer servers, according to some embodiments. As indicated at 620, when each gateway control server 72 is instantiated, the server 72 may register with a registration service 76. When a gateway control server 72 exits, the server 72 is unregistered from the registration service 76. The registration service 76 may, for example, be backed by a database service or a distributed storage service. As indicated at 622, a gateway control server 72 (e.g., server 72A) may receive a request for a gateway 84 to which the server 72 does not hold a connection. To broadcast the request to its peer gateway control servers 72, the gateway control server 72 (e.g., server 72A) may poll the registration service 76 to discover its peer gateway control servers 72 (e.g., servers 72B and 72C), as indicated at 624. The gateway control server 72 (e.g., server 72A) may then forward the gateway request to all of the servers 72 discovered via the registration service 76, as indicated at 626. The gateway control server 72 that currently holds the connection to the gateway 84 indicated by the request (e.g., server 72B) may then send the request to the respective gateway 84.

Figure 21:
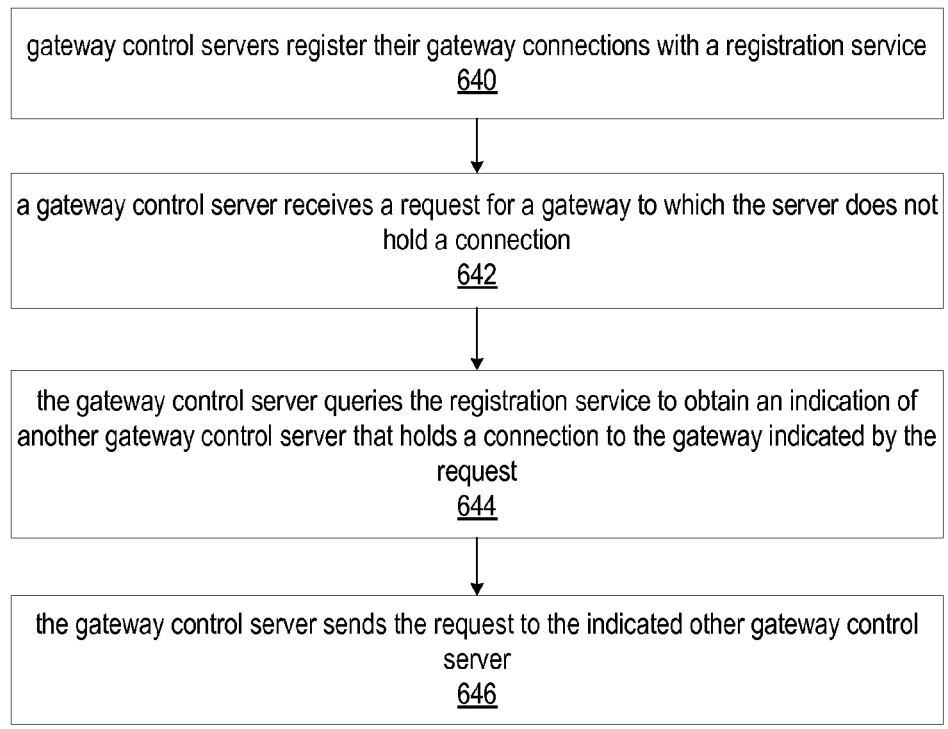
FIG. 21 is a flowchart of an alternative method for getting a gateway request to the appropriate gateway control server, according to some embodiments.

FIG. 21 is a flowchart of an alternative method for getting a gateway request to the appropriate gateway control server, according to at least some embodiments. As indicated at 640, when a gateway control server 72 (e.g., server 72B) receives a connection request from a gateway 84, the server 72 registers the pairing with the gateway 84 in the registration service 76. As indicated at 642, a gateway control server 72 (e.g., server 72A) may receive a request for a gateway 84 to which the server 72 does not hold a connection. As indicated at 644, the gateway control server 72 (e.g., server 72A) that receives the request for a gateway 84 to which the server 72 does not hold a connection may then query the registration service 72 to find out which gateway control server 72 (e.g., server 72B) currently holds a connection with the gateway 84, and may then forward the request to the gateway control server 72 (e.g., server 72B) indicated by the registration service 76, as indicated at 646. The gateway control server 72 that currently holds the connection to the gateway 84 indicated by the request (e.g., server 72B) may then send the request to the respective gateway 84 via the gateway-initiated connection.

In at least some embodiments, when a request is delivered to and handled by a gateway 84, a status is returned from the gateway 84 to the gateway control server 72 that currently holds the connection to the gateway 84 (e.g., server 72B), which subsequently returns the status to the gateway control server 72 from which it previously received the forwarded request (e.g., server 72A), which then returns the status to the console process 68. The console process 68 may then provide an indication of results of the request to the customer process (e.g., network administrator process 90) that initiated the request. If a request fails to reach the target gateway 84 for some reason, for example if the gateway 84 indicated by the request is unavailable or cannot be found, the console process 68 may provide an indication of failure of the request to the customer process (e.g., network administrator process 90) that initiated the request. The customer process may retry the request, if necessary or desired.

Figure 22:
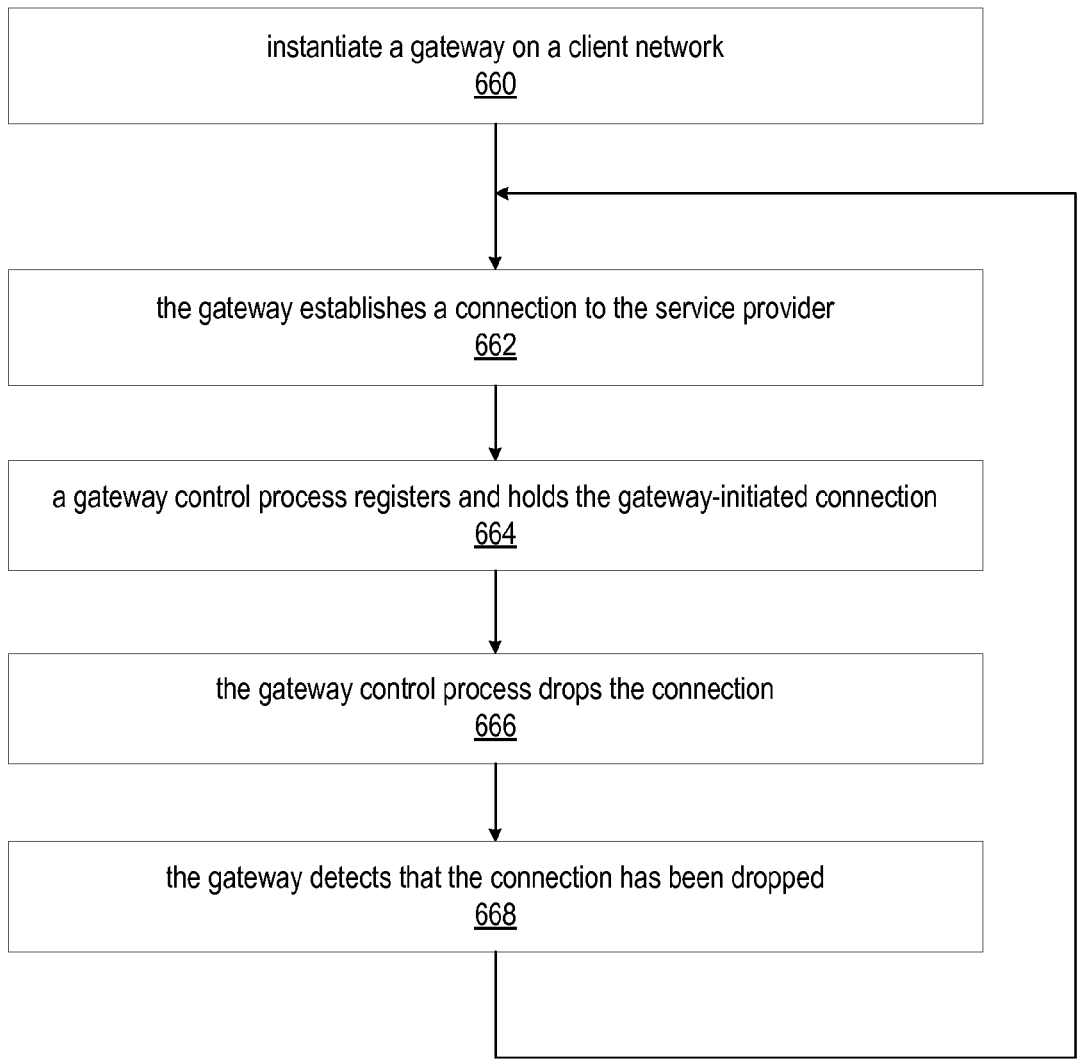
FIG. 22 is a flowchart of a method for establishing, monitoring and maintaining gateway-initiated connections, according to at least some embodiments.

FIG. 22 is a flowchart of a method for establishing, monitoring and maintaining gateway-initiated connections, according to at least some embodiments. As indicated at 660, a gateway may be instantiated on a client network. As indicated at 662, after instantiation, the gateway sends a connection request to the service provider to establish a secure connection (e.g., an SSL (Secure Socket Layer)/TCP connection) to the service provider. In at least some embodiments, a gateway control process at the service provider may hold the connection, and may register the connection with a registration service, as indicated at 664. Requests for the gateway received by the service provider may then be forwarded to the gateway over the gateway-initiated connection.

As indicated at 666, the gateway control process may drop the connection. For example, in at least some embodiments, the gateway control process may periodically or aperiodically ping the gateway over the connection and may, upon detecting that the gateway is not responding to the ping, drop the connection. If registered with a registration service, the gateway control process may unregister the connection.

As indicated at 668, the gateway may detect that the connection has been dropped. For example, in at least some embodiments, the gateway control process may periodically or aperiodically ping the gateway over the connection. The gateway may detect that the connection has been dropped by determining that pings from the service provider are not being received over the connection.

Note that other methods for detecting dropped connections from either the service provider side or the client network/gateway side may be employed in some embodiments.

Gateway Proxies

FIG. 18, described above, illustrates a service provider network that includes a gateway control 70 implemented as a gateway control plane that includes multiple gateway control servers 74. In at least some embodiments, the service provider network may include a gateway proxy plane that includes multiple gateway proxy nodes and that may be used by the gateway control plane to communicate with storage gateways. The gateway proxies may be used to hold and manage the gateway-initiated connections for the gateway control servers 74. The gateways 84 initiate connections to the gateway proxies; the gateway proxies may maintain the communications channels to the gateways 84, and may help in ensuring the secure exchange of messages between the service provider (e.g., the gateway control servers 74) and the gateways, as well as helping to prevent misuse such as multiple copies of the same gateway 84.

Gateway-Proxy Interactions

Figure 23A:
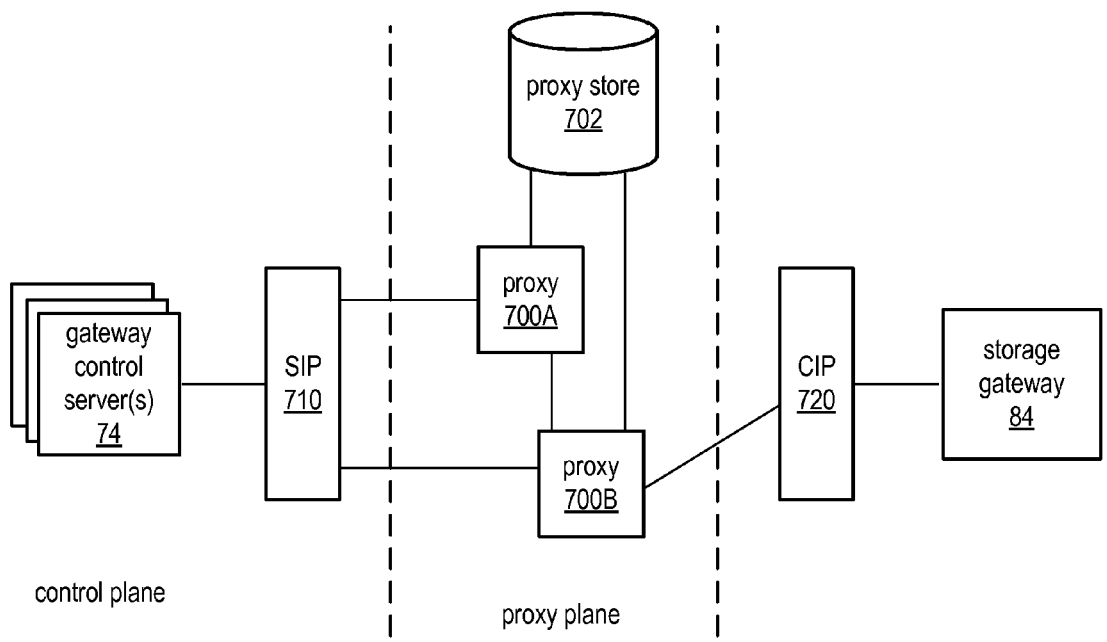
FIG. 23A is a block diagram that broadly illustrates an architecture for a service provider network that includes a gateway proxy plane, according to at least some embodiments.

FIG. 23A is a block diagram that broadly illustrates an architecture for a service provider network that includes a gateway proxy plane, according to at least some embodiments. The gateway proxy plane may include two or more proxy nodes 700, a proxy store 702, a client-side interface process (CIP) 720 that is exposed to the external network, and a server-side interface process (SIP) 710 between the proxy nodes 700 and gateway control server(s) 74 that is not exposed to the external network. In some embodiments, the gateway proxies 700 may be implemented on the same physical devices as the gateway control server(s) 74. In other embodiments, the gateway proxies 700 may be implemented on separate devices than the gateway control server(s) 74.

A storage gateway 84 that is installed and activated initiates a secure connection request (e.g., an SSL/TCP connection request) to the gateway proxy nodes 700 via the CIP 720. The proxy node 700 (in this example, proxy node 700B) that receives the connection request examines the gateway's certificate associated with the connection request to find the gateway identifier and customer account identifier of the gateway 84 that initiated this connection. The customer and gateway 84 may be authenticated using the gateway identifier and customer account identifier from the certificate. After authenticating the customer and gateway 84, the proxy node 700 then publishes to the proxy store 702 that it is the authoritative proxy 700 to communicate with the connected gateway 84. The proxies (e.g., proxy 700A and 700B) may query the proxy store 702 to discover other proxies that currently hold connections to particular gateways.

In at least some embodiments, proxy store 702 may be implemented as a database. The database may be either a distributed or a centralized database. In at least some embodiments, the proxy store 702 may store the following associations:

(gateway ID, account ID, proxy endpoint)

When a message is to be sent to a gateway 84, a proxy 700 may query the proxy store 702 to find which proxy 702 has a connection to the gateway 84. In at least some embodiments, there exists only one entry per gateway 84 in the proxy store 702.

Gateway Control Server-Proxy Interactions

Figure 23B:
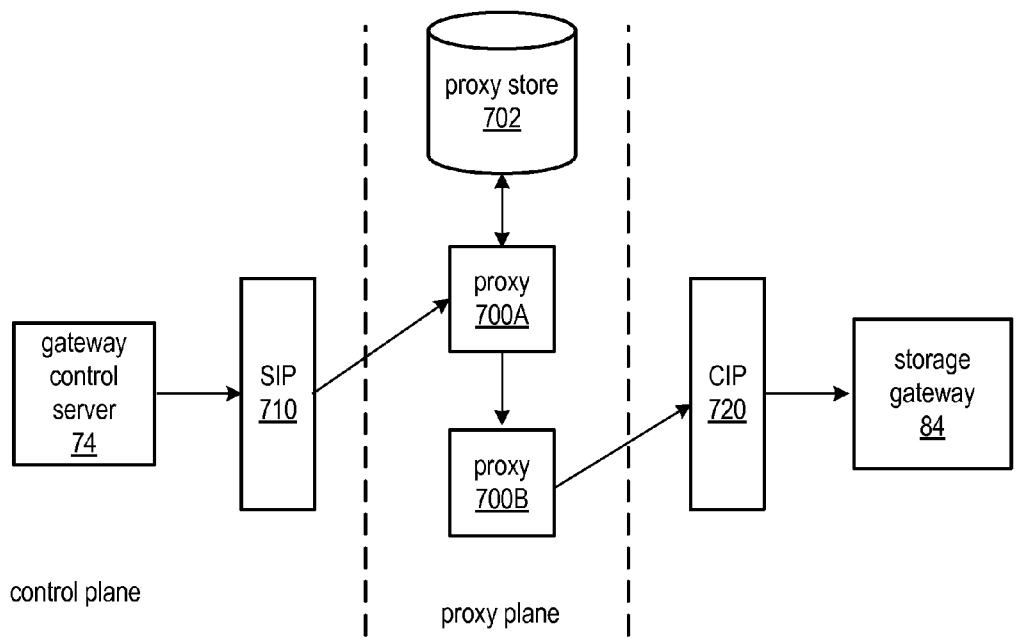
FIG. 23B illustrates a gateway control server messaging a gateway through a gateway proxy plane, according to at least some embodiments.

FIG. 23B illustrates a gateway control server messaging a gateway through the gateway proxy plane, according to at least some embodiments. As shown in FIG. 23B, in at least some embodiments, the gateway control server 74 may have a message that needs to be sent to a particular gateway 84. The gateway control server 74 sends the message to the gateway proxy nodes 700 via the SIP 710. If the proxy node 700 that receives the message holds the connection to the gateway 84, the proxy node 700 forwards the message to the gateway 84 via the connection. However, if the proxy node 700 that receives the message does not hold the connection to the gateway 84, the proxy node 700 queries the proxy store 702 to determine which proxy node 700 holds the connection to the gateway 84, and forwards the message to the authoritative proxy node 700 (in this example, proxy 700B). The authoritative proxy node 700 then forwards the message to the gateway 84 via the connection.

Figure 23C:
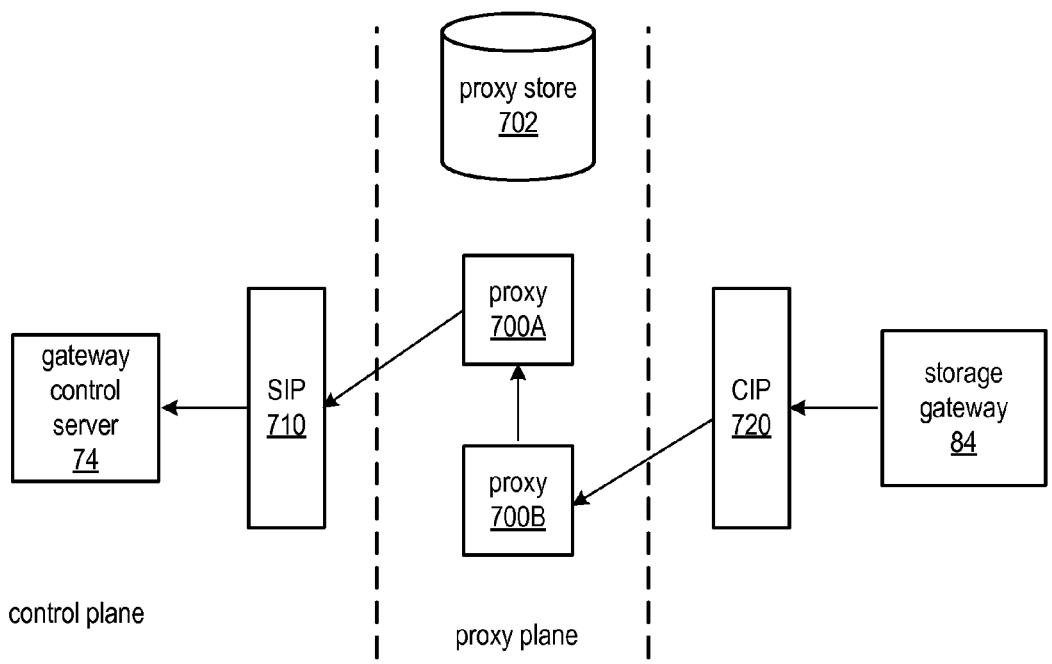
FIG. 23C illustrates a gateway responding to a gateway control server request through the gateway proxy plane, according to at least some embodiments.

FIG. 23C illustrates a gateway responding to a gateway control server request through the gateway proxy plane, according to at least some embodiments. In at least some embodiments, a response from gateway 84 to gateway control server 74 may follow the reverse path that the request from the gateway control server 74 to the gateway 84 followed as shown in FIG. 23B, starting at the CIP 720 receiving the response from gateway 84. The CIP 720 sends the response to the proxy node (proxy 700B) from which it received the request. Note that proxy 700B does not know which gateway control server 74 the response is for. Proxy 700B completes the request by sending the response to the proxy node (proxy 700A) from which it received the request. Proxy 700A then sends the response to the gateway control server 74 that initiated the request.

Connection Monitoring and Management

In at least some embodiments, a ping process may be implemented that is used by the proxies in managing the gateway-initiated connections. In at least some embodiments, a gateway 84 initiates a secure connection, e.g. an SSL/TCP connection, to a gateway proxy 700 via the CIP 720, as previously described. The gateway proxy 700 may periodically or aperiodically send a ping message to the gateway 84. Each ping message may include a timeout; if the gateway 84 does not receive a ping within the time interval, it closes the current connection and re-initiates a connection via the CIP 720. In at least some embodiments, there is only one proxy-gateway mapping in the proxy store 702 at any point in time. If a gateway proxy 700 sends a ping and does not get a response from the gateway 84, it closes its connection to the gateway 84.

In at least some embodiments, on every ping, the gateway proxy 700 checks to see if it is the authoritative proxy for a given gateway 84 by querying the proxy store 702 to determine if another proxy 700 has published a connection to the gateway 84. If it is not the authoritative proxy, the proxy 700 closes the connection to the gateway 84. This may handle cases where multiple connections to the proxy nodes 700 have been initiated by the same gateway 84, for example if the certificate of a gateway 84 has been copied to another gateway and both gateways try to initiate connections.

Figure 23D:
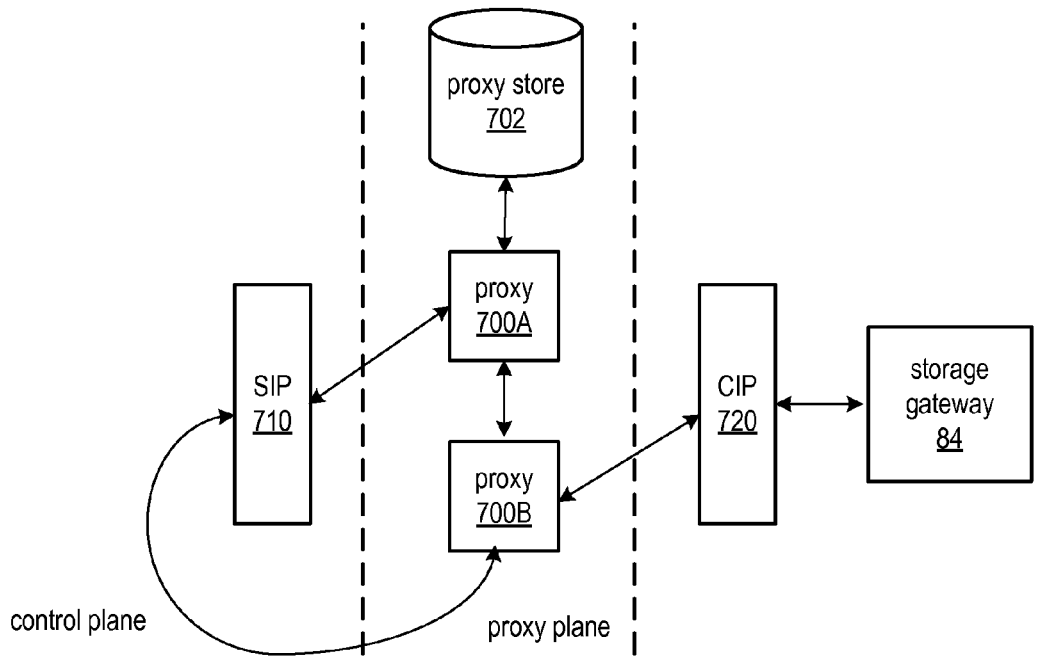
FIG. 23D illustrates ping message exchange for a gateway proxy plane, according to at least some embodiments.

FIG. 23D illustrates ping message exchange for a gateway proxy plane, according to at least some embodiments. In at least some embodiments, a ping in relation to gateway proxies is an end-to-end ping. A reason for pings is that the TCP "keepalive" functionality has a minimum interval of 2 hours, while embodiments may need to detect connection timeouts or terminations at shorter time intervals.

In at least some embodiments, a ping follows the path as shown in FIG. 23D. A gateway proxy node (in this example, proxy 700B) sends a ping message via the SIP 710. The message hits one of the gateway proxy nodes 700, in this example proxy 700A. Proxy 700A finds the authoritative proxy 700 (in this example, proxy 700B) for the gateway 84 by querying the proxy store 702, and forwards the pin message to proxy 700B. Proxy 700B forwards the message to the gateway 84, and the reply from the gateway 84 follows the same path. In at least some embodiments, once proxy 700B gets a reply to a ping from the gateway 84, it increases its ping interval to the gateway 84. If a gateway 84 connection breaks, the ping interval may be reset to a minimum value. Thus, poor gateway-proxy connections tend to get pinged more often.

The end-to-end ping method described above, in which the proxy 700 initiates the ping message by first sending the ping message to the SIP 710, may help to ensure that the gateway proxy nodes 700 are reachable from the control plane. If a ping fails, the proxy 700 may assume that it is not reachable from the control plane (e.g., due to a network partition) and close the connection to the gateway 84.

Remote Gateway Management Using Long-Polling Connections

In some embodiments, a long polling technique may be used for gateway-initiated connections. Referring back to FIG. 18, long polling is a polling technique that emulates an information push from a server (e.g., a gateway control server 74) to a client (e.g., the storage gateway 84). In the long polling technique, a client (e.g., the storage gateway 84) initiates a long-polling connection to the server (e.g., a gateway control server 74) and requests information from the server as in a standard client/server poll. However, if the server does not have any information available for the client, instead of sending an empty response, the server holds the client's request and waits for information for the client to become available. Once the information becomes available, the server (e.g., a gateway control server 74) may respond to the client's long polling request, the response including the information to be sent to the client (e.g., the storage gateway 84).

In a gateway-initiated connection method that uses long-polling, the gateway 84 establishes a connection to a gateway control server 74 via a long polling request. For example, the gateway 84 may establish an outbound SSL/TCP connection with the gateway control server 74 through a load balancer 72, as illustrated in FIG. 18, via a long polling request. The gateway control server 74 holds on to the request and keeps the connection alive. The gateway control server 74 receives a request for the gateway 84. For example, a gateway control server 74 may receive a configuration request or operation request for the gateway 84 from the respective network administrator process 90 via a console process 68, as illustrated in FIG. 18. After the gateway control server 74 receives the request for the gateway 84, the gateway control server 74 sends a response to the gateway's long polling request; the response includes the request for the gateway 84 (e.g., a configuration request or operation request). In some embodiments, as an alternative, the gateway control server 74 may send the received request to the gateway 84 on the established connection to the gateway that the gateway control server is maintaining without responding to the long polling request.

Block Storage I/O Operations on a Storage Gateway

Embodiments of a storage gateway may be implemented as a cached gateway or a shadowing gateway, as previously described. In an example embodiment, a cached gateway may be though of as an on-premise block-based appliance that leverages on-premise (local) storage for most frequent accessed data and remote storage provided by a storage service for essentially infinite total capacity. FIG. 6 is a high-level block diagram that broadly illustrates the architecture of and data flow in an example network environment in which an embodiment of a cached gateway is implemented. A cached gateway may serve as an interface between a service customer's local network and a storage service at a service provider's network. In at least some embodiments, a cached gateway may expose an iSCSI interface to processes on the customer network, although other data interfaces may be exposed in some embodiments. As such, the cached gateway may appear as a data interface target (e.g., an iSCSI target) operating within the client network, e.g., the cached gateway may appear on the client network as a storage array. The cached gateway may, for example, expose logical unit numbers (LUNs), e.g., block-based storage devices such as hard disks, to processes executing on devices within the client network. The processes in turn may initiate data sessions (e.g., SCSI sessions) with LUNs and send data commands (e.g., SCSI commands) to the cached gateway.

Figure 24:
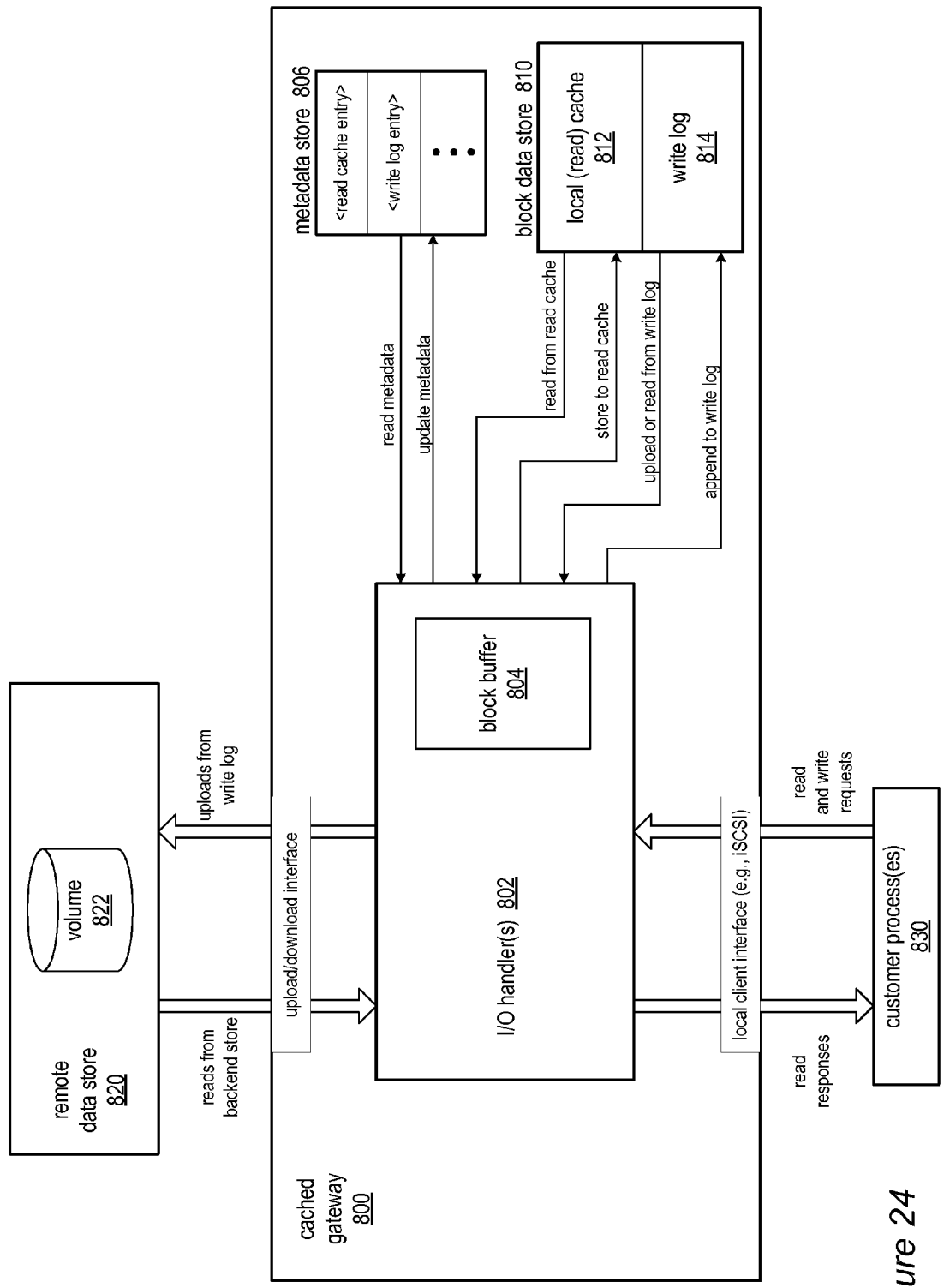
FIG. 24 illustrates a general architecture for and data I/O operations of a cached gateway, according to at least some embodiments.

FIG. 24 illustrates a general architecture for and data I/O operations of a cached gateway, according to at least some embodiments. In general, in a cached gateway 800, when write data is received from a customer process 830, the data is appended to a write log 814; the data is later uploaded to the remote data store 820 from the write log 814 by an upload process. Metadata for the write data relative to a block, e.g. block location, block type, offset(s) and length, may be added to a metadata store 806. In at least some embodiments, the metadata store 806 may be implemented as a database, for example a Berkeley database (BDB). A cached gateway 800 may also locally cache at least some data to a local cache 812, e.g. frequently and/or recently used data, which may improve response to customer read requests as some reads may be satisfied from local cache 812 instead of from the remote data store 820. Local cache 812 may also be referred to as a read cache. The metadata store 806 may also contain location and other information for locally cached read data in local cache 812. While FIG. 24 shows an embodiment in which one metadata store 806 includes both read cache entries and write cache entries, in some embodiments the read cache entries and write cache entries may be maintained in separate metadata stores 806. In at least some embodiments, data read requests from customer processes 830 may be serviced from the write log 814 or local cache 812, if possible; the requested data may be fetched from the remote data store 830 if not. Data from the local cache 812 or the remote data store 830 that is fetched and buffered (e.g., to a block buffer 804) to satisfy a read request may be updated with data from the write log 814, if updates exist in the write log 814 for the data, before the data is returned to the customer process 830 to satisfy the read request.

In at least some embodiments, both the write log 814 and data cache 812 may be implemented in a common, local block-based data store 810. The block data store 810 may be implemented in volatile memory, non-volatile memory, or in a combination thereof. The block data store 810 may be implemented on physical memory within the physical device on which cached gateway 800 is implemented, on memory external to the physical device on which cached gateway 800 is implemented (e.g., on one or more storage devices allocated to the gateway 800 by the customer), or on a combination thereof.

Write log data and cached read data may both be stored to the block data store 810 in a block storage format, for example as 4 MB (four megabyte) blocks. The cached read blocks in the block data store 810 may be considered as a read cache, and the write log blocks in the block data store may be considered as a write buffer. The metadata store 806 may contain entries for locating both read cache 812 blocks and write log 814 blocks in the block data store 810. Blocks may be read from the read cache 812 (or from the write log 814) to satisfy read requests, and blocks may be uploaded from the write log 814 to the remote data store 820 via an upload process. In at least some embodiments, when uploading a write block from the write log 814, the uploaded data may be added to the read cache 812 as a new read block. The uploaded write log 814 blocks may be marked as "free" in the block data store 810, and the metadata store 806 appropriately updated to reflect the changes to the block data store 810.

In at least some embodiments, a write request may modify or mutate only a relatively small portion of a block. Thus, in at least some embodiments, when uploading a block from write log 814, only the mutated portion may be uploaded to remote data store 820, for example using a data deduplication technique as previously mentioned. In addition, the write log 814 may include two or more overlapping writes (i.e., writes to the same logical block) stored in different write log 814 blocks. When uploading write data from the write log 814, the two or more overlapping writes may be combined for uploading. This combining may be performed outside the data store, e.g. in a block in block buffer 804; the blocks in write log 814 itself are not mutated.

As mentioned above, in at least some embodiments, when uploading a write block from the write log 814, the uploaded data may be added to the read cache 812 as a new read block. For at least some cases, for example when a write block includes numerous mutations and/or when a large portion of the write block has been mutated, the write block is simply copied to the read cache 812 as a new read block, and the metadata store 806 is updated. However, as mentioned above, a write request may modify or mutate only a relatively small portion of a write log 814 block. Thus, in at least some cases, the respective block may first be fetched from remote data store 820, and the fetched block updated with the mutation(s) from the write log 814, before adding the block to the read cache 812, to ensure that the entire block in read cache 812 is up-to-date. As mentioned, the write log 814 may include two or more overlapping writes (i.e., writes to the same logical block) stored in different write log 814 blocks, and thus the fetched block may be updated according to one or more write log 814 blocks. In at least some embodiments, the fetched block may be stored to block buffer 804 for updating from the write log 804 blocks before being added to the read cache 812.

Generally, new writes are stored to previously freed write log 814 blocks in the block data store 810; however, if the block data store 810 is detected as being full or nearly full, one or more cached read blocks may be purged to make room for the write data. Note that read blocks may be purged from the block data store 810 for other reasons, for example to clear space for new read data. Different techniques or policies may be used to purge read blocks from the block data store 810 in various embodiments. For example, in some embodiments, a least recently used (LRU) policy may be applied to purge the stalest read blocks from the block data store 810.

In at least some embodiments, the cached gateway 800 may provide an interface to two or more volumes 822 on the remote data store 820. In at least some embodiments, a separate write log 814 and read cache 812 may be maintained by the cached gateway 800 for each volume 822. In at least some embodiments, the separate write logs 814 and read caches 812 for two or more volumes 822 may be implemented in the same block data store 810. However, in at least some embodiments, the write logs 814 and read caches 812 for different volumes 822 may be logically or physically separated on the block data store 810. In addition, in at least some embodiments, separate metadata stores 806 may be maintained for the separate volumes 822.

While FIG. 24 shows read cache 812 and write log 814 as logically separate in block data store 810, in at least some embodiments read blocks and write log blocks for a given volume 822 may be physically intermixed in block data store 810. For example, a first physical block may be a read block, a second through fifth physical blocks may be write blocks, the next two physical blocks may be read blocks, and so on.

Figure 25:
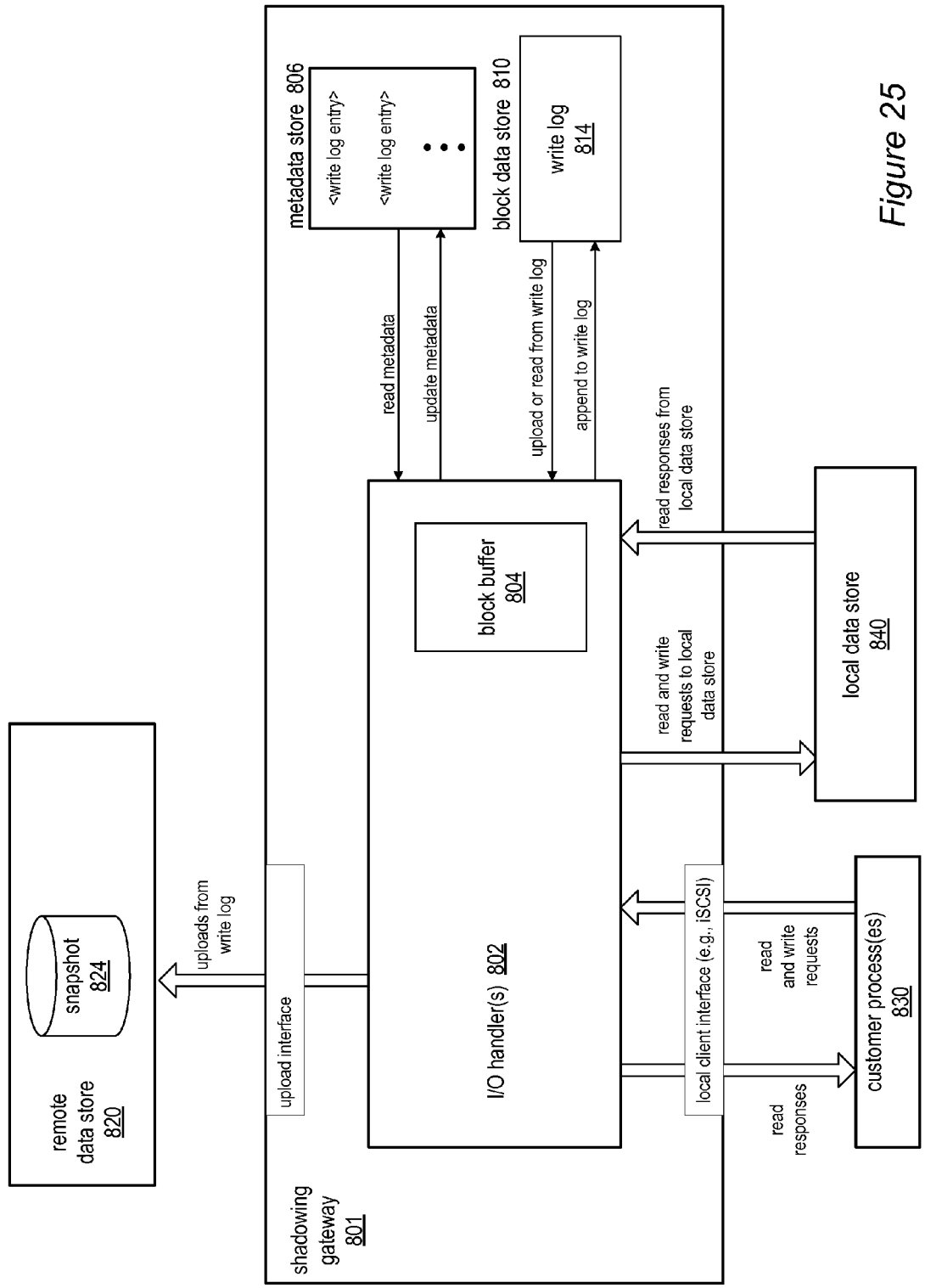
FIG. 25 illustrates a general architecture for and data I/O operations of a shadowing gateway, according to at least some embodiments.

As mentioned, FIG. 24 illustrates a general architecture for and data I/O operations of a cached gateway, according to at least some embodiments. However, a storage gateway may also be configured as a shadowing gateway, for example as illustrated in FIG. 7. FIG. 25 illustrates a general architecture for and data I/O operations of a shadowing gateway, according to at least some embodiments. A shadowing gateway 801 may include a similar architecture, components, and data I/O operations as illustrated and described for cached gateway 800 in FIG. 24, except that a shadowing gateway 801 does not include a read cache 812 or entries in metadata store 806 for the read cache 812, and the read-related operations described above for a cached gateway are not performed. Write operations for a shadowing gateway may be similar to those for a cached gateway, except that writes are not added to a read cache. In addition, read and write requests from customer process(es) 830 are forwarded to a local data store 840. Write data from the write requests, however, are shadowed to remote data store 820. In at least some embodiments, the write data are appended to the write log 814 in block data store 810, and the write data in the write log 814 are periodically or aperiodically uploaded to the remote data store 820, which maintains a snapshot 824 of the primary data store on local data store 840.

In at least some embodiments, the write log 814 and write operations for cached gateways, for example as illustrated in FIG. 24, and for shadowing gateways, for example as illustrated in FIG. 25, may be optimized for write performance. In at least some embodiments, at least some I/O operations of a gateway 800 may use block data store 810 as a sequential data store. In particular, the write log 814 may be treated as a sequential data structure, and write operations to the write log 814 may be implemented as sequential write operations. In at least some embodiments, the write log 814 may be treated as a one-dimensional data buffer implemented as a linear or circular queue. For cached gateways, data downloaded from remote data store 820 may be stored in read cache 812 separately from the write data sent from the customer process(es) 830 to the gateway 800, which is stored in write log 814. For both cached gateways and shadowing gateways, write requests may be received from the customer process(es) 830 in any order (i.e., the write requests may be non-ordered or non-sequential), and write data indicated by the non-ordered write requests received from the customer process(es) 830 may be of arbitrary sizes and may be directed to arbitrary locations or offsets in the target data store. However, the arbitrary write data received from the customer process(es) 830 in non-ordered write requests is sequentially written and appended to the write log 814. In at least some embodiments, the appending may be done at a sub-block level; that is, two or more instances of write data may be appended within the same block in the write log 814. Metadata for the updates to the write log 814, e.g., offset and length of the write data in the write log 814 blocks as well as offset in the target data store, is stored to the metadata store 806.

Figure 26:
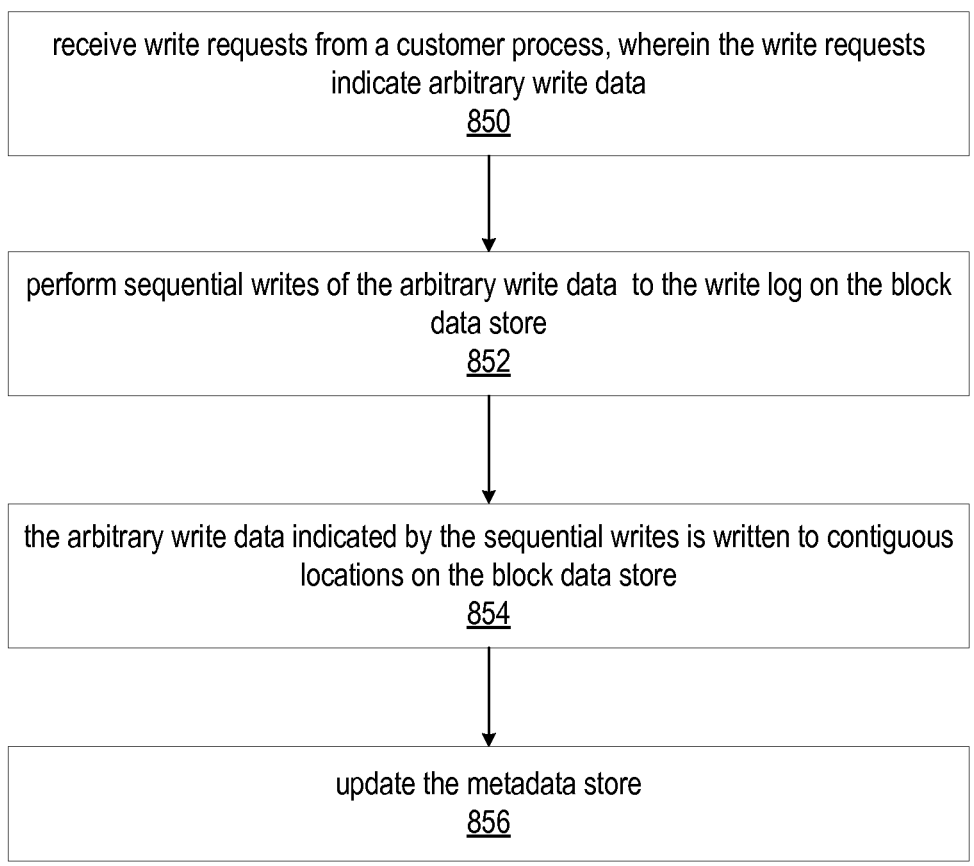
FIG. 26 is a flowchart of a method for writing to a write log on a block data store, according to at least some embodiments.

FIG. 26 is a flowchart of a method for writing to a write log on a block data store, according to at least some embodiments. Implementing the write log 814 as a sequential data structure, for example as a one-dimensional queue, may enable the I/O handler 802 to perform sequential writes of arbitrary write data received from customer process(es) 830 to the block data store 810. As indicated at 850, one or more write requests may be received from a customer process 830. The write requests may be received in any order (i.e., the write requests may be non-ordered), and the write data indicated by the write requests received from the customer process(es) 830 may be of arbitrary sizes and may be directed to arbitrary locations or offsets in the target data store. As indicated at 852, sequential writes may be performed to sequentially write the arbitrary write data to the write log 814 on block data store 810. As indicated at 854, the data in the sequential writes to the block data store 810 may be written to contiguous locations in the block data store 810, for example in contiguous locations (e.g., sectors) on a disk storage device that implements the block data store 810. Note that contiguous locations may be, but are not necessarily, within the same write log block. Using sequential writes to a storage device may reduce or eliminate the need to perform random sector seeks on the underlying storage device. Performing random sector seeks negatively impacts I/O operations. For example, disk I/O throughput may be increased by 10× to 100× by using contiguous writes when compared to non-sequential, non-contiguous writes that require random sector seeks. As indicated at 856, the metadata store 806 may be appropriately updated to reflect the writes to the write log 814. In at least some embodiments, metadata for the writes may be sequentially added to the metadata store 806, which may allow reading of the metadata store 806 by processes that need to access data in the write log 814 more efficient than if the metadata was more randomly added to the metadata store 806.

In at least some embodiments, it may not always be possible to write all write log 814 data to contiguous locations in the block data store 810. For example, there may be a read cache 812 block between two write log 814 blocks. Thus, at 854, embodiments may attempt to write the write log 814 data to contiguous locations as much as possible, but may have to skip some locations (e.g., blocks) if the locations are marked as being used. The metadata store 806 is appropriately updated so that the write log 814 data can be located, even if the data are not stored in contiguous blocks.

As described above, logically, the arbitrary write data is appended to the end of the write log. To implement this, in at least some embodiments, the block buffer 804 is reserved in blocks of the same size used in the write log 814 (e.g., 4 MB blocks). An allocated buffer block is appended to until full. Another buffer block may be allocated for appending new write data; full buffer blocks may be asynchronously and sequentially flushed to the write log 814 on the block data store. Full blocks in the write log 814 may be asynchronously and sequentially uploaded to the remote data store 820 by the upload interface; uploaded blocks from the write log 814 may be marked as "free".

Figure 27:
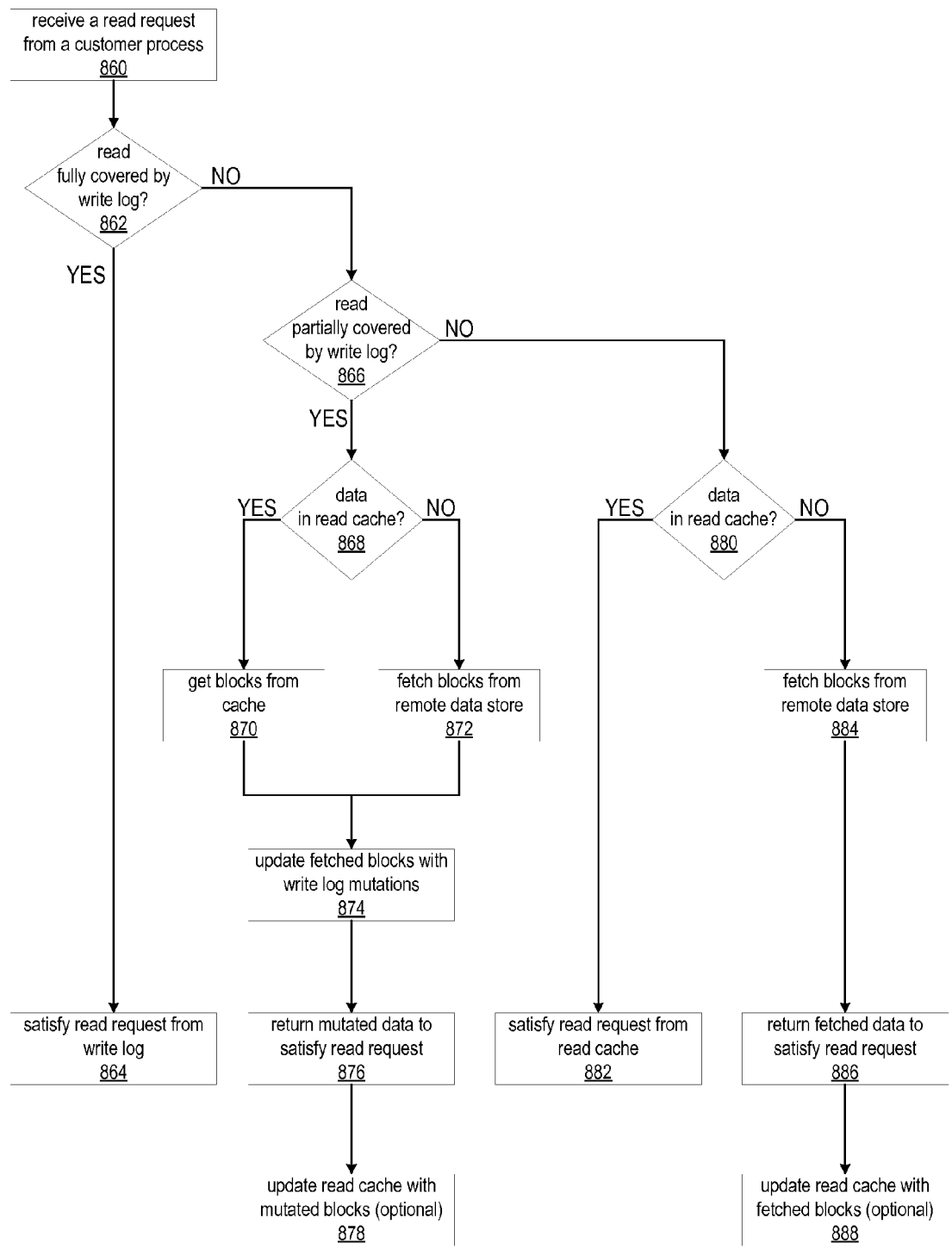
FIG. 27 is a flowchart of a method for satisfying a read request, according to at least some embodiments of a cached gateway.

In cached gateway implementations as illustrated in FIG. 24, to maintain data consistency, read data may need to be merged with write data before the gateway 800 returns the requested data to a customer process 830. FIG. 27 is a flowchart of a method for satisfying a read request, according to at least some embodiments of a cached gateway. As indicated at 860, a read request is received from a customer process 830. In at least some embodiments, when a read request is received from a customer process 830, the gateway 800 looks up the data range of the read in the metadata store 806 to determine if there is data in the write log 814 that overlaps the read range. At 862 of FIG. 27, if overlapping data is found in the write log 814 that fully covers the read range, the data from the write log 814 may be used to directly satisfy the read request, as indicated at 864. Otherwise, at 866 of FIG. 27, if overlapping data is found in the write log 814 that partially covers the read range, the read cache 812 may be checked to see if data is present for the data range, as indicated at 868. If data is in the read cache 812, then one or more data block(s) may be fetched from the read cache 812, as indicated at 870. Otherwise, one or more blocks may be fetched from remote data store 820, as indicated at 872. Note that, in some embodiments, blocks may be fetched from both the read cache and remote data store 820 to satisfy some read requests. At 874 of FIG. 27, the fetched data blocks may then be updated with mutated data from the write log 814. At 876 of FIG. 27, the mutated data may be returned to the requesting process 830 to satisfy the read request. In some embodiments, the updated blocks may be added to the read cache 812, as indicated at 878 of FIG. 27.

In some embodiments, blocks read from the remote data store 820 to satisfy a read request may be added to the read cache 812 and updated from the write log 814 prior to sending the blocks to the requesting process 830. Alternatively, the blocks may be buffered, for example to block buffer 804, and updated in the buffer. The updated blocks may then be sent from the buffer 804 to the requesting process 830 and added to the read cache 814 from buffer 804.

In some embodiments, blocks in read cache 812 that are to be used to satisfy a read request may be updated in place with data from the write log 814 and then sent from the read cache 812 to the requesting process 830 to satisfy the read request. Alternatively, the blocks may be read from the read cache 812 and buffered, for example to block buffer 804, and updated in the buffer. The updated blocks may then be sent from the buffer 804 to the requesting process 830 and added to the read cache 814 from buffer 804. The previous versions of the blocks in the read cache 812 that were read into the buffer may be marked as free and/or overwritten by the newly updated blocks.

At 866 of FIG. 27, if no overlapping data is found in the write log 814, the read cache 812 may be checked to see if the read request can be satisfied from the read cache 812, as indicated at 880 of FIG. 27. At 880 of FIG. 27, if the read request can be satisfied from the read cache 812, then data from the read cache 812 may be returned to the customer process 830 to satisfy the read request, as indicated at 882 of FIG. 27. At 880 of FIG. 27, if the read request cannot be satisfied from the read cache 812, one or more data block(s) may be fetched from remote data store 820, as indicated at 884 of FIG. 27. Data from the fetched blocks may be returned to the customer process 830 to satisfy the read request, as indicated at 886 of FIG. 27. In some embodiments, the blocks fetched from remote data store 820 to satisfy a read request may be added to the read cache 812, as indicated at 888 of FIG. 27.

In at least some embodiments, a gateway 800 may allow customers to request, a snapshot of the write log 814 to be taken and uploaded to the remote data store 820, for example through a console process provided by the service provider. In addition, or instead, the gateway 800 may periodically or aperiodically automatically take and upload a snapshot of the write log 814 to the remote data store 820. Uploading a snapshot of the write log 814 may, for example, provide protection of data from hardware and software failures. In at least some embodiments, the snapshot is a point-in-time snapshot; only mutated data that is in the write log at the time the snapshot is requested is uploaded in the snapshot. In at least some embodiments, for cached gateway implementations, when the mutated data is uploaded, the locally stored read cache 812 may also be updated with at least some of the data being uploaded so that the data does not need to be downloaded from the remote data store 820 for future reads. After the mutated data is uploaded to the remote data store 820, the data in the write log 814 and the corresponding data in the metadata store 806 can be discarded (e.g., marked as "free"), and the space can be reused.

Coalescing Write Data for Upload to the Remote Data Store

As previously described, write log blocks may be periodically or aperiodically uploaded to the remote data store. In at least some embodiments, a data deduplication technique may be used in uploading the write log blocks. However, the described data deduplication technique operates during the upload process on whatever data is in the block(s) that are staged to be uploaded. Since arbitrary writes from the customer process(es) are sequentially appended to the write log, and the customer process(es) may write more than once to the same location in the target data store, a write log block or blocks may include more than one write directed to the same location (e.g., offset and/or range) of the target data store.

Thus, at least some embodiments may implement a pre-upload coalescing technique for the write data in the write log blocks. In this technique, the metadata for a write log block (or blocks) being staged for uploading may be examined to determine if there is more than one write in the write log block(s) directed to the same location in the target data store. If there is more than one write to given location, then the earlier write(s) may be suppressed when building a buffer block to be uploaded. Thus, a block that is passed to the upload process for uploading, e.g. according to the data deduplication technique, may include only one write (the most recent write) to a given location, rather than possibly two or more writes to the same location that may be present if the pre-upload coalescing technique was not applied.

Data Restore and Recovery from a Remote Data Store

Embodiments of a restore process are described that may restore block data to a data volume from a snapshot, and that may be used for data restore and recovery from a remote data store. The restore process may employ an implicit tree structure of the local blocks on the data volume and a method for marking blocks in the tree structure that need to be restored. Note that the snapshot may include snapshot blocks that correspond to the data volume blocks. The data volume blocks may be referred to as local blocks. The restore process does not require a separate data structure or structures to be maintained to record progress of the restore. In at least some embodiments, the restore process may restore the data volume from the snapshot beginning at the root node of the tree and proceeding downward, using the block marking method to indicate local blocks that have not been restored. In at least some embodiments, the restore process may restore specific local blocks on demand. For example, when an I/O request (e.g., a read request or a write request) is received that indicates specific data in the data volume, the restore process may restore the respective local block in the volume from the snapshot to satisfy the request. In at least some embodiments, restores of local blocks that are specified by I/O requests may be prioritized over the general restore of the local blocks indicated by the tree structure so that the I/O request can be satisfied.

In at least some embodiments, the restore process may be implemented by a restore component. In at least some embodiments, the restore component may be implemented on a device that implements a storage gateway on a client network, for example as illustrated in FIG. 1. However, in some embodiments, the restore component may be implemented on other devices on a client network.

The snapshot from which the data volume is to be restored by the restore process may, but does not necessarily, reside on a remote data store on a remote network, for example on a remote data store on a service provider network as illustrated in FIG. 1. The snapshot on the remote data store may be a snapshot that was created by a storage gateway configured as a shadowing gateway, for example as illustrated in FIG. 7. A shadowing gateway is a block-based appliance in which a local data store on a client network, is mirrored or shadowed by the gateway to a remote data store provided by a service provider. However, the snapshot may have been generated on the remote data store by some other process or method. For example, the snapshot may have been imported to the remote network by a client. As another example, the snapshot may have been generated by the client on the remote data store via a storage service or some other service of the service provider according to some other interface to the service provider than a shadowing gateway. The snapshot may be generated by any of other various techniques. In general, the location of the snapshot and the method used to generate the snapshot is not important to the restore process described herein; any technique for generating a snapshot of a data volume may be used, and the snapshot may reside on the local network on which the restore process is implemented or on a remote network.

Figure 28:
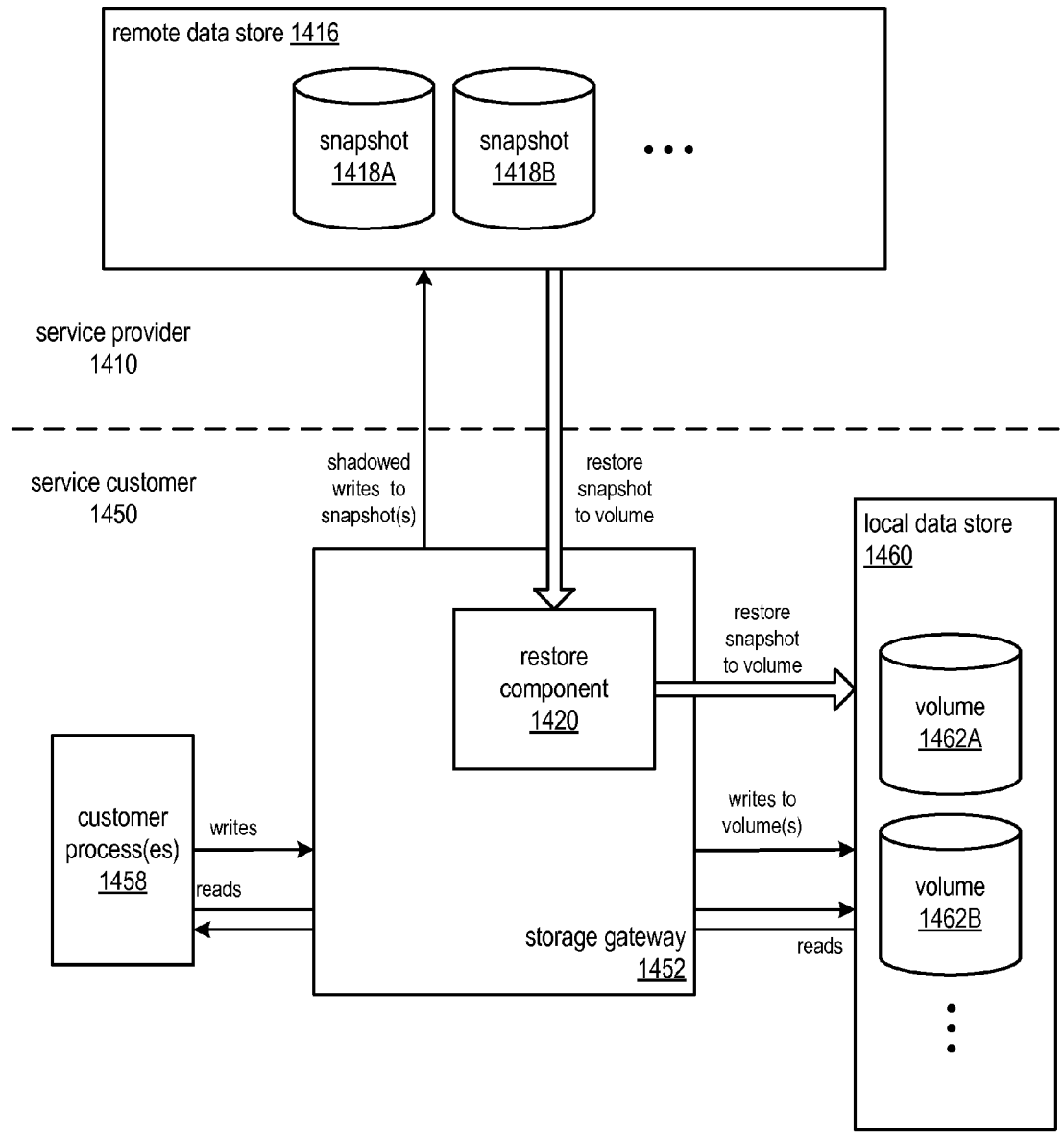
FIG. 28 is a high-level block diagram that illustrates an example network environment including a storage gateway that implements a restore component, according to at least some embodiments.

FIG. 28 is a high-level block diagram that illustrates an example network environment including a storage gateway 1452 that implements a restore component 1420, according to at least some embodiments. The storage gateway 1452 may be, but is not necessarily, configured as a shadowing gateway that shadows one or more volumes on local storage to create snapshots on a remote data store 1416 and that includes a restore component. As a shadowing gateway, storage gateway 1452 may generate one or more snapshots 1418 of one or more volumes 1462 on local data store 1460 on the remote data store 1416 at service provider 1410. Note, however, that one or more of snapshots 1418 may be generated by some other process or method, as described above.

As shown in FIG. 28, a restore component 1420 for restoring volumes 1462 from snapshots 1418 may be provided. In at least some embodiments, restore component 1420 may be implemented on one or more computing devices at the service customer 1450 data center. In at least some embodiments, restore component 1420 may be implemented on the storage gateway 1452 device as shown in FIG. 28. In at least some embodiments, the restore component 1420 may be a component of the storage gateway process on the storage gateway 1452 device. Alternatively, the restore component 1420 may be implemented on the on the storage gateway 1452 device separately from the storage gateway process. In some embodiments, restore component 1420 may be implemented on one or more computing devices at the service customer 1450 data center separate from the storage gateway 1452 device.

The customer 1450 may desire or require to restore a local volume 1462 from a snapshot of the local volume, for example a snapshot 1418 on the remote data store 1416. In at least some embodiments, to invoke a restore of a local volume 1462 (e.g., volume 1462A) from a corresponding snapshot (e.g., snapshot 1418A) on the remote data store 1416, an administrator may request the restore via an interface to a service provider console process. For an example of a console process, see FIG. 1. The customer 1450 may specify which volume 1462, for example volume 1462A, is to be restored. The customer 1450 may also specify which snapshot 1418, for example snapshot 1418A, is to be used to restore the specified volume 1462. The specified snapshot 1418 may have been generated by the storage gateway 1452 configured as a shadowing gateway, or may have been otherwise generated. In some embodiments, other methods may be used to invoke a restore of a local volume, and to specify a local volume to be restored and/or a snapshot from which the specified local volume is to be restored.

A volume 1462 and its corresponding snapshot 1418 may be quite large. For example, a volume 1462 and its corresponding snapshot 1418 may each occupy gigabytes, terabytes or even petabytes of storage space. The snapshots 1418 may be stored in remote data store 1416 according to a block storage format. In at least some embodiments, 4 MB (four megabyte) blocks may be used, but other sizes of blocks may be used. However, available bandwidth on a communications channel between the service provider 1410 and the service customer 1450 over which the restore component 1420 restores data from a snapshot 1418 on remote data store 1416 to a volume 1462 on local data store 1460 may be relatively narrow, for example one gigabyte. Given a large snapshot 1418 to be restored via a relatively narrow communications channel, a restore may thus take many hours or even days, and having to restart the restore process upon failure would clearly be problematic. Thus, embodiments may provide a restore component 1420 that implements a restore process that is relatively fast and efficient, and that may recover from failures with relatively little or no data having to be re-transmitted from the service provider 1410 to the service customer 1450. Furthermore, the service customer 1450 may not wish or be able to wait for the restore process to complete to access data on the volume 1462 being restored. The restore process implemented by restore component 1420 thus may allow customer process(es) 1458 to read and write data to a volume 1462 during the restore process by implementing a technique for fetching specific block(s) of data from the snapshot 1418 as needed.

Embodiments of the restore component 1420 may implement a restore process that may restore data to a volume 1462 at the time a user requests the blocks of data from the volume 1462 without requiring a data structure or structures to record progress of the restore. Using such a data structure may present consistency problems that may make it difficult to determine whether a block of data in the volume 1462, referred to as a local block, has been restored and then mutated, or whether the local block has never been restored and is pending restore. Embodiments of the restore component 1420 may allow data in a volume 1462 to be mutated as the volume is being restored from a snapshot 1418, and may implement a technique for determining whether a given local block has been restored or is pending restore.

The restore process may be implemented according to a restore algorithm that gradually restores a given volume 1462 from a specified snapshot 1418, while persisting metadata regarding the restore process that enables the restore process to determine which snapshot 1418 blocks have been restored to the volume 1462, or conversely which volume 1462 blocks (referred to as local blocks) have been restored from the snapshot 1418. To accomplish this, one or more local blocks in the volume 1462 may be marked to indicate that the respective local blocks have not been restored and thus need to be restored. To mark a local block, mark data (e.g., a random number, bit pattern, fingerprint, or any data sufficient to identify the local block as not being restored) may be written to one or more locations within the local block.

Figure 29:
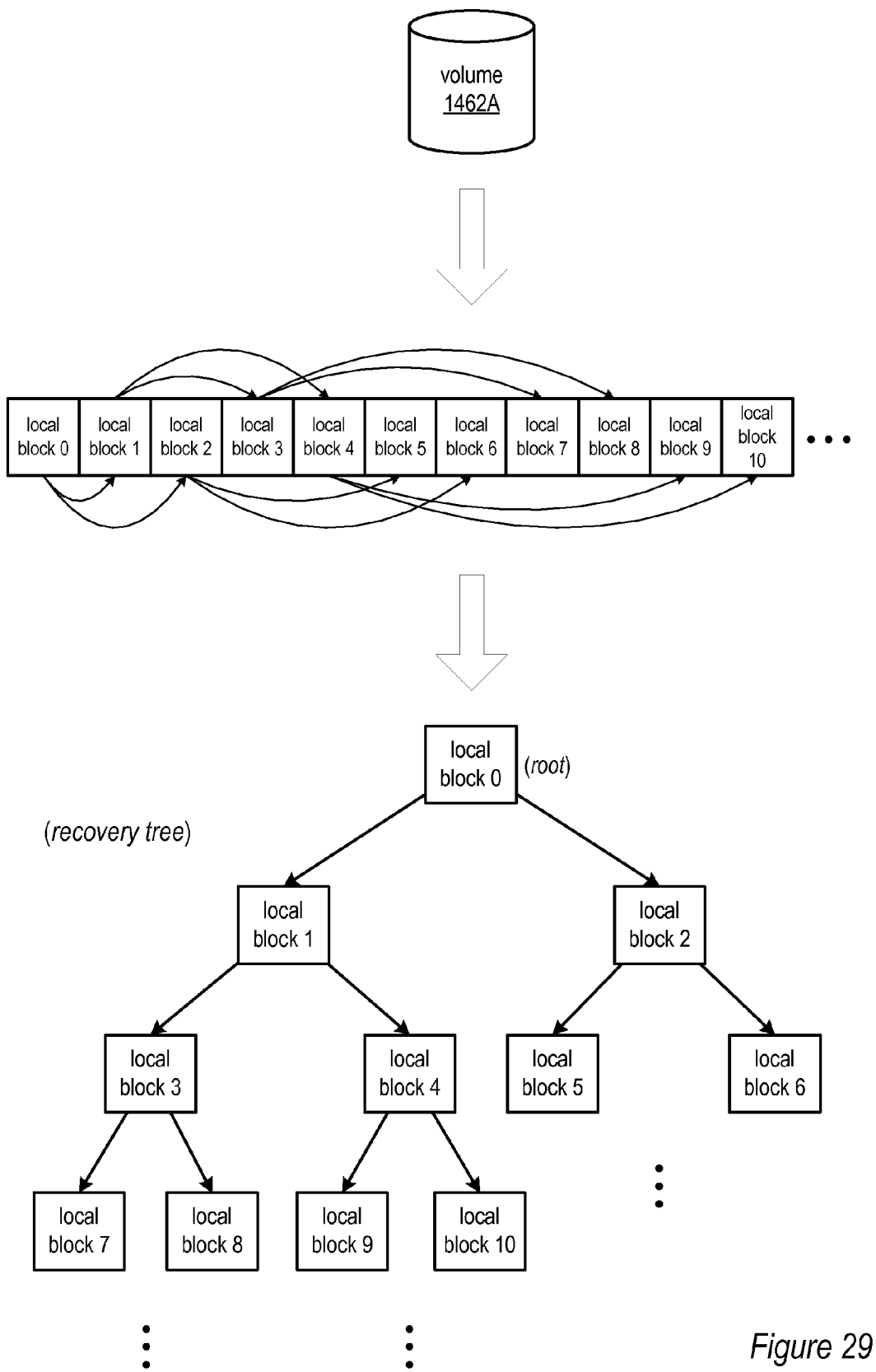
FIG. 29 graphically illustrates an implicit recovery tree structure for a local volume, according to at least some embodiments.

The restore algorithm may restore the blocks on a given volume 1462 using an implicit recovery tree structure of the local blocks on the volume 1462. FIG. 29 graphically illustrates an implicit recovery tree structure for a local volume, according to at least some embodiments. A local block is a data block on volume 1462 of a given block size S. In at least some embodiments, S=4 MB (four megabytes). However, other block sizes may be used. Local block n may be used to refer to the local block starting at an offset S*n in the volume 1462. FIG. 29 shows local blocks 1 through 10 of volume 1462. The recovery tree, as shown in FIG. 29, is an implicit or logical tree formed by the local blocks from volume 1462. In at least some embodiments, in the recovery tree, a local block at position n may have two children, the local blocks at positions 2n+1 and 2n+2. For example, local block 4 has two children, the block at 2(4)+1 (local block 9) and the block at 2(4)+2 (local block 10). However, a given node may have one or no children; a node with no children (e.g., local blocks 5 through 10) may be referred to as a leaf node. In addition, a given local block n has at most one parent (local block 0 at the root node, however, has no parent). For example, local block 10 has the parent local block 4. Thus, the recovery tree may be an implicit binary tree structure. Note that each local block in the recovery tree may be considered as a node of the tree. Also note that, for each local block n that is not the root node there is a single path to the root node (local block 0), with one and only one local block as an ancestor of local block n at each level.

While the recovery tree is illustrated and described as a binary tree, other tree structures may be used in some embodiments. For example, m-ary trees, where m is greater than 2, may be used instead of a binary tree.

A snapshot block is a block of size S on the snapshot 1418 corresponding to the volume 1462. Each snapshot block maps to a particular local block of the respective volume 1462.

Figure 30:
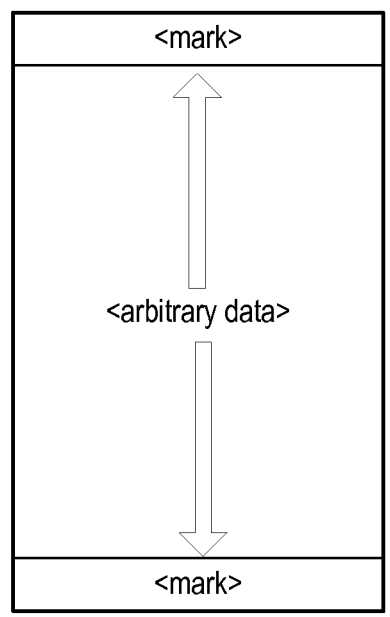
FIG. 30 illustrates an example fingerprinted local block, according to at least some embodiments.

FIG. 30 illustrates an example marked local block n, according to at least some embodiments. In at least some embodiments, the restore algorithm may place marks at one or more locations within a local block to indicate that the respective local block has not been restored. Any type of data that is sufficient to identify that the respective local block has not been restored or needs to be restored may be used as a mark. Generally, to be sufficient to identify that the respective local block has not been restored, the mark that is used should be data (i.e., a bit pattern) that is unlikely to occur in a local block. In some embodiments, marks that are unique for each local block may be used. In other embodiments, the same mark may be used for all local blocks.

As examples of marks that may be used, randomly generated numbers or bit patterns may be used to mark the local blocks. As a specific example of a mark that may be used in at least some embodiments, fingerprints generated from metadata for the respective local block may be used to mark a local block that has not been restored. In at least some embodiments, a fingerprint may be a hash of metadata that includes a block identifier (block ID) and/or other block information, and that may also include one or more of, but not limited to, a volume identifier (volume ID), a volume size, a position on the volume, and a snapshot identifier (snapshot ID). In at least some embodiments, the hash may be a SHA-256 hash. However, other methods may be used to generate fingerprints for local blocks in some embodiments.

As shown in FIG. 30, in at least some embodiments, a mark for a local block n may be placed at the beginning and end of the block. However, note that in various other embodiments, a single mark may be used, or more than two mark may be used, to mark a local block n to indicate that the respective local block has not been restored. For example, a single mark may be placed at the beginning or end of a local block n, or the mark may be placed at the beginning, middle, and end of a local block n, or the mark may be placed at several or many locations in a local block n. Note that marking a local block n at least at the beginning and end of the block, rather than using a single mark, may, for example, help in recovery after a crash or failure as multiple marks in a local block may help in determining if the local block on volume 1462 was partially or fully restored prior to the crash.

In the following discussion of the restore process, fingerprints are provided as a specific example of a mark that may be used to indicate that the local blocks have not been restored. However, it is to be understood that other methods for marking the local blocks (e.g., random numbers, bit patterns, etc.) may also be used to mark the local blocks.

As previously noted, each local block n in the recovery tree may be considered as a node of the tree. A node in the tree for which the corresponding local block is fingerprinted may be referred to as a fingerprinted node.

Figure 31:
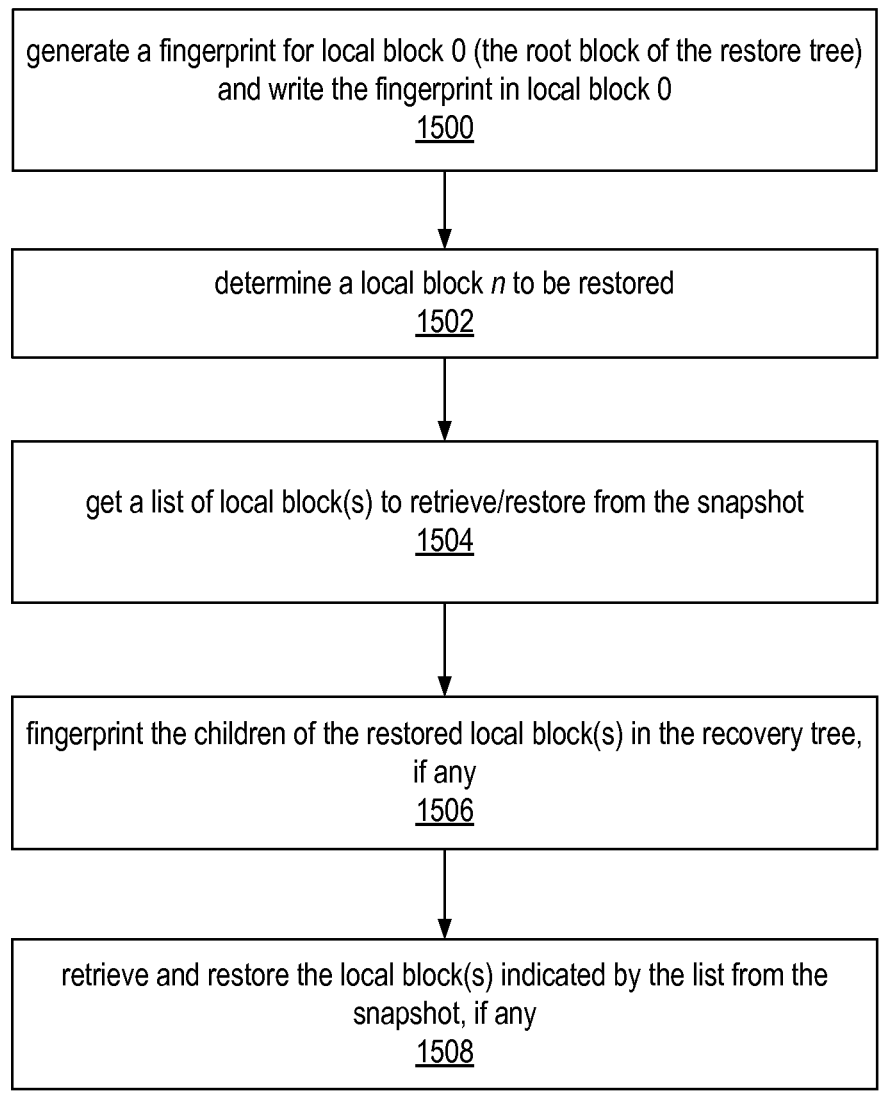
FIG. 31 illustrates a restore process implemented according to the restore algorithm, according to at least some embodiments.

FIG. 31 illustrates a restore process implemented according to the restore algorithm, according to at least some embodiments. As indicated at 1500, in at least some embodiments, at startup of the restore process, the restore process may generate a fingerprint for local block 0 (i.e., the root node of the recovery tree), and write the fingerprint to the local block 0, for example at the beginning and end of the block (see FIG. 32A). In at least some embodiments, the fingerprint may be a hash of a known identifier along with metadata including one or more of, but not limited to, a volume identifier (volume ID), a volume size, a position on the volume, and a snapshot identifier (snapshot ID).

As indicated at 1502, a local block n to be restored may be determined. For example, in at least some embodiments, the restore process may start at the root noted of the recovery tree and traverse the nodes of the recovery tree downwards in some order, for example in sequential order of the block numbering as illustrated in FIG. 29, restoring local blocks at the nodes as they are traversed as necessary. Thus, the local block n may be determined by the normal top-down traversal of the tree during the restore process. As another example, an I/O request that indicates a local block n may be received at some time during the restore process. For example, the request may be a read or a write for the local block n. The restore process thus may need to determine if the indicated local block n has been restored and, if not, restore the indicated local block n to satisfy the I/O request. Thus, the local block n that is determined to be restored may be a local block that is indicated by an I/O request that has not been restored. Note that, in some embodiments, restores of local blocks to satisfy I/O requests may be prioritized over restores of local blocks according to the top-down restore being performed by the restore process.

In some embodiments, the restore process may be a lazy restore that only restores local blocks when requested. In other words, in these embodiments, the restore process may not perform the top-down restore of the local blocks in the data volume as described above, but may instead only restore local blocks when the local blocks are requested, for example via I/O requests directed to the local blocks.

The restore process needs to determine whether the local block n has already been restored and, if the local block n has not been restored, the restore process needs to determine one or more local block(s) on the path from the root node to local block n that need to be restored, restore the indicated local block(s) on the path, and appropriately modify the recovery tree by fingerprinting other local blocks at child nodes of the restored local block(s) on the path. To do this, the restore process uses the recovery tree structure and the fingerprints that may be written to the local block(s) in the recovery tree, as described below.

As indicated at 1504, the restore process may generate a list of local block(s) to retrieve and restore from the snapshot, starting at the root node of the recovery tree and extending to the node of the recovery tree corresponding to the target local block n. To generate the list of local block(s) for the target local block n, this method may begin looking at local blocks starting from the root node of the recovery tree, and proceed downwards to the target local block n. When a transition from a non-fingerprinted node to a fingerprinted node is encountered, the method starts recording all of the local blocks until you target local block n is reached. If there are no transitions from a non-fingerprinted node to a fingerprinted node, then all of the nodes in the traversed path have been restored. Note that there may be no local blocks that need to be restored, the local block n may be the only local block that needs to be restored, or there may be two or more local blocks that need to be restored.

The following is example pseudocode for a function to generate and return a list of local block(s) to retrieve and restore for a given local block that starts at the root node and proceeds downward to the target local block, and is not intended to be limiting. The function (called GetRestoreBlockList) receives as input an indication of a current local block to be restored (the target local block), and returns a list of indicators of local block(s) (or nodes) to be restored, referred to as a restore block list. The function returns NULL if there are no blocks to be restored. Comments are indicated by "//":

```
Function GetRestoreBlockList (target local block indicator) returns
list<local block indicator>
{
    //   Handle the case where the target local block is at the root node
    If the target local block is the root node and is fingerprinted, add the
        target local block to the restore block list and return the restore
        block list.
    if the target local block is the root node and is not fingerprinted,
    return NULL;
    //   Build the list of local block indicators
    Set start recording to false.
    Set the current local block to the root node.
    Repeat:
    {
        Set the previous local block to the current local block.
        Get the child block of the current local block on the path to the
            target local block and set the current local block to the child
            block.
        If the previous local block is not fingerprinted and the current
            local block is fingerprinted, set start recording to true.
        If start recording is true, add the current local block to the
            restore block list.
    }
    until the current local block is the target local block.
    Return the restore block list.
} end <GetRestoreBlockList>
```

Figure 32:
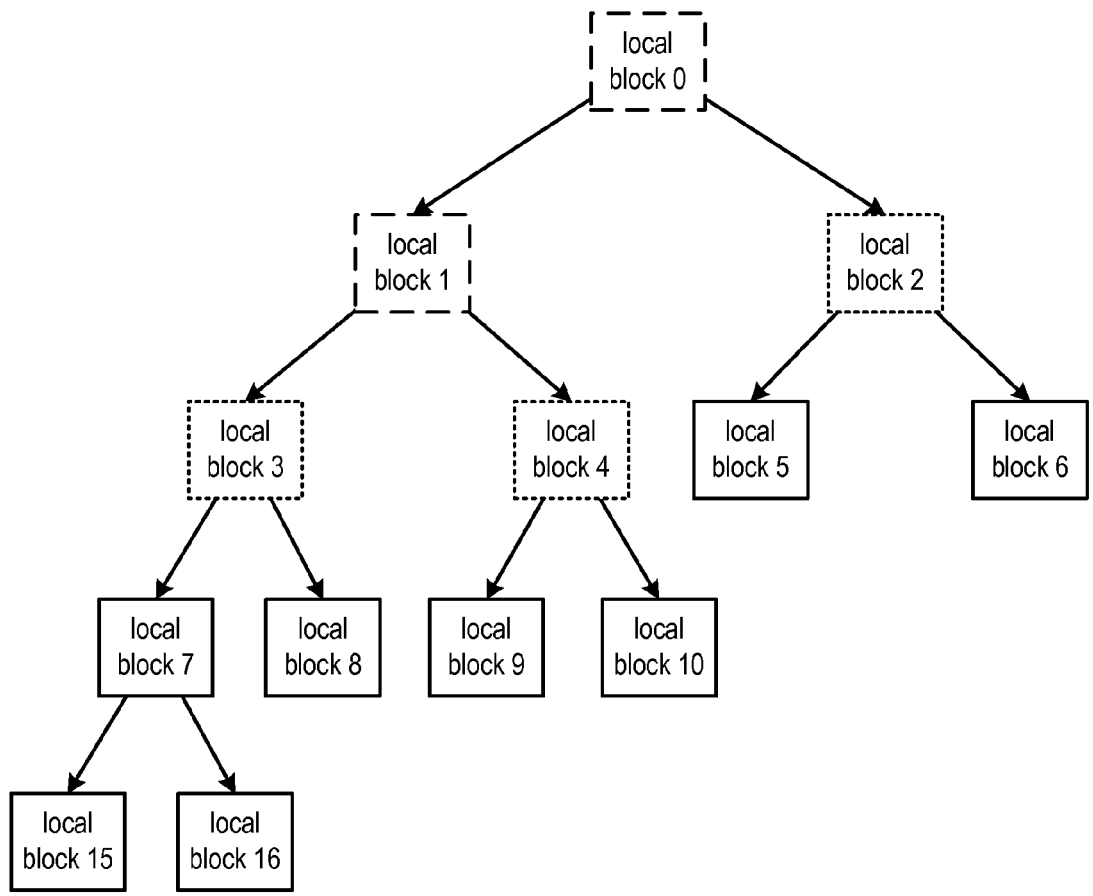
FIG. 32 graphically illustrates a method for building a list of local blocks to be restored that begins at the root node and goes to the target local block using a representation of the recovery tree, according to at least some embodiments.

FIG. 32 graphically illustrates a method for building a list of local blocks to be restored that begins at the root node and goes to the target local block using a representation of the recovery tree, according to at least some embodiments. In FIG. 32, a portion of a recovery tree is shown. A local block indicated by a dotted rectangle indicates a fingerprinted node, a node with a dashed rectangle indicates a node for which data has been restored from the snapshot, and a node indicated by a solid rectangle indicates a node for which the data has not been restored from the snapshot. Local block 15 needs to be restored, and so is the target local node. The method scans the tree from the root node (local block 0) downwards to local block 15. At the point where the method determines that local block 1 is not fingerprinted and local block 3 is fingerprinted, the method starts recording all of the nodes that are encountered on the path downwards to local block 15 (the target local node). In this example, the restore block list would include local block 3, local block 7, and local block 15.

Returning to FIG. 31, as indicated at 1506, the restore process may fingerprint the children of the restored local block(s) in the recovery tree, if any. As indicated at 1508, after generating the restore block list, the restore process may retrieve and restore the local block(s) indicated by the list from the snapshot, if any. The restore block list may include indications of one or more local blocks to be restored (or of the corresponding nodes in the recovery tree) from a first local block at the top of a path in the recovery tree to the target local block. Note that the restore block list may indicate two or more local blocks on the path, just one local block, or may be NULL or empty or otherwise indicate that there are no local blocks that need restoring. For each local block that is to be restored from a corresponding snapshot block as indicated by the restore block list, the children of the local block in the recovery tree are fingerprinted, if necessary. For each entry in the restore block list, the corresponding snapshot block is fetched from the snapshot of the volume on the remote data store and written to the corresponding local block in the local volume being restored. The following is example pseudocode for a function that fingerprints the children of local block(s) to be restored as indicated by a restore block list and restores the indicated local block(s) from the snapshot, and is not intended to be limiting. The function (called RestoreBlocks) receives as input the restore block list, a list of indicators of local block(s) to be restored:

```
Function RestoreBlocks(restore block list)
{
    For each local block indicated in the restore block list:
        For each child node of the local block in the recovery tree:
            Fingerprint the local block at the child node.
            Get the snapshot block from the snapshot and write the snapshot
                block to this local block.
} end < RestoreBlocks>
```

Note that in various embodiments, the local blocks indicated by restore block list may be restored from the first ancestor local block of the target local block in the path downward to the target local block, from the target local block upward to the first fingerprinted ancestor local block of the target local block, or may be restored in an arbitrary order.

If the target local block n was determined from an I/O request, once the target local block n has been restored from the snapshot, the I/O request for the local block n may be serviced. For example, if the request is a read request, the read from the local block n may proceed as soon as local block n is restored.

While the recovery tree used by the restore algorithm is described above as a binary tree, other tree structures may be used, for example m-ary trees. Embodiments of the restore algorithm as described herein, implemented by the restore process, may enable the restore process to effectively determine if a given local block on the local volume has been restored from the corresponding snapshot in the order of log(n) for a binary tree and $\log_m(n)$ for an m-ary tree, without requiring a mechanism to verify hashes of local blocks with snapshot blocks to find if a local block has been fetched from the snapshot, and without requiring a data structure or structures to record progress of the restore.

In some embodiments, at 1504, as an alternative method for generating the list of local block(s) to retrieve and restore from the snapshot, the restore process may generate the list of local block(s) starting at the node of the recovery tree corresponding to the target local block n, instead of starting at the root node of the tree. To generate the list of local block(s) for the target local block n, this method may traverse the recovery tree upwards from local block n and record ancestors of the target local block n until transitioning from a fingerprinted node to a non-fingerprinted node, or until the recovery tree cannot be traversed any farther (i.e., the root node has been reached). If the target local block n and none of its ancestors are fingerprinted, then the data in the target local block n have already been restored. If a fingerprinted node is encountered, then the local block at that node and the local blocks at all of its descendent nodes on the path to local block n need to be restored, and are thus included in the list.

The following is example pseudocode for a function to generate and return a list of local block(s) to retrieve and restore for a given local block that starts at the target local block and proceeds upward, and is not intended to be limiting. The function (called GetRestoreBlockListFromNodeN) receives as input an indication of a current local block to be restored (the target local block), and returns a list of indicators of local block(s) (or nodes) to be restored, referred to as a restore block list. The function returns NULL if there are no blocks to be restored:

```
Function GetRestoreBlockListFromNodeN (current local block indicator)
returns list<local block indicator>
{
    If the current local block is at the root node of the recovery tree and
        the current local block is fingerprinted, add the current local
        block to the restore block list and return the list.
    Repeat
    {
        Add the current local block to the restore block list.
        Set a previous local block indicator to the current local
            block.
        Set the current local block indicator to the parent of the
            current local block in the recovery tree.
    }
    until the previous local block is fingerprinted AND the current local
        block is not fingerprinted OR until the previous local block is at
        the root node of the recovery tree.
    If the previous local block is at the root node of the recovery tree and
        the previous local block is not fingerprinted, then return NULL.
    Return the restore block list.
} end <GetRestoreBlockListFromNodeN>
```

FIGS. 33A through 33D graphically illustrate the restore process using a representation of the recovery tree, according to at least some embodiments. In FIGS. 33A through 33D, a local block indicated by a dotted rectangle indicates a fingerprinted node, a node with a dashed rectangle indicates a node for which data has been restored from the snapshot, and a node indicated by a solid rectangle indicates a node for which the data has not been restored from the snapshot.

Figure 33A:
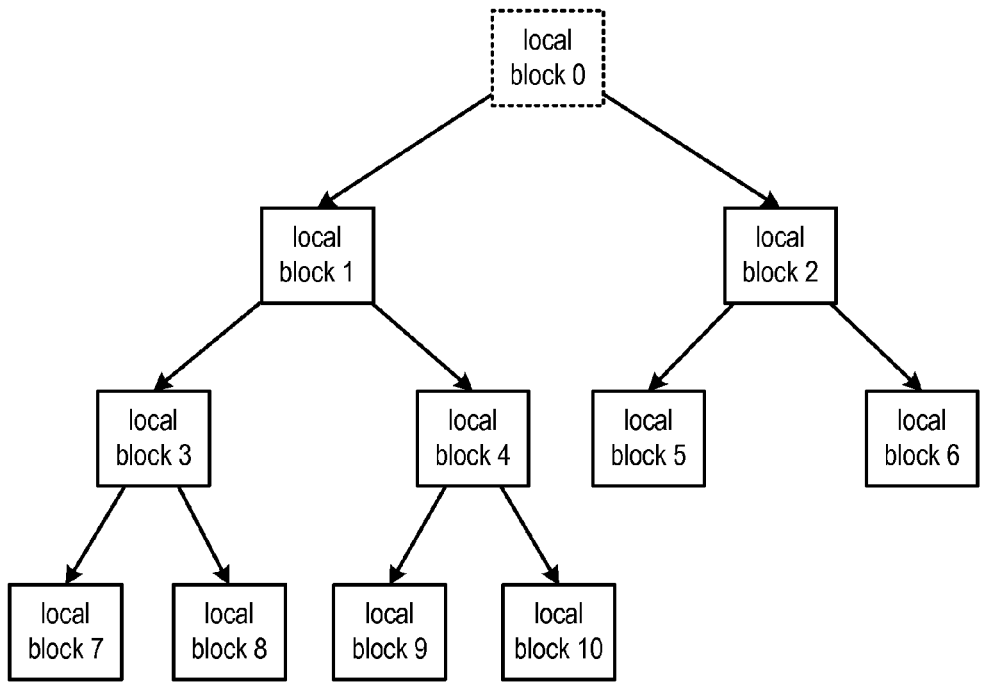
FIGS. 33A through 33D graphically illustrate the restore process using a representation of the recovery tree, according to at least some embodiments.

FIG. 33A illustrates the recovery tree at startup of the restore process. As an initial step, the restore process may generate a fingerprint for local block 0 (i.e., the root node of the recovery tree), and write the fingerprint to the local block 0, for example at the beginning and end of the local block. Fingerprinting local block 0 (the root node) indicates that no local blocks on the volume have been restored from the snapshot.

Figure 33B:
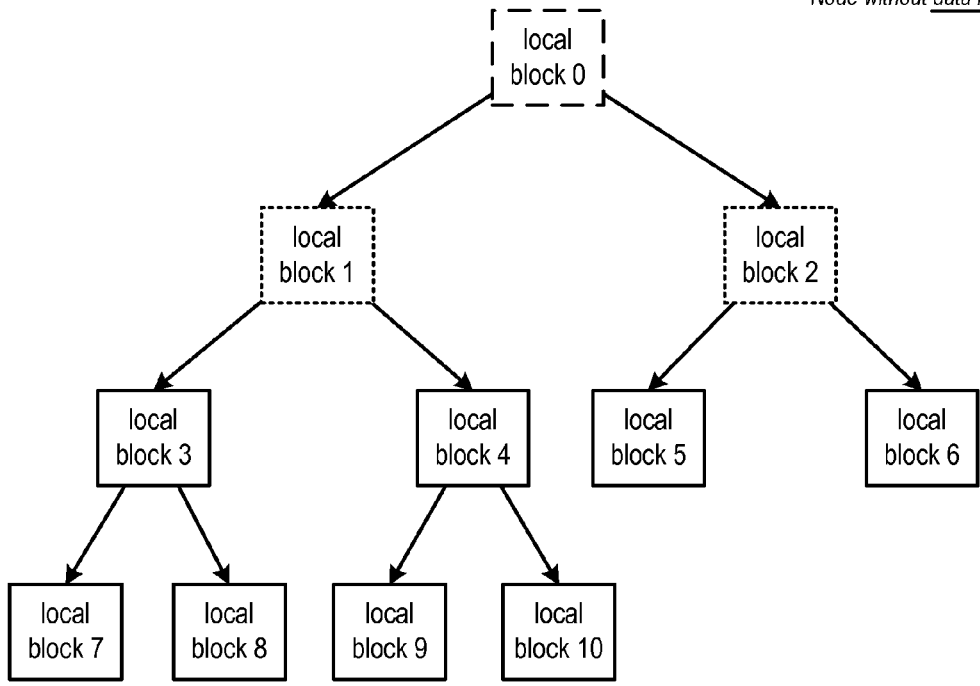

FIG. 33B graphically illustrates the results of a read to local block 0 in the recovery tree structure. If a read for local block 0 occurs and local block 0 is fingerprinted, the restore process then fingerprints the children of local block 0 (local block and local block 2), as indicated in FIG. 33B, fetches the corresponding snapshot block from the snapshot, and writes the data in the snapshot block to local block 0 of the volume. Note that writing the data from a snapshot block to the corresponding local block overwrites the fingerprint(s) in the local block. The read to local block 0 can then be processed.

Figure 33C:
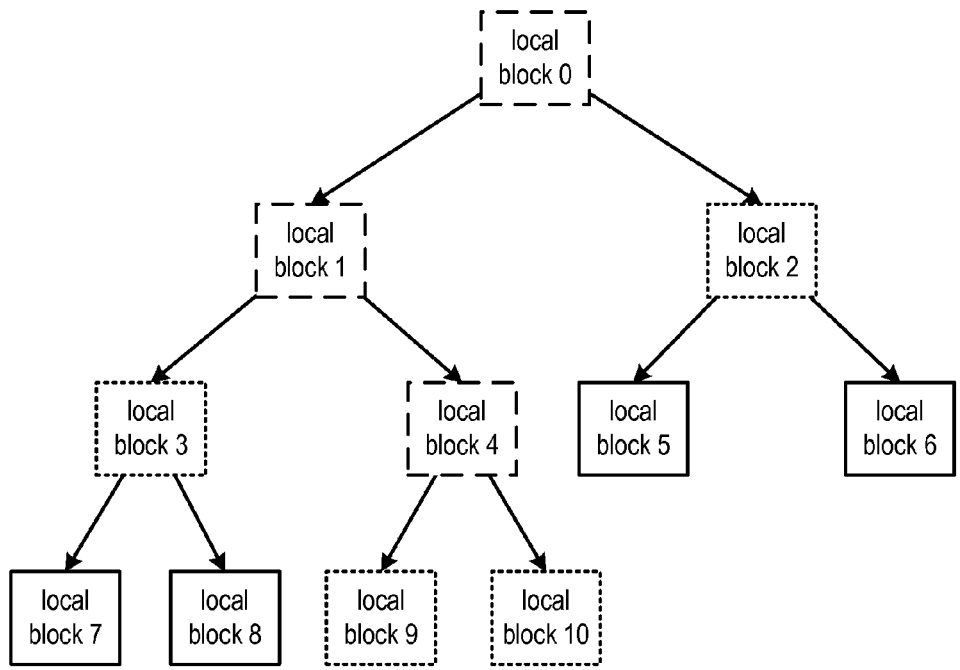

FIG. 33C graphically illustrates the results of a read to local block 4 in the recovery tree structure subsequent to FIG. 33B. If a read for local block 4 occurs, the restore process gets a restore block list that indicates local blocks that need to be restored from the snapshot. The restore block list indicates all nodes in the path from local block 4 (the target local block) to the first fingerprinted ancestor node of local block 4 in the recovery tree. In this example, the first fingerprinted ancestor node is local block 1, and the restore block list includes local block 1 and local block 4. For every node that is indicated by the restore block list, every child node of the node that is not also in the list is fingerprinted, and the corresponding snapshot block is fetched and written to the indicated local block in the volume. In this example, the children of local block 1 and local block 4 are fingerprinted, and the snapshot blocks corresponding to local block 1 and local block 4 are fetched from the snapshot and written to the local blocks in the volume. As shown in FIG. 33C, the children of local block 4 (local blocks 9 and 10) have been fingerprinted, and local block 3 (a child of local block 1) has been fingerprinted. Local blocks 1 and 4 have been restored from the snapshot (local block 0 was previously restored). The read to local block 4 can be processed as soon as local block 4 has been restored.

Note that, if no fingerprinted node is encountered on the path from the root node to the target node (e.g., local block 4), this indicates that all data corresponding to these nodes has previously been fetched from the snapshot and restored to the volume.

Figure 33D:
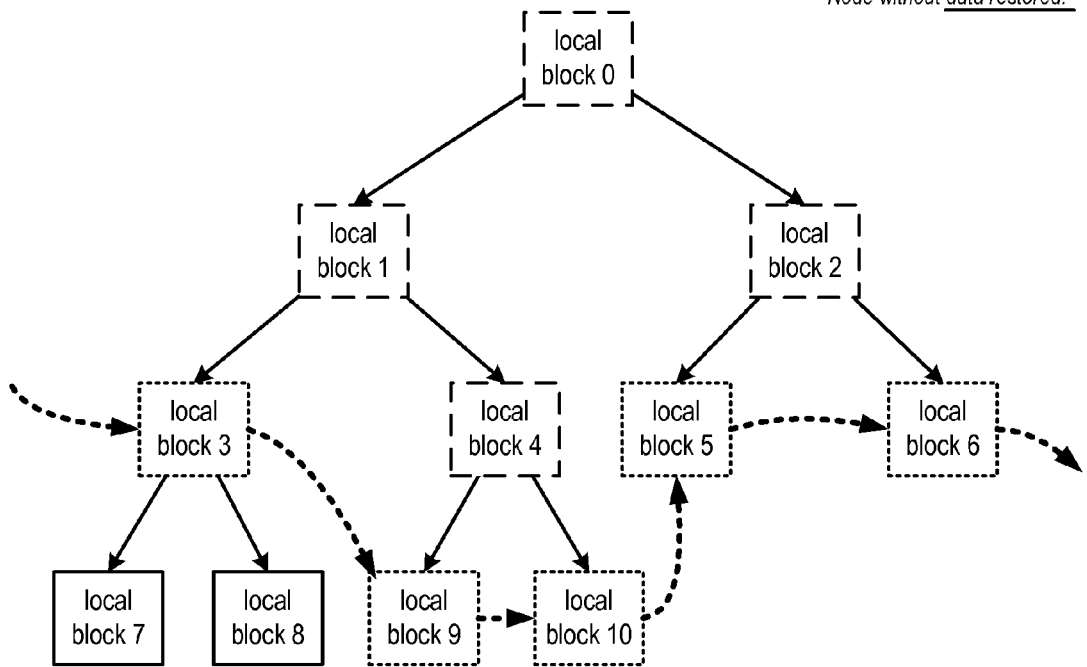

FIG. 33D graphically illustrates the results of a read to local block 2 in the recovery tree structure subsequent to FIG. 33C. The child nodes of local block 2 (local blocks 5 and 6) have been fingerprinted, and the snapshot block corresponding to local block 2 has been fetched from the snapshot and written to the volume. The dashed arrows that cross the tree indicate a partition such that every node above the partition has been restored from the snapshot.

FIGS. 34A through 34F graphically illustrate the restore process on a read to local block 10 using a representation of the recovery tree, according to at least some embodiments. In FIGS. 34A through 34F, a local block indicated by a dotted rectangle indicates a fingerprinted node, a node with a dashed rectangle indicates a node for which data has been restored from the snapshot, and a node indicated by a solid rectangle indicates a node for which the data has not been restored from the snapshot.

Figure 34A:
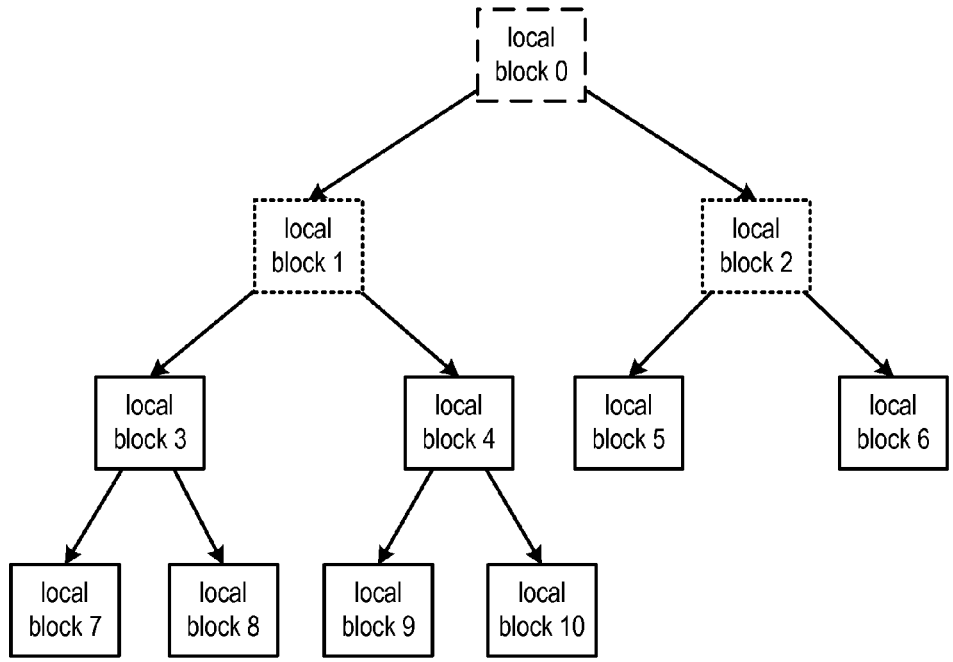
FIGS. 34A through 34F graphically illustrate the restore process on a read to specified local block using a representation of the recovery tree, according to at least some embodiments.

In FIG. 34A, the child nodes of local block 0 (local blocks 1 and 2) have been fingerprinted, and local block 0 has been restored from the snapshot. When a read for local block 10 occurs, the restore process gets a restore block list that indicates local blocks that need to be restored from the snapshot. The restore block list indicates all nodes in the path from local block 10 (the target local block) to the first fingerprinted ancestor node of local block 10 in the recovery tree. In this example, the first fingerprinted ancestor node is local block 1, and the restore block list will include local blocks 1, 4, and 10.

Figure 34B:
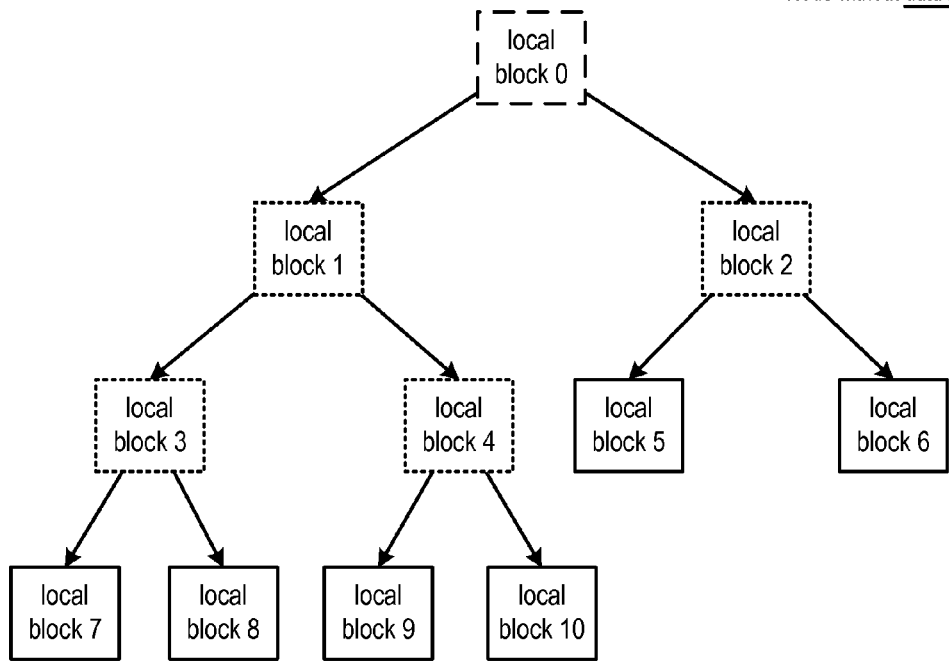
Figure 34C:
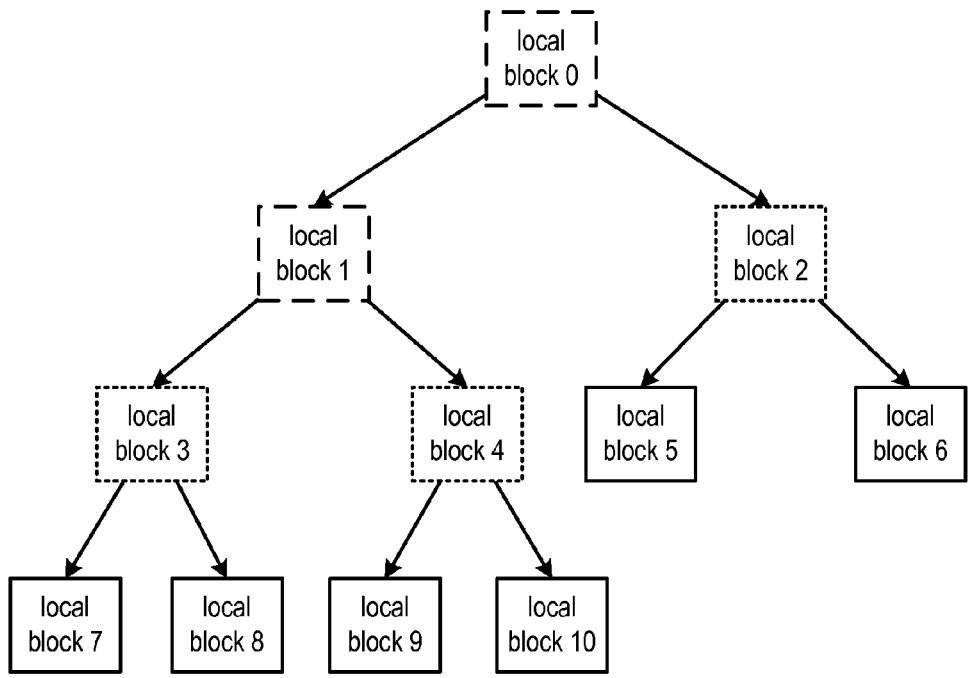
Figure 34D:
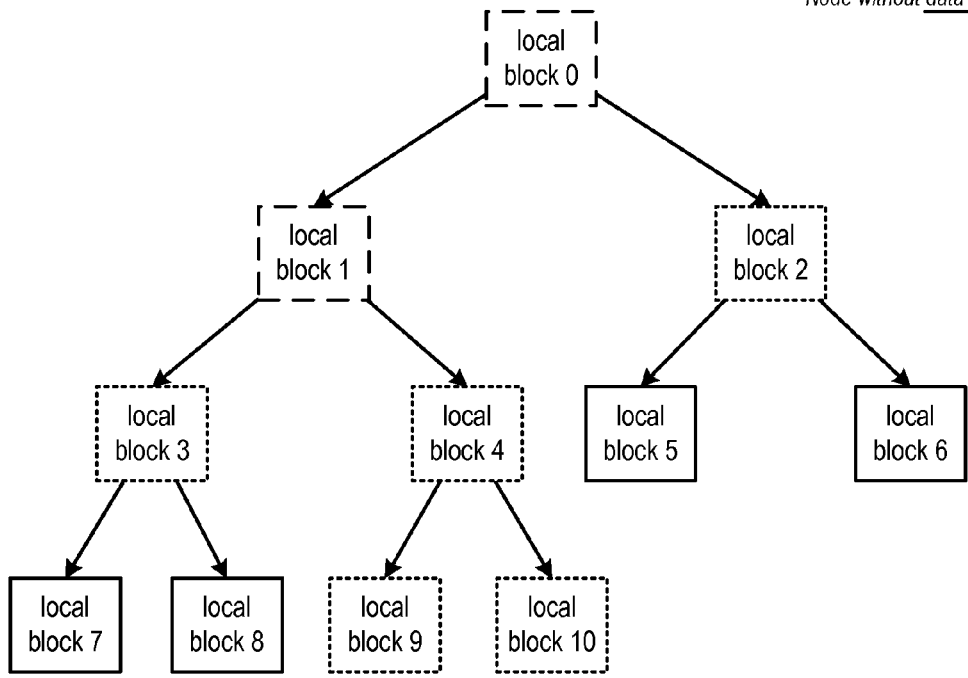
Figure 34E:
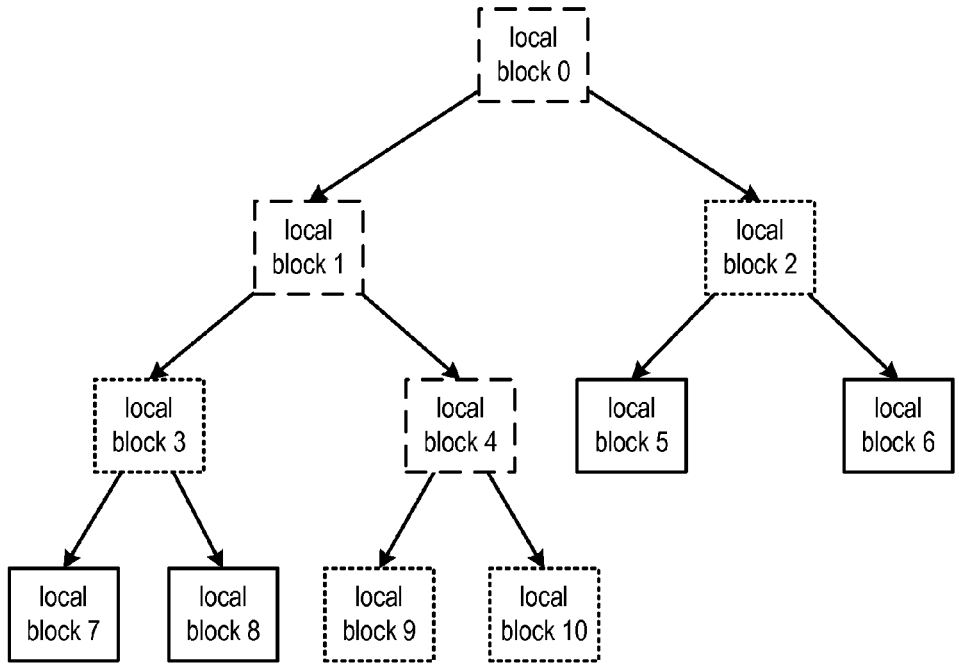
Figure 34F:
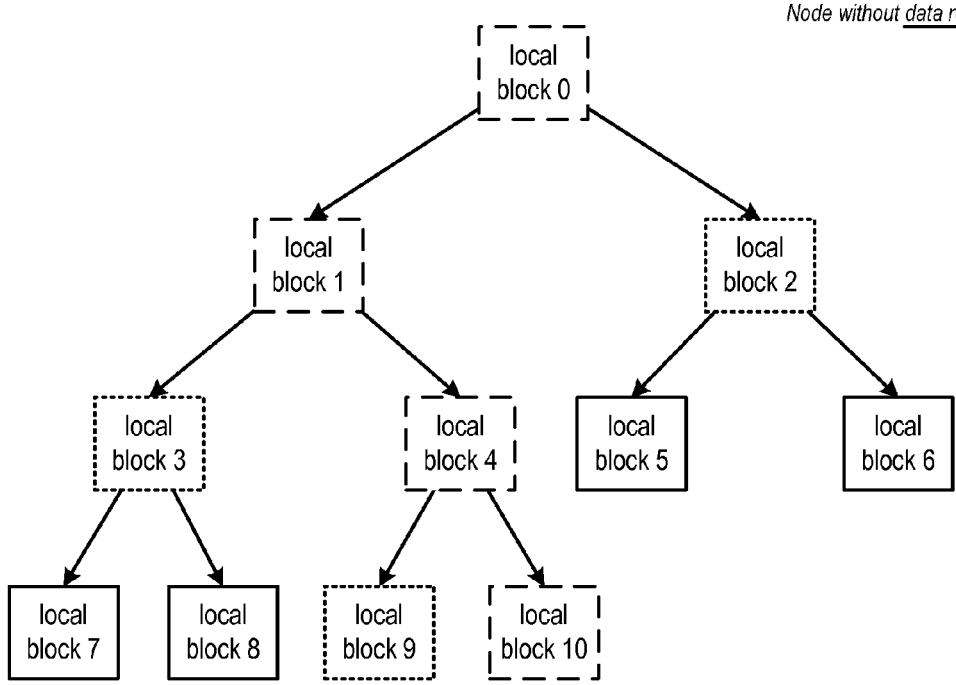

As shown in FIG. 34B, in at least some embodiments, the restore process may first fingerprint the children of local block 1 (local nodes 3 and 4). The restore process may then fetch the snapshot node corresponding to local block 1 from the snapshot and write the data to local block 1 on the volume, as shown in FIG. 34C. The restore process may then fingerprint the children of local block 4 (local blocks 9 and 10), as shown in FIG. 34D. The restore process may then fetch the snapshot node corresponding to local block 4 from the snapshot and write the data to local block 4 on the volume, as shown in FIG. 34E. The restore process may then, after determining that local block 10 has no children to fingerprint, fetch the snapshot node corresponding to local block 10 from the snapshot and write the data to local block 10 on the volume, as shown in FIG. 34F. The read to local block 10 can then proceed. Note that, in some embodiments, the order in which the blocks indicated by the restore block list are restored may be different than described.

While the restore algorithm is described herein in the context of restoring a volume from a snapshot created by a storage gateway shadowing writes to a snapshot maintained on a remote data store by a storage service, it is to be noted that the restore algorithm may be implemented in other storage and non-storage environments and applications.

Restore Process Optimization

While embodiments of the restore process as described above may work to restore volumes from snapshots without requiring a data structure or structures to record progress of the restore, in some embodiments an in-memory data structure, for example a bitmap, may be employed as an optimization. Restored local blocks may be indicated in the data structure, for example by setting or clearing a corresponding bit in the bitmap (e.g., bit 0 for local block 0, bit 1 for local block 2, etc.). To determine if a given local block has been restored, the restore process may check the corresponding entry (e.g., bit) in the in-memory data structure. In at least some embodiments, if the entry indicates that the local block has been restored, then the recovery tree does not have to be walked. If the entry indicates that the local block has not been restored, then the restore process may walk the recovery tree to generate the restore block list.

In at least some embodiments, if a crash occurs during the restore process, the in-memory data structure may be lost. In this case, the restore process may be resumed according to the restore algorithm, and the in-memory data structure may be repopulated as and when local blocks are restored by the restore process in response to reads. The in-memory data structure does not have to be immediately reconstructed when recovering from a failure, and the restore process does not have to be restarted from the beginning. The restore process, using the implicit recovery tree and fingerprinting, may be resumed from its former position, rebuilding the data structure as it goes, and requests for data blocks may be satisfied using the recovery algorithm as described without relying on the data structure.

Controlling Snapshot Exports

Methods, apparatus, and computer-accessible storage media for controlling downloads or exporting of snapshots from a remote data store to a customer's local network in service provider environments are described. Various services or utilities provided by the service provider, such as the storage gateway methods and apparatus described above, may allow a customer to create snapshots of various volumes in a remote data store. A snapshot may be viewed as an immutable, point-in-time capture of a corresponding volume. In addition, at least some of these services or utilities, such as the storage gateway methods and apparatus described above, may allow a customer to restore or create volumes from the point-in-time snapshots. Some services or utilities, such as the storage gateway methods and apparatus described above, may also allow a customer to restore or create volumes on a local data store (i.e., storage on the customer's local network) from snapshots stored on the remote data store provided by the service provider.

However, some snapshots on the remote data store that are associated with a customer may be based on volumes that were created by other parties, for example by the service provider or by some other third party. Policies such as licensing agreements may in at least some cases allow for the creation of new volumes (i.e., making copies of volumes) from snapshots of original volumes as long as the new volumes are created within the physical networking environment of the service provider; however, exporting of at least some of the data in the volume associated with a snapshot to offsite locations (e.g., to a customer's local network) may be prohibited by the policies. As an example, the service provider may leverage open source software, for example Linux, to create boot images that may be used by customers to create machine image instances on the service provider network. According to at least some open software licenses, if an entity (e.g., the service provider) externally distributes modified software (e.g., a boot image) that leverages the open source code, the entity must also provide the modified source code. As long as the machine image instances generated from the boot images, and snapshots of the boot images, remain on premises (e.g., on the service provider network), the images have not been externally distributed. However, if the service provider allows a customer to download a snapshot of a boot image provided by the service provider or by a third party, this may be considered an external distribution of the licensed open source software, and thus the service provider may be required by the open source license to provide the modified source code as well. As another example, third party vendors such as Microsoft and IBM may provide boot images under licensing agreements with the service provider that allow machine image instances to be created from the boot images within the service provider network but prohibit redistribution of the boot images to external entities such as the service provider's customers.

Thus, the service provider may need to control the downloading of snapshots by the storage gateway technology as described herein and/or by other services or utilities provided by the service provider so that customers are prevented from downloading snapshots of volumes, such as boot images created by the service provider or provided by third parties, to which the customer or client does not have the appropriate rights, such as licensing rights, to export. Embodiments of methods, apparatus, and computer-accessible storage media are described that allow the service provider to control the exporting of snapshots from the service provider network to external networks by clients of the service provider. Embodiments may leverage the properties of snapshots in the service provider network to examine information related to a client's snapshots (e.g., snapshot manifest files) to determine if a given snapshot includes any data for which the client does not have the appropriate rights to export. In some embodiment, a technique may be used that prevents the client from exporting a snapshot that is listed on the client's console if the client does not have the appropriate rights to export the snapshot. In other embodiments, a technique may be used that prevents snapshots that the client does not have the appropriate rights to export from being listed on the client's console.

The following first describes snapshot technology that may be provided by the service provider via the storage gateway technology as described herein and/or via other technologies such as hardware virtualization technology, and then describes several methods and apparatus for controlling the downloading of snapshots by the storage gateway technology as described herein and/or by other services or technologies provided by the service provider so that customers are prevented from downloading or exporting snapshots of volumes, such as boot images created by the service provider or provided by third parties, to which the customer does not have the appropriate rights to export.

Embodiments of the storage gateway as illustrated in FIGS. 1 through 34F and as described above may allow customers to create snapshots of volumes on the remote data store and to create or recover local volumes on the user's network from the remotely stored snapshots. In addition, as illustrated in FIG. 5, embodiments of the storage gateway may integrate with on-site customer applications and the virtualized computing and storage technology provided by the service provider, providing customers with access to elastic "cloud-based" computing and storage resources. For example, a customer using a storage gateway may create snapshots of their local volumes on the remote data store and/or of their remote volumes on the remote data store. These snapshots may, for example, be accessed by hardware virtualization technology applications or instances (see, e.g., virtual computing system(s) 264 in FIG. 5) associated with the customer. Embodiments of the storage gateway may also allow the customer to create or recover local volumes on the customer's network from the snapshots on the remote data store.

Figure 35:
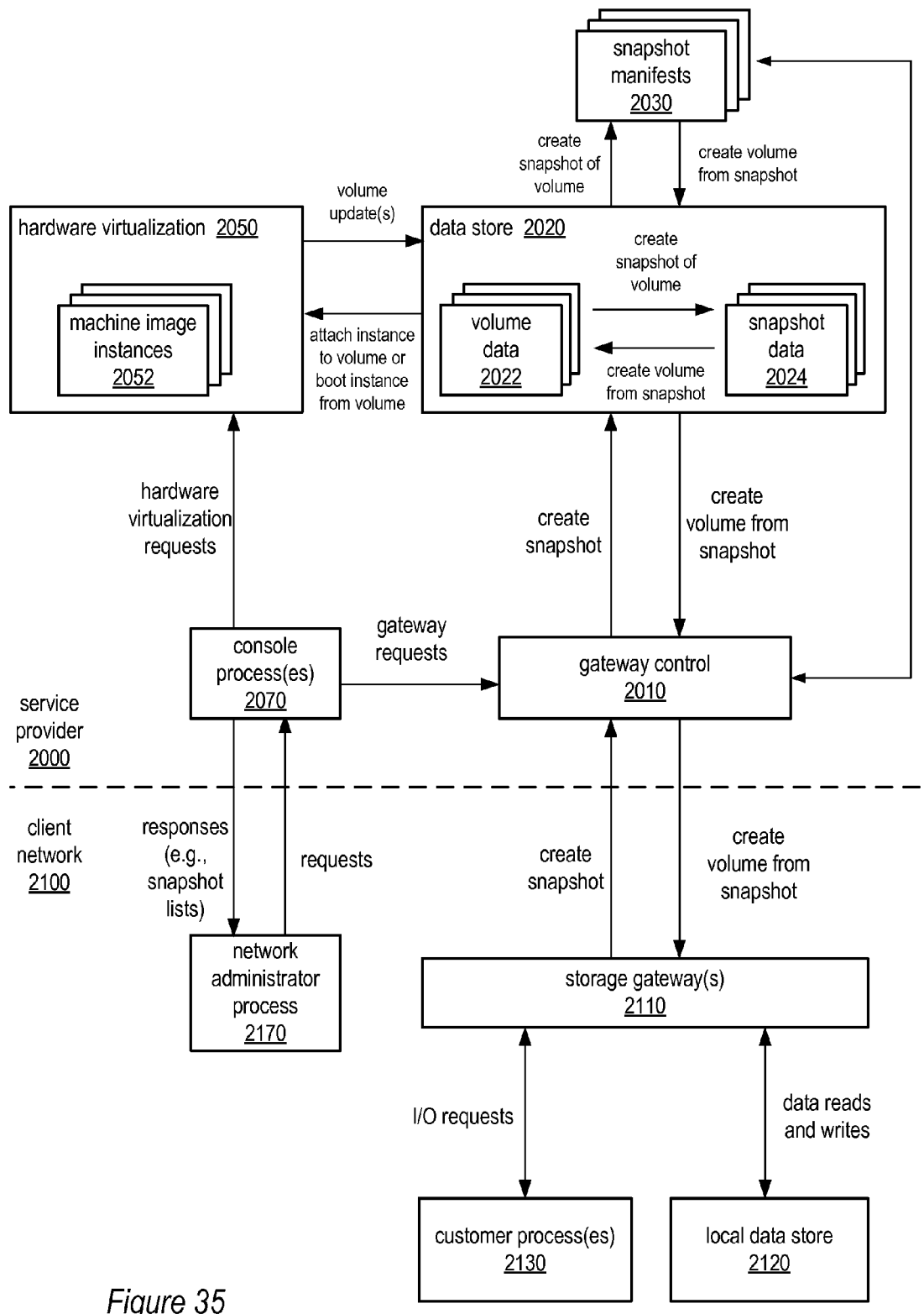
FIG. 35 is a block diagram that illustrates the use of snapshots in a service provider environment, according to at least some embodiments.

FIG. 35 is a block diagram that illustrates the use of snapshots in a service provider environment, according to at least some embodiments. A service provider 2000 may provide hardware virtualization 2050 via a hardware virtualization service that enables customers to create "virtual" machine image instances 2052 on hardware provided by the service provider 2000. This hardware may be, but is not necessarily, multi-tenant hardware. That is, a customer's machine images may be instantiated on multi-tenant devices that are shared with other customers. The service provider 2000 may also provide a data store 2020 via a storage service that enables customers to create and/or access volumes (e.g., data volumes and/or boot images (which may also be referred to as boot volumes) on storage hardware provided by the service provider. The back end storage devices that are used for data store 2020 may be, but are not necessarily, multi-tenant storage devices that are shared with other customers.

The client network 2100 may include one or more storage gateways 2110 that serve as an interface between the service provider 2000 storage service and components of the client network 2100 including customer process(es) 2130 and local data store 2120, as previously described in this document. The service provider 2000 may also provide one or more console processes 2070 via which the customer, for example via a network administrator process 2170 on client network 2100, may access and view information about the customer's various resources on the service provider 2000 network, and via which the customer may make requests to various services or other components of the service provider 2000 network. The service provider 2000 may also provide a gateway control 2010 plane via which storage gateway(s) 2110 may be activated and via which connection(s) to storage gateway(s) 2110 may be maintained, and to which storage gateway requests, including but not limited to snapshot creation requests and restore from snapshot requests, may be routed via console process(es) 2070, as previously described in this document.

The hardware virtualization 2050 technology provided by the service provider 2000 may enable multiple operating systems to run concurrently on a host computer, i.e. as virtual machines (VMs) on a host system. The VMs may, for example, be rented or leased to the customers of the service provider. For a given customer, one or more machine image instances 2052 may be attached to volumes and/or instantiated or "booted" from boot images maintained by the storage service on data store 2020. After a machine image instance 2052 is originally attached to a volume or booted from a boot image, a customer may modify the machine image instance 2052. These modifications may be reflected in the corresponding volume. The service provider may create a differential snapshot of a machine image instance 2052, for example at the customer's request, by taking a snapshot of the corresponding volume. Note that an initial snapshot may be created for a machine image instance 2052 when the instance is created, with a new, differential snapshot created periodically or aperiodically thereafter. In turn, a machine image instance 2052 may be created or recovered from a snapshot, for example by creating a volume from the snapshot and attaching the machine image instance to the volume or booting the machine image instance from the volume. For example, if a machine image instance 2052 needs to be recovered or copied, a point-in-time version of the machine image may be obtained from a latest or most recent differential snapshot of the volume corresponding to the machine image instance. Note that in at least some embodiments a user may select a snapshot that is not the most recent snapshot to create a machine image instance.

Thus, many snapshots may be associated with a given customer of the service provider 2000, including but not limited to snapshots of machine image instances 2052 from the hardware virtualization 2050 service, snapshots of the customer's local data volumes on local data store 2120 generated via a storage gateway 2110, and snapshots of the customer's remote volumes on data store 2020. Embodiments of the storage gateway 2110 as illustrated in FIGS. 1 through 34F and as described above may allow customers to create local volumes on the user's network (e.g., on local data store 2120) from these remotely stored snapshots. For example, in at least some embodiments, a customer may access a console process 2070 via network administrator process 2170 to obtain a list of all snapshots associated with the customer. In response, the console process 2070 may return a list of all snapshots associated with the customer. The customer may select a particular snapshot from the list and send a request to the console process 2070 that a local volume be created on local data store 2120 from the snapshot. The console process 2070 may then direct gateway control 2010 plane to export the snapshot to the customer; the gateway control 2010 may then facilitate the export of the snapshot to the client network 2100 via a storage gateway 2110. The section Data restore and recovery from a remote data store describes a method for restoring a local volume from a remotely stored snapshot via a storage gateway, according to at least some embodiments. Note that a similar method or some other method may be used to create a new volume on the client network 2100 from a snapshot on the service provider 2200 network.

In at least some embodiments, snapshots, including but not limited to snapshots of machine image instances 2052 and snapshots of data volumes created and maintained via storage gateway(s) 2110, may be differential "backups." That is, when taking a snapshot, only chunks of volume data 2022 that have been added or changed in the corresponding volume since the last snapshot may be recorded in the snapshot as snapshot data on data store 2020. To recreate or copy a volume from a selected particular snapshot, one or more snapshots of the volume may be processed using a technique that preserves the integrity of the data by assuring that all changes including the latest changes recorded in the selected snapshot are recovered from the data store 2020 and written to the new volume. To aid in the restore from snapshot process, particularly to map locations of snapshot objects (snapshot data 2024) on data store 2020 to volume blocks, embodiments may create a snapshot manifest 2030 for each snapshot when the snapshot is created. A snapshot may thus be viewed as including both the snapshot data 2024 and a snapshot manifest 2030 that records the locations of snapshot data 2024 within the data store 2020. The snapshot manifest 2024 is essentially a representation of a given volume at the point in time that the snapshot of the volume was taken.

Snapshot Manifests

Figure 36A:
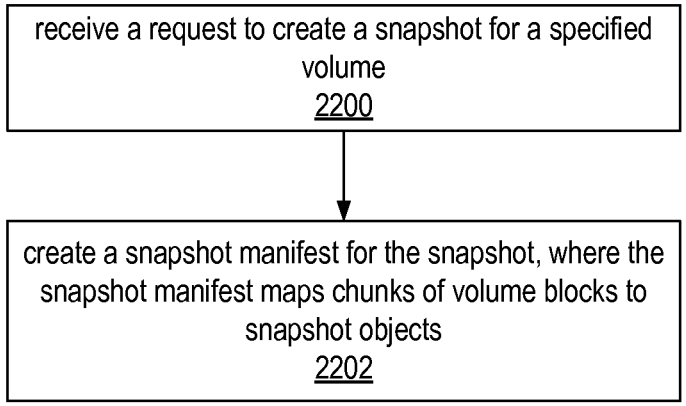
FIG. 36A broadly illustrates creating snapshot manifests for snapshots, according to at least some embodiments.

FIG. 36A illustrates creating manifests for snapshots, according to at least some embodiments. As illustrated in FIG. 36A, when a snapshot of a volume is taken, a snapshot manifest 2030 file that describes the snapshot is created. A snapshot may be viewed as an immutable, point-in-time capture of a corresponding volume; a snapshot includes the snapshot data 2024 and a snapshot manifest 2030 that indicates where the snapshot data 2024 is located. As indicated at 2200, a request is received to create a snapshot for a specified volume. As indicated at 2202, a snapshot manifest 2030 for the snapshot is created. In at least some embodiments, the snapshot manifest 2030 maps chunks of the corresponding volume's blocks to locations of snapshot objects (snapshot data 2024) stored in data store 2020. For example, for a storage gateway volume, the storage gateway may provide blocks of data (e.g., 4 MB blocks of a block storage format) from the volume. These blocks may generally contain data that is "dirty;" i.e., data that has been modified or added to the volume. A process at service provider 2000 may break the blocks into chunks, e.g. 1 MB chunks. Each chunk corresponds to one or more objects in an object store format used by the data store 2020. The chunks may then be stored to object locations in the data store 2020. A snapshot manifest 2030 for a point-in-time snapshot of the storage gateway volume maps the storage locations of the objects at a given point-in-time to the blocks/chunks of the volume (see, e.g., FIGS. 37A and 37B).

In at least some embodiments, when a snapshot of a volume is taken, the snapshot data 2024 is not copied to another location but is instead made immutable within the volume. Alternatively, when or after a point-in-time snapshot of a volume is taken, the snapshot data 2024 from the volume may be copied to new locations in the data store 2020, essentially creating a new and separate point-in-time snapshot of the volume. However, it is to be noted that the methods described herein do not depend on the manner in which the snapshot of a volume is created. In both cases, a snapshot manifest file may be created that records the locations of snapshot data 2024 within the data store 2020.

Figure 36B:
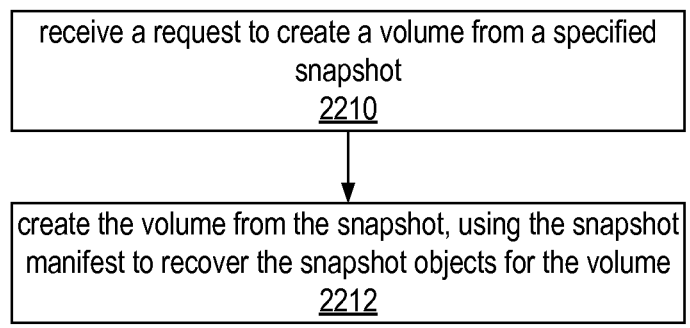
FIG. 36B broadly illustrates creating volumes from snapshots according to the snapshot manifests, according to at least some embodiments.

Snapshot manifest 2030 files may, for example, be used in restoring volumes from corresponding point-in-time snapshots. FIG. 36B broadly illustrates creating a volume from a snapshot according to the snapshot manifest, according to at least some embodiments. As illustrated at 2210, a request to create a volume from a specified snapshot may be received. As indicated at 2212, the volume may then be created from the snapshot, using the manifest for the snapshot to locate and recover the snapshot objects (snapshot data 2024) for the volume.

Figure 36C:
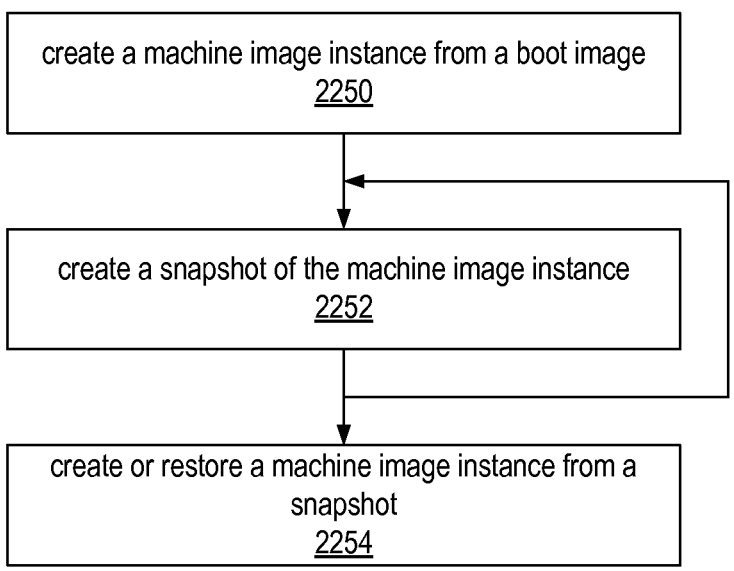
FIG. 36C broadly illustrates creating machine image instances from boot images and creating or restoring machine image instances from snapshots of machine image instances, according to at least some embodiments.

FIG. 36C broadly illustrates creating machine image instances from boot images and creating or restoring machine image instances from snapshots of machine image instances, according to at least some embodiments. As previously mentioned, a machine image instance may be attached to a volume, or instantiated or "booted" from a boot image (i.e., a volume) on the data store, as indicated at 2250. As indicated at 2252, one or more snapshots may be generated for the machine image instance by taking a snapshot of the corresponding volume. In at least some embodiments, an initial immutable snapshot may be created for the machine image instance when the instance is created by creating a snapshot manifest for the initial snapshot. A machine image instance may be modified, for example by the customer, after the machine image instance is created and the initial snapshot is generated. These modifications may be reflected in the volume corresponding to the machine image instance. Thus, one or more differential snapshots of the machine image instance may be generated to back up those changes by taking point-in-time snapshots of the corresponding volume; a snapshot manifest may be generated for each snapshot. As indicated at 2254, the machine image instance may be recovered, or a new machine image instance may be created, from one of the snapshots, using the manifest for the snapshot to locate the snapshot data in the snapshot. Although typically a most recent snapshot would be used to create or recover a machine image instance, this could be performed from any snapshot of the machine image instance.

In at least some embodiments, a snapshot manifest 2030 file for a snapshot may include entries that map the storage locations of all of the snapshot objects (chunks) stored in the data store 2020 to the blocks/chunks of the volume. Thus, some entries in a given snapshot manifest 2030 file may map the snapshot object locations for newly created or modified blocks (i.e., created or modified since the previous snapshot was taken), while other entries may map the object locations for all previously created or modified blocks of the volume.

FIGS. 37A and 37B graphically illustrate example snapshot manifest 2030 files, according to at least some embodiments, and are not intended to be limiting. FIG. 37A shows a snapshot manifest 2030A for a first snapshot of a data volume or machine image. The snapshot manifest 2030A may include snapshot information, for example a snapshot identifier (ID) unique to this snapshot, information about the volume or machine image for which the snapshot was created, an identifier for the customer that created the snapshot (e.g., an account ID), timestamps, and so on. Snapshot manifest 2030A also includes entries that map chunks 2032 of the respective volume to object 2034 locations in the data store 2020. Each entry also includes a field that indicates the creator/owner of the respective block/chunk. For these entries, this field indicates account ID 2036A, which may for example be an account ID of the service provider or of a third party if this snapshot was taken from a machine image instance created from a boot image provided by the service provider or by a third party. FIG. 37B shows a snapshot manifest 2030B for the data volume or machine image that corresponds to a second snapshot. Note that the snapshot information may include a different snapshot identifier. Also note that the snapshot manifest 2030B includes the entries that are in snapshot manifest 2030A, and also includes additional entries that correspond to new or modified blocks of data that were stored for this differential snapshot. In this example, the field that indicates the creator/owner of the respective block/chunk for the new entries indicates a different account ID (account ID 2036B) than the account ID for the previous entries (account ID 2036A). This account ID 2036B may, for example, be the customer's account ID with the service provider, as the customer may have modified the machine image subsequent to snapshot 2030A.

Thus, in at least some embodiments, a snapshot manifest 2030 file may contain an index that includes entries for every block of data stored within the snapshot, including but not limited to entries for all blocks modified or added since the previous snapshot. In addition, associated with every index entry in the snapshot manifest 2030 file is an account ID of the account that originally created the respective block of data. For example, when a customer creates a snapshot from a machine image instance based on a boot image, e.g. a Linux machine image, provided by the service provider, since this snapshot contains blocks of data that were originally created by the service provider, the snapshot manifest 2030 file may contain index entries specifying the internal account ID of the service provider. Therefore, as long as the volume is not overwritten, there will be index entries in the snapshot's manifest 2030 file that specify the internal account ID of the service provider. Similarly, for other machine images provided by third parties, the snapshots created from these machine images will have snapshot manifest files that contain index entries that specify the account IDs of the respective third parties. These snapshot manifest files that store the account information for snapshot data in may be leveraged to provide methods for identifying whether a given snapshot was originally generated for a volume (e.g., a boot image) to which the customer does not have the appropriate rights to export to the customer's site, and may thus enable the controlling of snapshot exports from the service provide network to customers' local networks by services or utilities such as the storage gateway technology described herein.

Methods for Controlling Snapshot Exports

Figure 38:
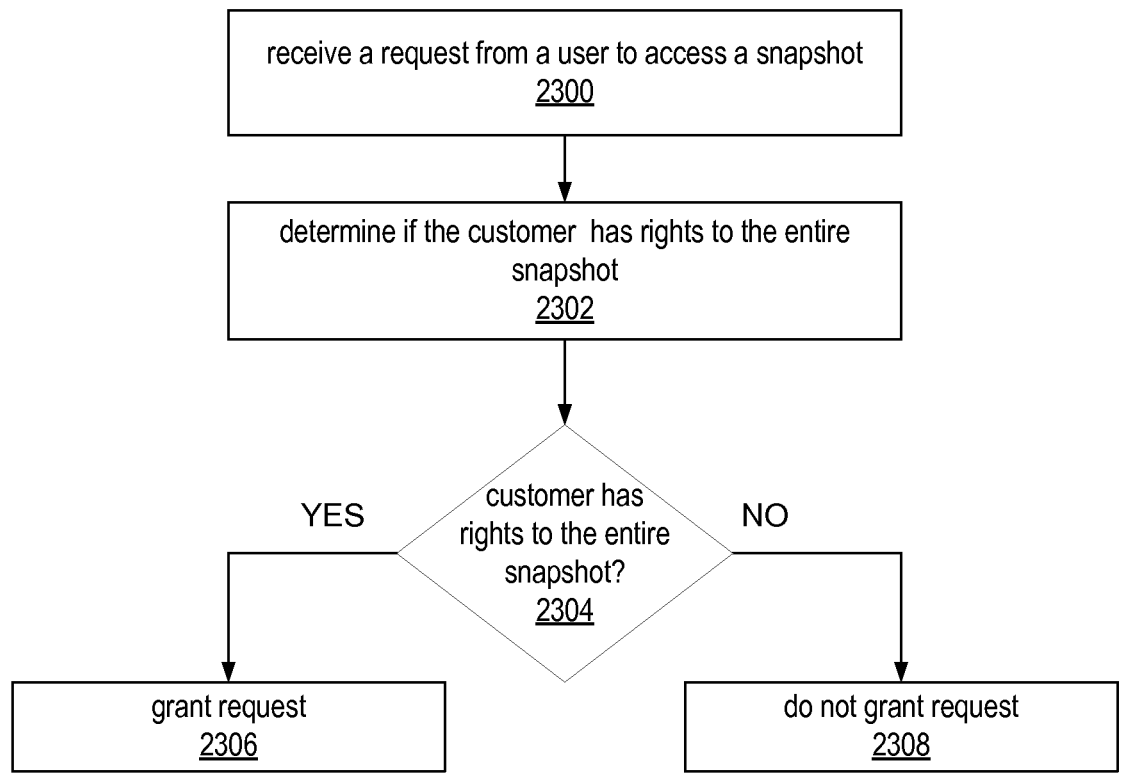
FIG. 38 is a high-level flowchart of a method for controlling access to snapshots by customers of a service provider, according to a least some embodiments.

FIG. 38 is a high-level flowchart of a method for controlling access to snapshots by customers of a service provider, according to a least some embodiments. As indicated at 2300, the service provider may receive a request from a user to access a snapshot, for example via a customer console on the customer's network. As indicated at 2302, the service provider may determine if the customer has rights to the entire snapshot. For example, a process in the gateway control 2010 plane as illustrated in FIG. 35 may determine if the customer has rights to the entire snapshot by checking the snapshot manifest 2030 file for the snapshot to see if any entries belong to some other account ID than the customer's account ID. At 2304, if the customer has rights to the entire snapshot, the service provider may grant the request and allow the user to access the snapshot, as indicated at 2306. At 2304, if the user does not have rights to the entire snapshot, the service provider may not allow the request as indicated at 2308, and may, but not necessarily, message the user with the reason that the user is not allowed to export the snapshot.

The method illustrated in FIG. 38 may be used in controlling the downloading of snapshots from the service provide network to customers' local networks (e.g., client network 2100 in FIG. 35) by services or utilities such as the storage gateway technology. The method may be applied in different techniques for controlling the downloading of snapshots. In a first technique, snapshot manifest file inspection may be performed upon a request for volume creation. In this technique, for example, the request received at 2300 of FIG. 38 may be a request to create a local volume on a customer's network from a specified snapshot stored on the service provider network. Upon determining, for example via the snapshot manifest corresponding to the snapshot, that the customer does not have the appropriate rights to download the snapshot (e.g., the snapshot includes data that was created by an account ID other than the customer's account ID), the customer may be blocked from downloading the snapshot. Alternatively, in a second technique, snapshot manifest file inspection may be performed when listing snapshots. In this technique, the request received at 2300 of FIG. 38 may be a request for a list of a customer's snapshots; the method may be used to only provide the customer with indications of snapshots to which the customer has the appropriate rights to download. If the customer does not have rights to an entire snapshot, for example if portions of the snapshot belong to a different account ID than the customer's account ID as indicated by the snapshot manifest file corresponding to the snapshot, the snapshot is not provided in the list. Using this technique, the customer may not even be able to request downloads of snapshots to which the customer does not have the appropriate rights, as these snapshots are not listed on the customer's console. Only those snapshots that belong to the customer and for which the customer has the appropriate rights to download are listed on the customer's console.

The two techniques for controlling the downloading of snapshots described above are described in further detail below, specifically in relation to the storage gateway technology as described herein. However, note that these techniques may be applied by other service provider services and utilities.

Snapshot Manifest File Inspection Upon a Request for Volume Creation

In this technique, the storage gateway console process may provide a list of snapshots owned by the customer to a user (e.g., the customer's network administrator). For example, referring to FIG. 35, the console process 2070 may provide a list of snapshots owned by the customer to the user via the network administrator process 2170. However, a snapshot that is technically owned by a customer may, for example, be based on a volume (e.g., a boot image) that is provided via the service provider or by a third party under a policy such as a licensing agreement that does not allow the volume to be exported to external networks. Thus, this list may indicate snapshots of volumes to which the customer does not have the rights to export and create local copies, e.g. snapshots of machine image instances based on boot images provided by the service provider (e.g., boot images based on open source code such as Linux) or snapshots of machine image instances based on boot images provided by a third party such as Red Hat, Microsoft, or IBM boot images. While the customer technically owns the machine images from which the snapshots were created, policies such as license agreements may not allow exporting of the boot images from the service provider network to external networks such as the customer's local network.

However, when a user attempts to create a volume on the customer network from a snapshot in the list, a synchronous check of the snapshot's manifest file may be performed to determine if there are any account IDs within the snapshot's manifest file that do not match the customer ID of the customer requesting the export. If so, the creation of a volume from the snapshot on the customer network is not allowed. In at least some embodiments, a message may be displayed to the user indicating to the user that the selected snapshot cannot be downloaded.

Note that this method may list all of the snapshots owned by the customer to the customer's console, including both snapshots that the customer can download and snapshots that are ineligible for download. However, typically, only a small number of the snapshots that are listed would be ineligible given that only snapshots owned by the customer are listed.

Figure 39:
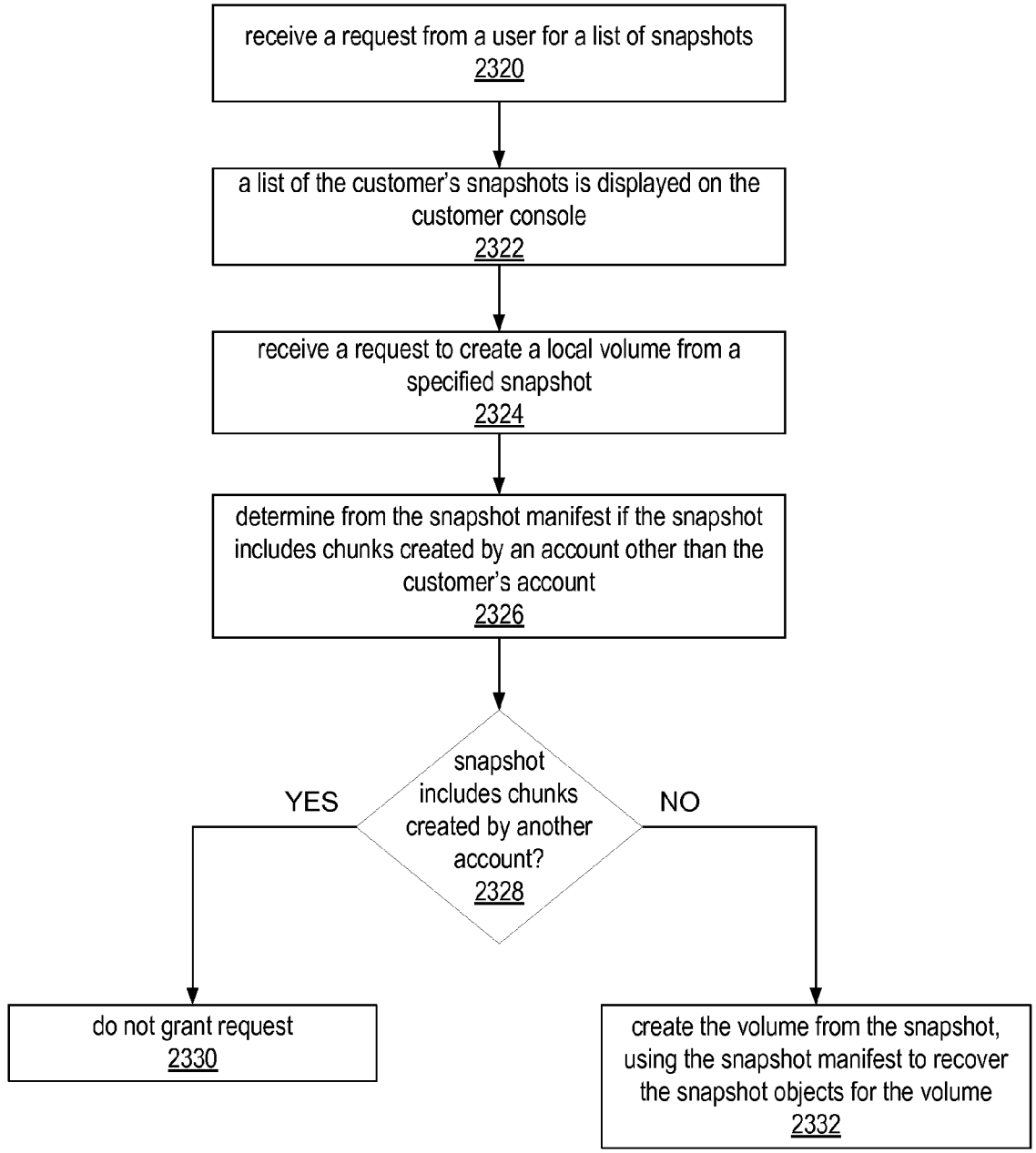
FIG. 39 is a flowchart of a method for performing snapshot manifest file inspection upon a request for volume creation, according to at least some embodiments.

FIG. 39 is a flowchart of a method for performing snapshot manifest file inspection upon a request for volume creation, according to at least some embodiments. As indicated at 2320, a console process at the service provider may receive a request from a user (e.g., a network administrator) for a list of a customer's snapshots. As indicated at 2322, in response, a list of the customer's snapshots is displayed on the customer console. In at least some embodiments, the list may include all of the snapshots owned by the customer, including both those that the customer can download and snapshots that are ineligible for download. As indicated at 2324, the console process may receive a request to create a local volume from a specified snapshot in the list. For example, the user may select a snapshot in the list, select a "create volume" user interface element or the like, and specify that the volume is to be created locally on the customer's network. As indicated at 2326, the service provider may determine from the snapshot manifest file corresponding to the snapshot if the snapshot includes chunks created by another account or entity. For example, in some embodiments, the console process may forward the request to a process on the gateway control plane, which may check the snapshot manifest file corresponding the specified snapshot to determine if the snapshot includes any chunks that were created by an account ID that does not match the customer's account ID. At 2328, if the snapshot includes any chunks that were created by an account or entity other than the customer account, then, as indicated at 2330, the request is not granted. For example, in some embodiments, the gateway control process may message the console process that the request is not to be allowed. The console process may then message the user via the customer console that the download is not allowed. At 2328, if the snapshot does not include any chunks that were created by an account ID that does not match the customer's account ID, then the gateway control process may create the local volume on the customer's network from the snapshot via the storage gateway, using the snapshot manifest to recover the snapshot objects for the volume from the service provider data store, as indicated at 2332.

Snapshot Manifest File Inspection when Listing Snapshots

In this technique, the storage gateway console process may provide a list of snapshots owned by the customer to the user. For example, referring to FIG. 35, the console process 2070 may provide a list of snapshots owned by the customer to the network administrator process 2170. However, in this technique, this list does not include snapshots of volumes to which the customer does not have the rights to create local copies, e.g. snapshots of machine image instances based on boot images provided by the service provider (e.g., boot images based on open source code such as Linux) or snapshots of machine image instances provided by a third party such as Red Hat, Microsoft, or IBM machine images. To accomplish this, when the user requests a list of the customer's snapshots, the customer's snapshots may be checked to determine if the user has appropriate rights to create local copies. Only snapshots to which the customer has the appropriate rights are listed on the customer's console. Thus, the user cannot request a local volume to be created from a snapshot to which the customer does not have the appropriate rights from the console, as snapshots to which the customer does not have the appropriate rights are not listed.

Figure 40A:
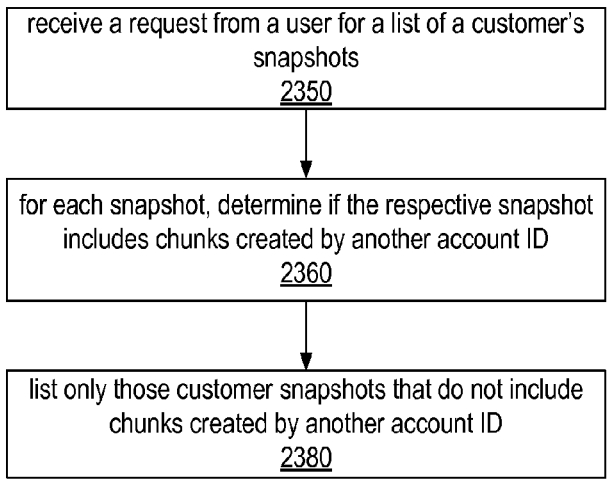
FIGS. 40A and 40B are flowcharts of a method for performing snapshot manifest file inspection when listing snapshots, according to at least some embodiments.

FIG. 40A is a flowchart of a method for performing snapshot manifest file inspection when listing snapshots, according to at least some embodiments. As indicated at 2350, the service provider console process may receive a request from a user for a list of the customer's snapshots. As indicated at 2360, for each of the customer's snapshots, the service provider may determine if the respective snapshot includes chunks created by another account ID. For example, in some embodiments, the console process may forward the request to a process on the gateway control plane, which may check the snapshot manifest file corresponding to each of the customer's snapshots to determine if the respective snapshot includes any chunks that were created by an account ID that does not match the customer's account ID. The service provider may then return a list that indicates only the customer's snapshots that do not include chunks created by another account ID for display on the customer's console.

Checking each snapshot manifest file for each snapshot every time the user requests a list of snapshots may be time consuming, and may cause a delay in the response to the user. Thus, in some embodiments, to speed up the response, an ongoing cache of snapshots that have already been checked may be maintained. For example, the cache may list each snapshot ID along with an indication of whether the snapshot is exportable or not. If a given snapshot is not in the cache, then the snapshot manifest file corresponding to the snapshot may be checked as indicated above, and the results written to the cache. This speeds up the time to check for exportability of the snapshots, particularly when there are many snapshots to check, while enabling the service provider to filter the list of snapshots shown on the customer's console so that only snapshots for which the customer has appropriate rights to export to their local network are listed. Note that typical cache management operations, such as expiration and eviction, may be performed on this cache.

Figure 40B:
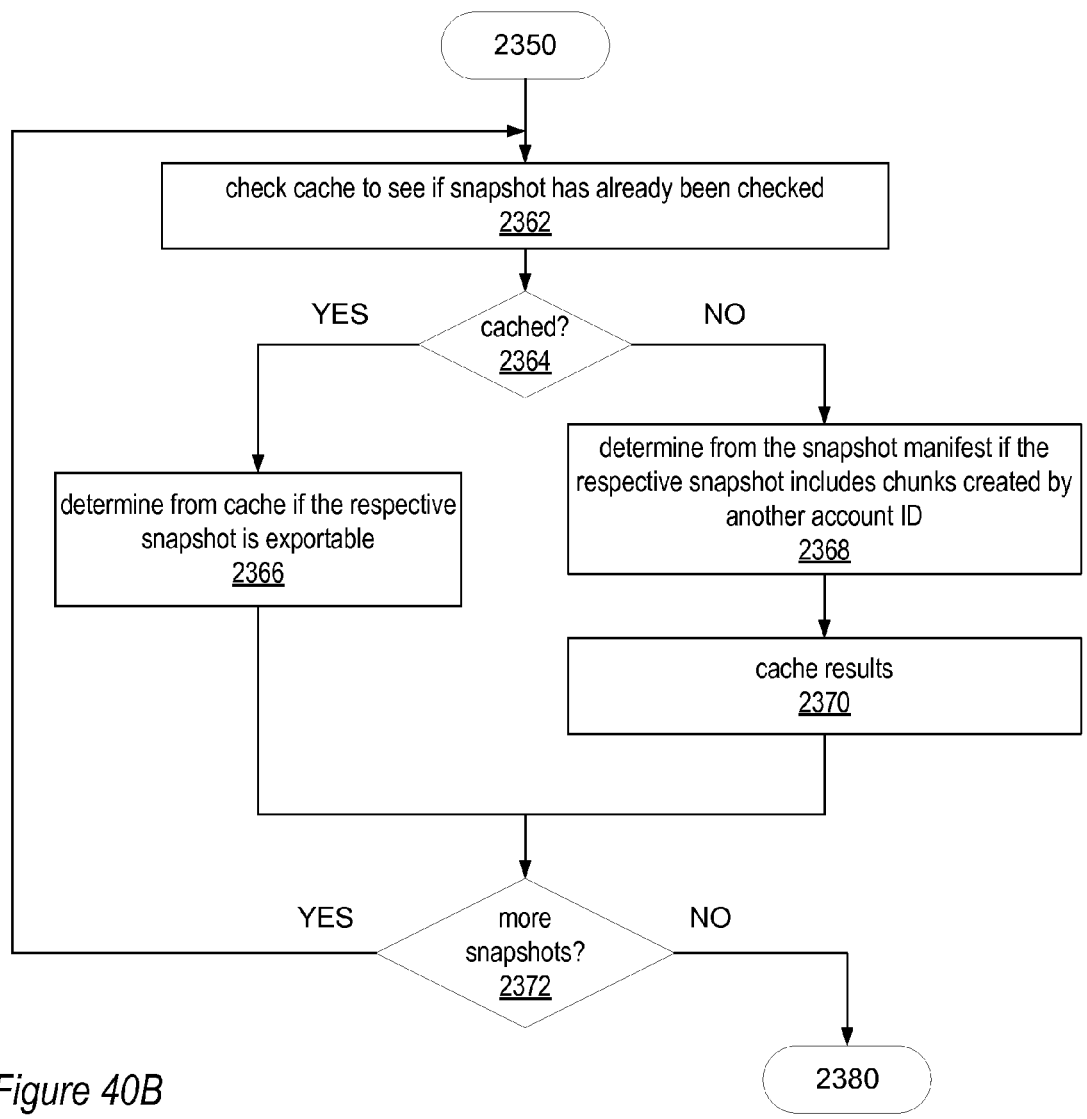

FIG. 40B is a flowchart of a method for checking snapshots using a cache, according to some embodiments. Note that FIG. 40B is a method that may be used at 2360 of FIG. 40A. As indicated at 2362, the cache is checked to determine if a current snapshot has already been checked. At 2364, if the current snapshot is in the cache, then at 2366 the method determines from the cache if the respective snapshot is exportable. At 2364, if the current snapshot is not in the cache, then at 2368 the method determines from the snapshot manifest corresponding to the snapshot if the respective snapshot includes chunks created by another account ID. At 2370, results of the check may be written to the cache. At 2372, if there are more snapshots to be checked, then the method returns to 2362. If there are no more snapshots to be checked, then the method is done and 2380 of FIG. 40A is performed.

As an alternative, a technique for snapshot manifest file inspection when listing snapshots may be used, but instead of returning a list that includes only those snapshots that the customer is allowed to export, a list may be returned that lists all of the customer's snapshots including those that the customer is not allowed to export. Snapshots that cannot be exported may be so indicated in the list and on the customer's console. If a snapshot that is not eligible for export is selected, the "export" option user interface element may be disabled. Alternatively, whether a selected snapshot can be exported when the "export" option is selected may be determined by checking the list of snapshots previously returned to the customer rather than by performing snapshot manifest file inspection.

Tracking Root Machine Images

In some embodiments, as an alternative to checking snapshot manifest files to determine if any chunks in a snapshot were created by account IDs that do not match the customer's account ID, a list of volumes (e.g., boot images) that the customer does not have export rights to may be created and maintained. When a customer creates a machine image instance, a snapshot is automatically created for the machine image instance. If the machine image instance is created from a boot image that belongs to the service provider or to a third party and thus should not be exported due to licensing or other policies, an indication of the machine image instance root snapshot along with the account ID of the boot image owner may be added to a list of machine image instances that the customer is not allowed to export. Any subsequent snapshot manifest files that are created for the machine image instance may include a field that indicates the root snapshot. When a user attempts to export a snapshot to the customer network, this list may be checked using the root snapshot field. If this root snapshot is in the list of machine image instances that the customer is not allowed to export, the request is denied.

Alternatively, this method may be used to limit the snapshots that are displayed on the customer's console to only those snapshots that the customer has the appropriate rights to export. When a user requests a list of the customer's snapshot, the list of machine image instances that the customer is not allowed to export may be used to filter the snapshots so that snapshots that are not eligible for export are not included in the list of snapshots returned to the customer.

Snapshot Export Control Service

The above generally describes methods for controlling the export of snapshots from the service provider network to customers' local networks that may be implemented by gateway control technology in the service provider environment. For example, a process or processes executing on one or more devices within a gateway control 2010 plane as illustrated in FIG. 35 may implement one or more of the methods described above to control the exporting of snapshots by preventing the export of snapshots for which the service provider's customers do not have the appropriate rights to export to their local networks, and/or to filter lists of snapshots provide to the customers so that users on the customers' local networks (e.g., a network administrator) cannot see the snapshots for which the customers do not have the appropriate rights to export to their local networks.

However, other services or utilities provided by the service provider may also enable a customer to export or otherwise access the customer's snapshots stored on the service provider network. Thus, as an alternative to implementing these methods in the gateway control plane of the service provider network, the methods for controlling the export of snapshots from the service provider network to customer's local networks as described above may be implemented as or in a service on the service provider network that may be used to implement policies such as licensing agreements for volumes such as boot images. This service may be internal to the service provider network, and may be referred to as a snapshot export control service. The snapshot export control service may provide an API via which other services or entities on the service provider network may query the service to, for example, determine if a specified customer or other entity has the appropriate rights to export or otherwise access a specified snapshot or snapshots. As another example, in response to an appropriate query, the snapshot export control service API may return a list of snapshots that includes only the snapshots that a specified customer or other entity has the appropriate rights to export or otherwise access. An advantage of implementing the snapshot export control methods as an internal service is that various policies that apply to various volumes on the service provider network may be centrally managed, encoded, and updated when necessary, rather than having multiple different entities on the service provider network implementing the policies individually.

Figure 41:
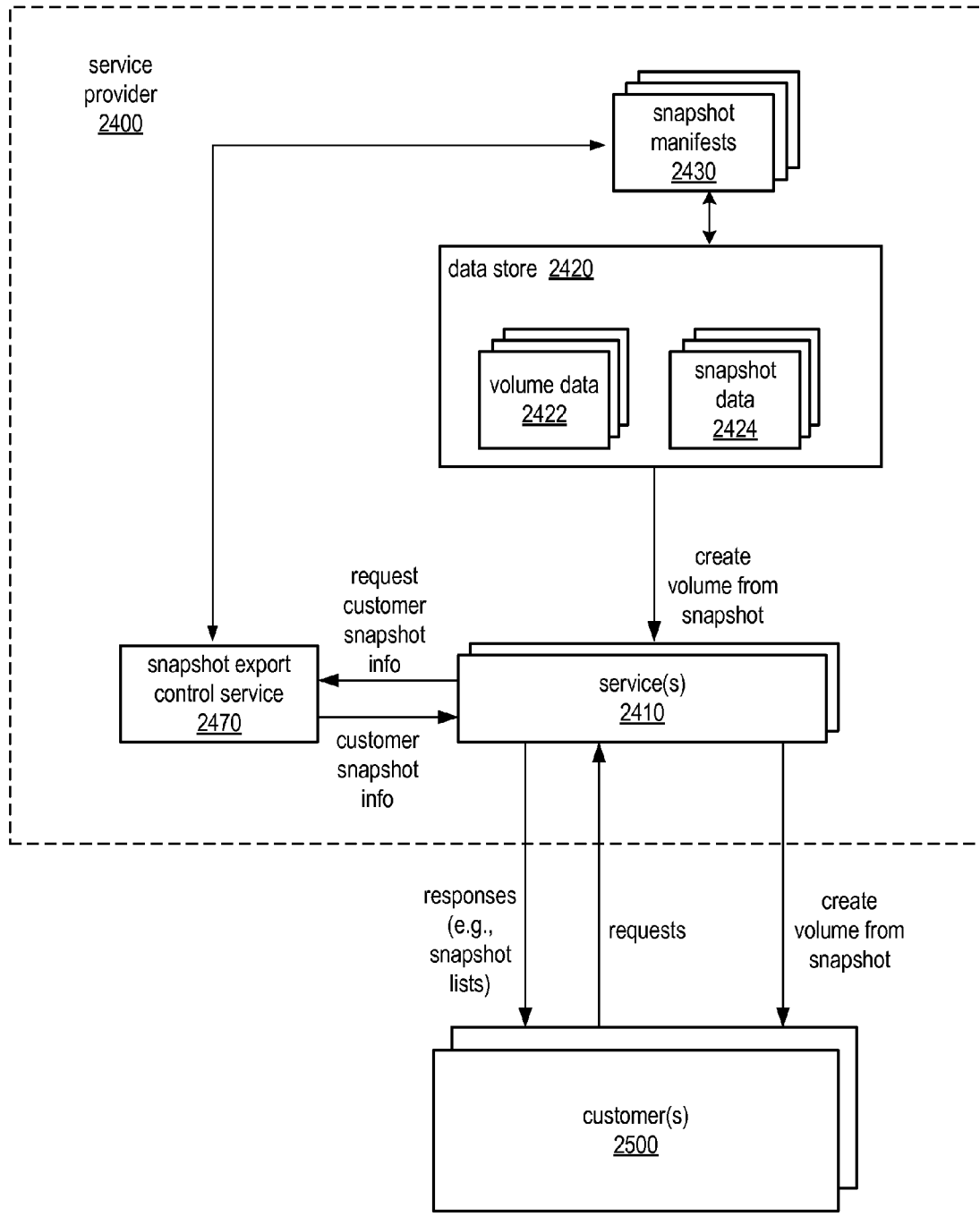
FIG. 41 illustrates a service provider network implementing a snapshot export control service, according to at least some embodiments.

FIG. 41 illustrates a service provider network implementing a snapshot export control service, according to at least some embodiments. Service provider 2400 implements a data store 2400 that includes volume data 2422 and snapshot data 2424, as previously described. Snapshot manifests 2430 are created and maintained for the snapshots, as previously described. One or more services 2410 or other utilities on the service provider 2400 network may each provide functionality that allow customer(s) 2500 to export snapshots to the customers' local networks as necessary or desired. When a service 2410 receives a request from a customer 2500 to export a snapshot, the service 2410 may query snapshot export control service 2470 via an API to determine if the customer has the appropriate rights to export the snapshot using one of the methods previously described. Alternatively, a service 2410 may request a list of snapshots that belong to a specified customer 2500, and the snapshot export control service 2470 may return a list that includes only those snapshots for which the customer has the appropriate rights to export using one of the methods previously described.

Policy-Based Export Control

In at least some embodiments, the snapshot export control methods and/or snapshot export control service that implements the snapshot export control methods may support policy-based access checking. For example, a policy for a customer may allow the customer to export only those snapshots that include data created by one or more specified account IDs. In this case, if a snapshot's manifest file indicates data created by an account that is not specified, or alternatively if the snapshot's root snapshot field indicates that the root snapshot was taken for a volume that was created by an account that is not specified, then the customer is not allowed to export the snapshot. As another example, a policy for a customer may block the customer from exporting only those snapshots that include data created by one or more specified account IDs. In this case, if a snapshot's manifest file does not indicate data created by an account that is specified, or alternatively if the snapshot's root snapshot field does not indicate that the root snapshot was taken for a volume that was created by an account that is specified, then the customer is allowed to export the snapshot. As another example, a policy for a customer may list one or more accounts for which the customer is allowed to export snapshots as well as one or more accounts for which the customer is not allowed to export volumes. These policies may also be applied to generating lists of snapshots for the customer.

In at least some embodiments, the policy-based export control method may support the use of one or more other criteria in addition to or instead of the account IDs to control the export of volumes. For example, the entries in a snapshot manifest file may be tagged with both an account ID and a volume identifier. The policy for a customer may be used to specify that for particular account IDs only one or more specified volumes may be exported, or alternatively that for particular account IDs one or more specified volumes may not be exported, or a combination thereof.

Preserving Account IDs

As previously described, snapshot manifest files may indicate mappings from volume blocks to chunks in the snapshot. Each entry in a snapshot manifest file may include an account ID of the creator/owner of the chunk. However, under some conditions, a customer's actions may result in this account ID being overwritten. For example, the account ID associated with a chunk may be overwritten when the customer restores a volume from a snapshot on the service provider network, modifies the chunk on the restored volume, and creates a snapshot from the modified volume. In this scenario, at least some of the account ID information from the original volume may be lost. To help preserve the original account ID information for volumes, some embodiments may implement owner (account ID) immutable chunks in the volume that always inherit the original account ID, regardless of who or what modifies the chunks. For example, immutable chunks on a volume may include the boot loader, operating system (OS) files, or reserved sectors that cannot be used by the file system.

Illustrative System

In at least some embodiments, a computer system that implements a portion or all of one or more of the technologies described herein, including but not limited to the snapshot export control methods and the storage gateway technologies, may include a general-purpose computer system that includes or is configured to access one or more computer-accessible media, such as computer system 3000 illustrated in FIG. 42. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for snapshot export control and for storage gateway technologies, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices as illustrated in the other Figures described herein, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above in reference to the other Figures for implementing embodiments of snapshot export control methods and/or storage gateway technologies. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, by a snapshot export control process implemented on one or more devices on a provider network:
   receiving, on behalf of a client via a service of the provider network, a request directed to one or more snapshots stored on a data store on the provider network, wherein a snapshot is a differential backup of a client volume;
   determining whether the client has rights to export the one or more snapshots, wherein said determining comprises, for each of the one or more snapshots, examining a snapshot manifest file corresponding to the snapshot, wherein the snapshot manifest file maps data blocks of a client data volume to locations of data chunks stored in the snapshot, and wherein said examining compares account information for the client with information from the snapshot manifest; and
   sending a response to the request, the response indicating the determination or returning a list that includes those snapshots for which the client export rights were determined.

2. The method as recited in claim 1, wherein each snapshot manifest file records account identifiers for creators of the data blocks and includes creator account information for data blocks in the respective snapshot, and wherein said examining compares account information for the client with the creator account information for the data blocks in the respective snapshot.

3. The method as recited in claim 2, further comprising:
   identifying, via said examining, a snapshot that includes at least one data block created by a different account than a client account, wherein the client does not have rights to export a snapshot that includes data created by the different account; and
   generating a response to the request that does not include the identified snapshot.

4. The method as recited in claim 3, wherein the request is a request for a list of the client's snapshots stored on the data store, and wherein said generating a response to the request that does not include the identified snapshot comprises not including an indication of the identified snapshot in the list.

5. The method as recited in claim 1, wherein the request is a request to export a specified snapshot to an external network, and wherein said sending the response to the request comprises sending a response indicating that the client does not have rights to export the specified snapshot to the external network.

6. The method as recited in claim 1, further comprising identifying, via said examining, at least one snapshot that includes only data for which the client has rights to export, wherein the response to the request includes the identified at least one snapshot.

7. The method as recited in claim 6, further comprising:
   identifying, via said examining, at least one snapshot that the client has rights to export;
   including an indication of the identified at least one snapshot that the client has rights to export in the list; and
   returning the list to the client in the response to the request.

8. The method as recited in claim 1, further comprising, for each of the one or more snapshots, adding an indication of the snapshot and an indication of the client's determined rights regarding export of the snapshot to a cache that includes indications of snapshots and indications of the client's rights regarding export of the snapshots.

9. A system, comprising:
   at least one processor; and
   a memory comprising program instructions, wherein the program instructions are executed by at least one processor to implement a snapshot export control service configured to:
   receive, via a service of a provider network, a request on behalf of a client of the provider network, the request directed to one or more snapshots stored on a data store on the provider network, wherein each snapshot is a differential backup of a client volume;
   determine, from information related to the snapshot, whether the client has appropriate rights to export the snapshot to an external network; and
   send a response to the request, the response indicating the determination or returning a list that includes those snapshots for which the client export rights were determined.

10. The system of claim 9, wherein to determine whether the client has appropriate rights said snapshot export control service is further configured to, for each of the one or more snapshots, examine a snapshot manifest file corresponding to the snapshot, wherein the snapshot manifest file maps data blocks of a client data volume to locations of data chunks stored in the snapshot, and wherein said examination compares account information for the client with information from the snapshot manifest file.

11. The system of claim 10, wherein each snapshot manifest file includes creator account information for data blocks in the respective snapshot, and wherein said examination compares account information for the client with the creator account information for the data blocks in the respective snapshot.

12. The system as recited in claim 10, wherein, to determine whether the client has appropriate rights to export the snapshot, the snapshot export control service is further configured to determine, via said examination, whether the snapshot includes at least one data block created by a different account than the client account, wherein the client does not have rights to export data created by the different account.

13. The system as recited in claim 10, wherein, to determine, from information related to the snapshot, whether the client has appropriate rights to export the snapshot to an external network, the snapshot export control service is further configured to:
   check a cache that includes indications of snapshots and indications of the client's rights regarding export of the snapshots indicated in the cache to determine whether the snapshot is listed in the cache; and for a snapshot that is listed in the cache, determine the client's rights regarding export of the snapshot from the cache.

14. The system as recited in claim 13, wherein the snapshot export control service is further configured to, for a snapshot is not listed in the cache:
examine a snapshot manifest file corresponding to the snapshot, wherein the snapshot manifest file includes creator account information for data in the respective snapshot, and wherein said examination compares account information for the client with the creator account information for the data blocks in the respective snapshot; and
determine, via said examination, whether the snapshot includes at least one data block created by a different account than the client account, wherein the client does not have rights to export data created by the different account.

15. The system as recited in claim 9, wherein the snapshot export control service is further configured to add an indication of the snapshot and an indication of the client's determined rights regarding export of the snapshot to a cache that includes indications of snapshots and indications of the client's rights regarding export of the snapshots.

16. The system as recited in claim 15, wherein the snapshot export control service is further configured to add an indication of the snapshot and an indication of the client's determined rights regarding export of the snapshot to the cache.

17. The system as recited in claim 9, wherein the request is a request to export a specified snapshot to the external network, and wherein said export of the specified snapshot is performed if the client has appropriate rights to export the snapshot to the external network and is not performed if the client does not have appropriate rights to export the snapshot to the external network.

18. A non-transitory computer-readable storage medium storing program instruction that are executed to implement a snapshot export control process configured to:

receive, via a service of a service provider network, information indicating a client of the provider network and one or more snapshots stored on a data store on the provider network, wherein a snapshot is a differential backup of a client volume on the provider network;

determine whether the client has rights to export the one or more snapshots, wherein said determination comprises, for each of the one or more snapshots, examining a snapshot manifest corresponding to the snapshot, wherein the snapshot manifest includes account information for one or more creators of data in the respective snapshot, and wherein the determination is based on whether the snapshot includes data created by at least one account that is not the client's account; and return an indication of the determination or return a list that includes those snapshots for which the client export rights were determined.

19. The non-transitory computer-readable storage medium of claim 18, wherein the snapshot manifest maps data blocks of the client volume to locations of data chunks stored in the snapshot and records account identifiers for creators of the data blocks.

20. The non-transitory computer-readable storage medium of claim 19, wherein to determine, from a snapshot manifest for the snapshot, that the client does not have appropriate rights to export the snapshot, the snapshot export control process is further configured to:

compare account information for the client with the creator account information for the data blocks in the snapshot manifest; and determine, via said comparison, that the snapshot includes at least one data block created by a different account than the client's account, wherein the client does not have rights to export data created by the different account.

* * * * *